(12) United States Patent
Bartlett

(10) Patent No.: US 12,731,141 B2
(45) Date of Patent: Sep. 8, 2026

(54) APPARATUS AND METHOD FOR VERIFYING A TRANSACTION RELATED TO A DEVICE WITH AN ON-DEVICE REWRITEABLE MEMORY

(71) Applicant: Afero, Inc., Los Altos, CA (US)

(72) Inventor: Scott Bartlett, Oakland, CA (US)

(73) Assignee: Afero, Inc., Los Altos, CA (US)

( * ) Notice: Subject to any disclaimer, the term of this patent is extended or adjusted under 35 U.S.C. 154(b) by 0 days.

(21) Appl. No.: 18/737,688

(22) Filed: Jun. 7, 2024

(65) Prior Publication Data

US 2025/0285111 A1 Sep. 11, 2025

Related U.S. Application Data

(63) Continuation-in-part of application No. 18/600,095, filed on Mar. 8, 2024.

(51) Int. Cl.
*G06Q 20/40* (2012.01)
*G06Q 20/38* (2012.01)
(Continued)

(52) U.S. Cl.
CPC ..... *G06Q 20/401* (2013.01); *G06Q 20/38215* (2013.01); *G06Q 20/3825* (2013.01);
(Continued)

(58) Field of Classification Search
CPC ... H04L 9/3247; H04L 9/3263; H04L 9/0825; G06Q 20/401; G06Q 20/3825; G06Q 20/38215; G06Q 20/3829; G06Q 10/0833
See application file for complete search history.

(56) References Cited

U.S. PATENT DOCUMENTS 5,491,482 A 2/1996 Dingwall et al.
2003/0191675 A1* 10/2003 Murashita ............. G06Q 10/10 705/50

(Continued)

FOREIGN PATENT DOCUMENTS

EP 3682591 B1 * 9/2021 ............ H04L 9/088

OTHER PUBLICATIONS

Arbit; Implementing public-key cryptography on passive RFID tags is practical; International Journal of Information Security, Feb. 2015, vol. 14 (1), p. 85-99.*

(Continued)

*Primary Examiner* — Ilse I Immanuel
(74) *Attorney, Agent, or Firm* — Nicholson De Vos Webster & Elliott LLP

(57) ABSTRACT

A system, method, and machine-readable medium are described for verifying a transaction related to a device with an on-device rewriteable memory. For example, one embodiment of a method comprises: during a purchase transaction to purchase a device at a point of sale (POS) system, reading a certificate stored on a rewriteable tag integral to the device; generating a signature over the certificate and, if the purchase transaction results in a successful purchase of the device, storing the signature in the rewriteable tag; during a post-purchase transaction, attempting to read the signature from the rewriteable tag and validate the signature; denying the post-purchase transaction if the signature cannot be read and/or is not validated; if the signature can be read and validated, then: permitting the post-process transaction; generating a new public/private key pair and corresponding new certificate; and storing the new certificate on the rewriteable tag.

27 Claims, 46 Drawing Sheets

(51) Int. Cl.
*H04L 9/08* (2006.01)
*H04L 9/32* (2006.01)

(52) U.S. Cl.
CPC ....... *G06Q 20/3829* (2013.01); *H04L 9/0825* (2013.01); *H04L 9/3247* (2013.01); *H04L 9/3263* (2013.01)

(56) References Cited

U.S. PATENT DOCUMENTS

| | | | | |
|---|---|---|---|---|
| 2010/0114780 | A1* | 5/2010 | Tribe ............... | G06Q 10/06375 235/375 |
| 2017/0262862 | A1 | 9/2017 | Aljawhari | |
| 2021/0216958 | A1 | 7/2021 | Pacheco et al. | |
| 2022/0343328 | A1 | 10/2022 | Fowler et al. | |

OTHER PUBLICATIONS

Non-Final Office Action, U.S. Appl. No. 18/600,095, Feb. 3, 2025, 9 pages.

Notice of Allowance, U.S. Appl. No. 18/600,095, Aug. 22, 2025, 9 pages.

* cited by examiner

APPARATUS AND METHOD FOR VERIFYING A TRANSACTION RELATED TO A DEVICE WITH AN ON-DEVICE REWRITEABLE MEMORY

BACKGROUND

Field of the Invention

This invention relates generally to the field of computer systems. More particularly, the invention relates to a system and method for verification of a transaction related to a device with an on-device rewriteable memory.

Description of the Related Art

The "Internet of Things" refers to the interconnection of uniquely-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
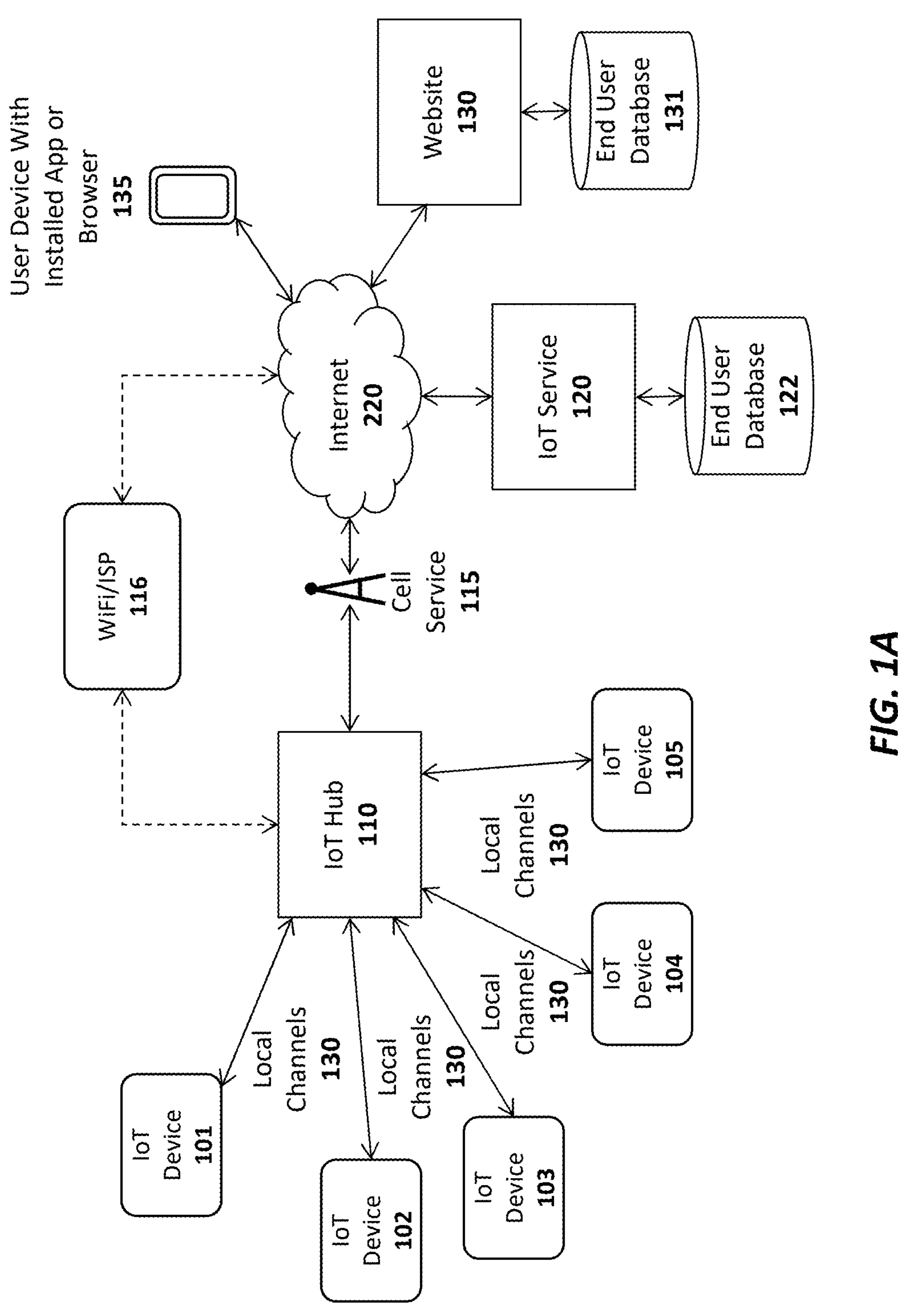
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130. In one embodiment, the IoT service 120 includes an end user database 122 for maintaining user account information and data collected from each user's IoT devices. For example, if the IoT devices include sensors (e.g., temperature sensors, accelerometers, heat sensors, motion detectore, etc), the database 122 may be continually updated to store the data collected by the IoT devices 101-105. The data stored in the database 122 may then be made accessible to the end user via the IoT app or browser installed on the user's device 135 (or via a desktop or other client computer system) and to web clients (e.g., such as websites 130 subscribing to the IoT service 120

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
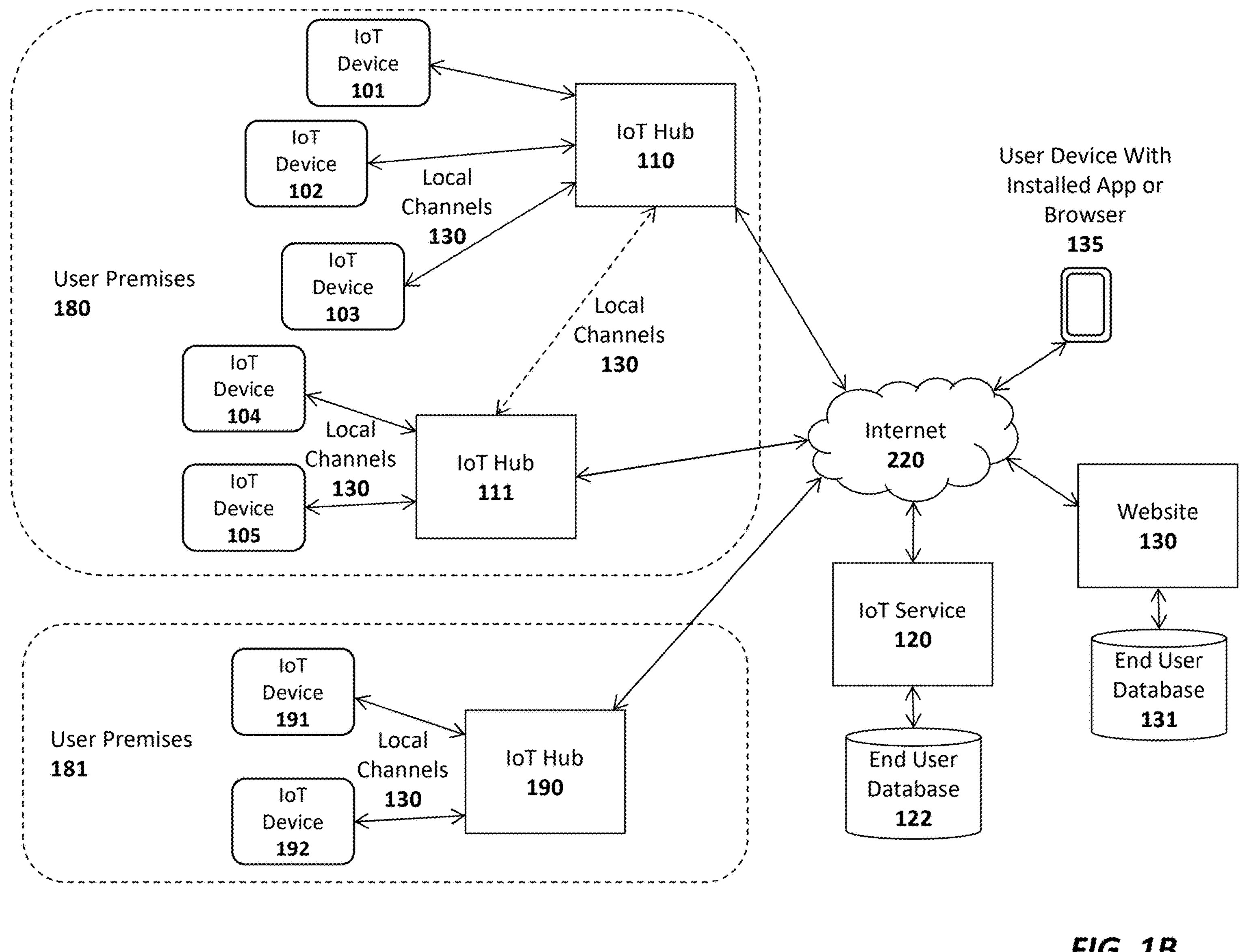

FIG. 1B illustrates additional connection options for a plurality of IoT hubs 110-111, 190 In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
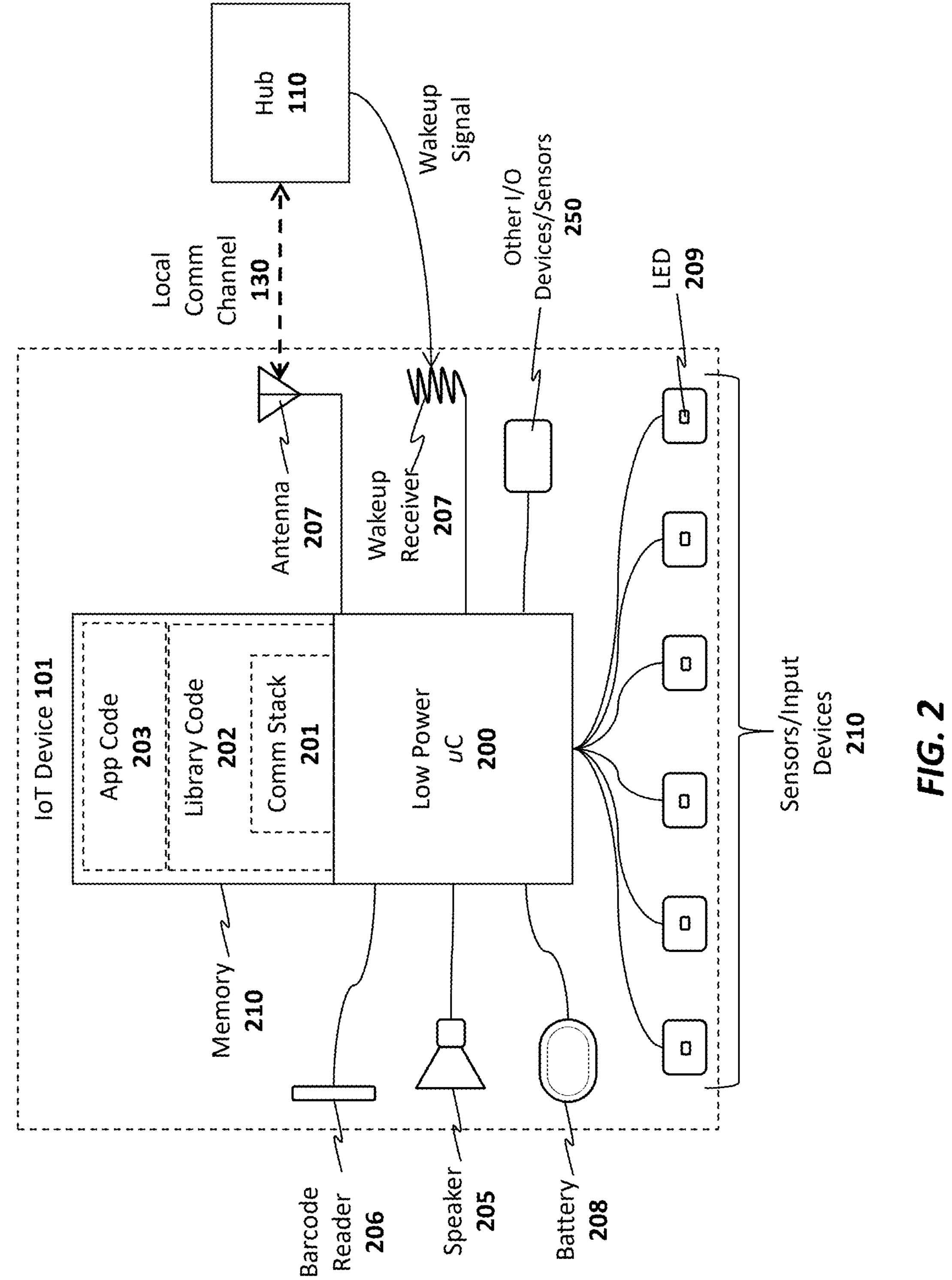
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys for encrypting communications and/or generating signatures. Alternatively, the keys may be secured in a subscriber identify module (SIM).

Figure 3:
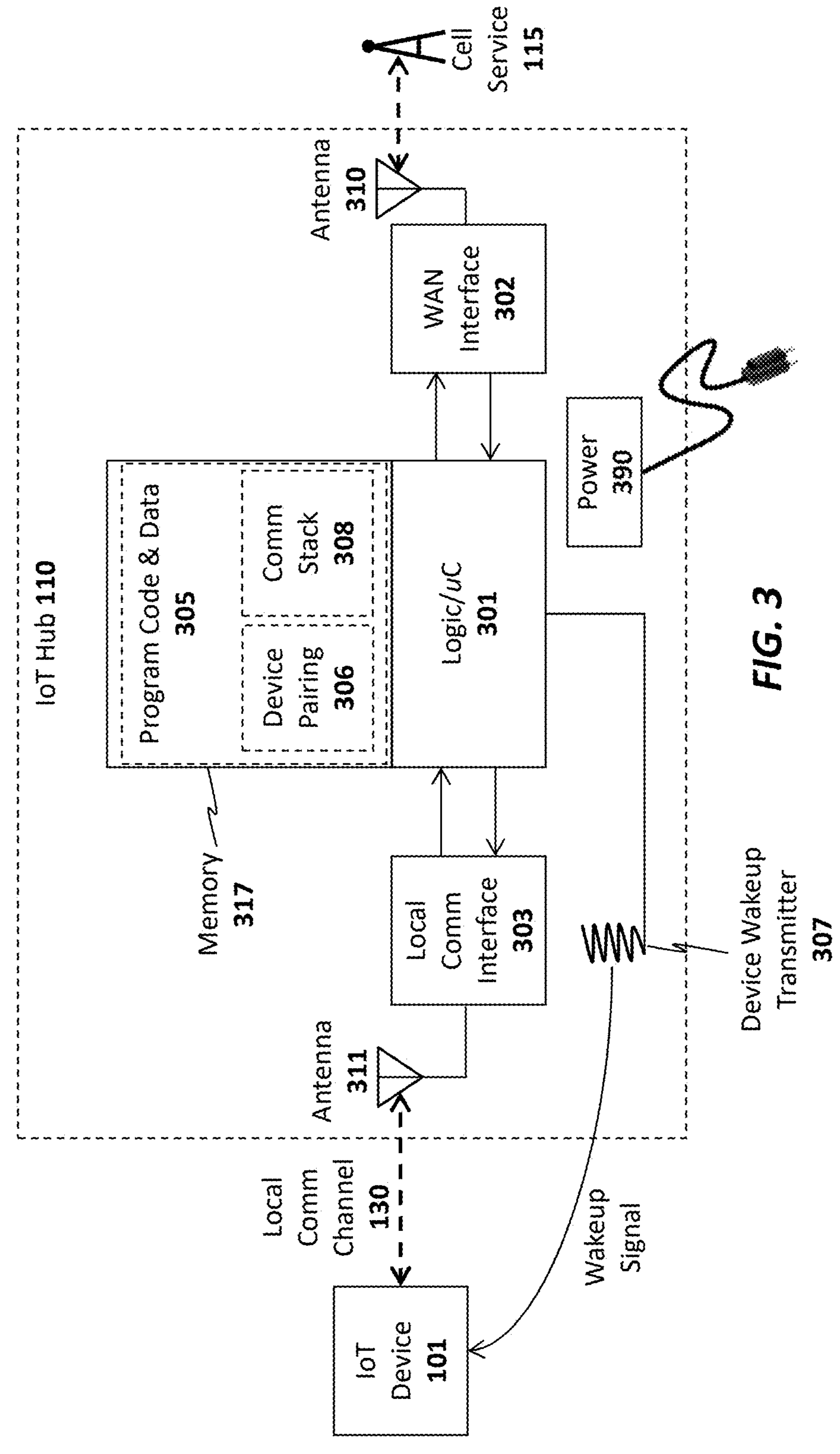
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys for encrypting communications and generating/verifying signatures. Alternatively, the keys may be secured in a subscriber identify module (SIM).

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code is embedded magnetically on the IoT device and the IoT hub has a magnetic sensor such as an radio frequency ID (RFID) or near field communication (NFC) sensor to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices).

In one embodiment, the IoT hub 110 manages a continuous bi-directional stream of data between the IoT devices 101-105 and the IoT service 120. In circumstances where updates to/from the IoT devices 101-105 are required in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via A/C power. In particular, the IoT hub 110 may include a power unit 390 with a transformer for transforming A/C voltage supplied via an A/C power cord to a lower DC voltage.

Figure 4A:
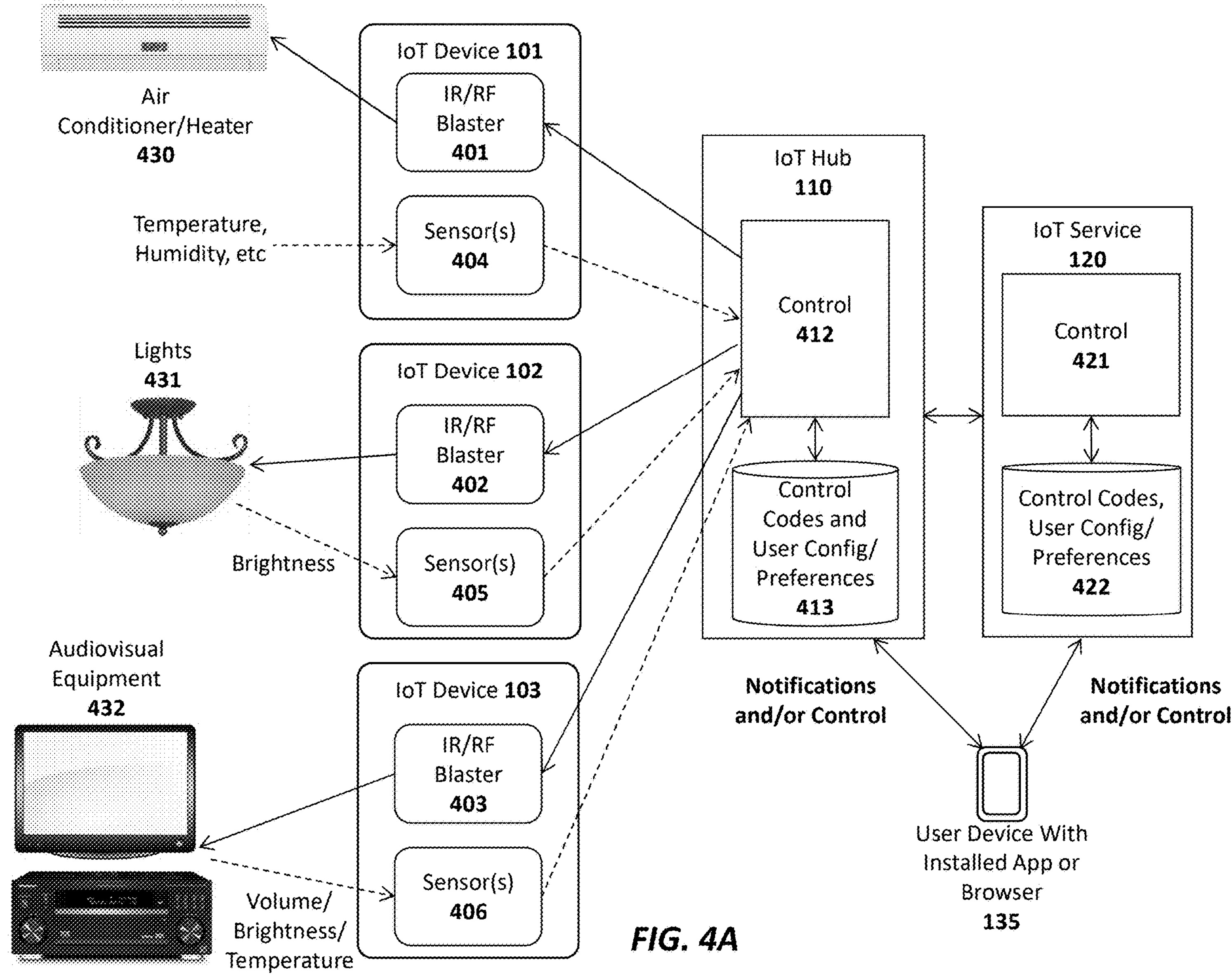
FIG. 4A-B illustrate embodiments of the invention for controlling and collecting data from IoT devices, and generating notifications.

FIG. 4A illustrates one embodiment of the invention for performing universal remote control operations using the IoT system. In particular, in this embodiment, a set of IoT devices 101-103 are equipped with infrared (IR) and/or radio frequency (RF) blasters 401-403, respectively, for transmitting remote control codes to control various different types of electronics equipment including air conditioners/heaters 430, lighting systems 431, and audiovisual equipment 432 (to name just a few). In the embodiment shown in FIG. 4A, the IoT devices 101-103 are also equipped with sensors 404-406, respectively, for detecting the operation of the devices which they control, as described below.

For example, sensor 404 in IoT device 101 may be a temperature and/or humidity sensor for sensing the current temperature/humidity and responsively controlling the air conditioner/heater 430 based on a current desired temperature. In this embodiment, the air conditioner/heater 430 is one which is designed to be controlled via a remote control device (typically a remote control which itself has a temperature sensor embedded therein). In one embodiment, the user provides the desired temperature to the IoT hub 110 via an app or browser installed on a user device 135. Control logic 412 executed on the IoT hub 110 receives the current temperature/humidity data from the sensor 404 and responsively transmits commands to the IoT device 101 to control the IR/RF blaster 401 in accordance with the desired temperature/humidity. For example, if the temperature is below the desired temperature, then the control logic 412 may transmit a command to the air conditioner/heater via the IR/RF blaster 401 to increase the temperature (e.g., either by turning off the air conditioner or turning on the heater). The command may include the necessary remote control code stored in a database 413 on the IoT hub 110. Alternatively, or in addition, the IoT service 421 may implement control logic 421 to control the electronics equipment 430-432 based on specified user preferences and stored control codes 422.

IoT device 102 in the illustrated example is used to control lighting 431. In particular, sensor 405 in IoT device 102 may photosensor or photodetector configured to detect the current brightness of the light being produced by a light fixture 431 (or other lighting apparatus). The user may specify a desired lighting level (including an indication of ON or OFF) to the IoT hub 110 via the user device 135. In response, the control logic 412 will transmit commands to the IR/RF blaster 402 to control the current brightness level of the lights 431 (e.g., increasing the lighting if the current brightness is too low or decreasing the lighting if the current brightness is too high; or simply turning the lights ON or OFF).

IoT device 103 in the illustrated example is configured to control audiovisual equipment 432 (e.g., a television, A/V receiver, cable/satellite receiver, AppleTV™, etc). Sensor 406 in IoT device 103 may be an audio sensor (e.g., a microphone and associated logic) for detecting a current ambient volume level and/or a photosensor to detect whether a television is on or off based on the light generated by the television (e.g., by measuring the light within a specified spectrum). Alternatively, sensor 406 may include a temperature sensor connected to the audiovisual equipment to detect whether the audio equipment is on or off based on the detected temperature. Once again, in response to user input via the user device 135, the control logic 412 may transmit commands to the audiovisual equipment via the IR blaster 403 of the IoT device 103.

It should be noted that the foregoing are merely illustrative examples of one embodiment of the invention. The underlying principles of the invention are not limited to any particular type of sensors or equipment to be controlled by IoT devices.

In an embodiment in which the IoT devices 101-103 are coupled to the IoT hub 110 via a Bluetooth LE connection, the sensor data and commands are sent over the Bluetooth LE channel. However, the underlying principles of the invention are not limited to Bluetooth LE or any other communication standard.

Figure 4B:
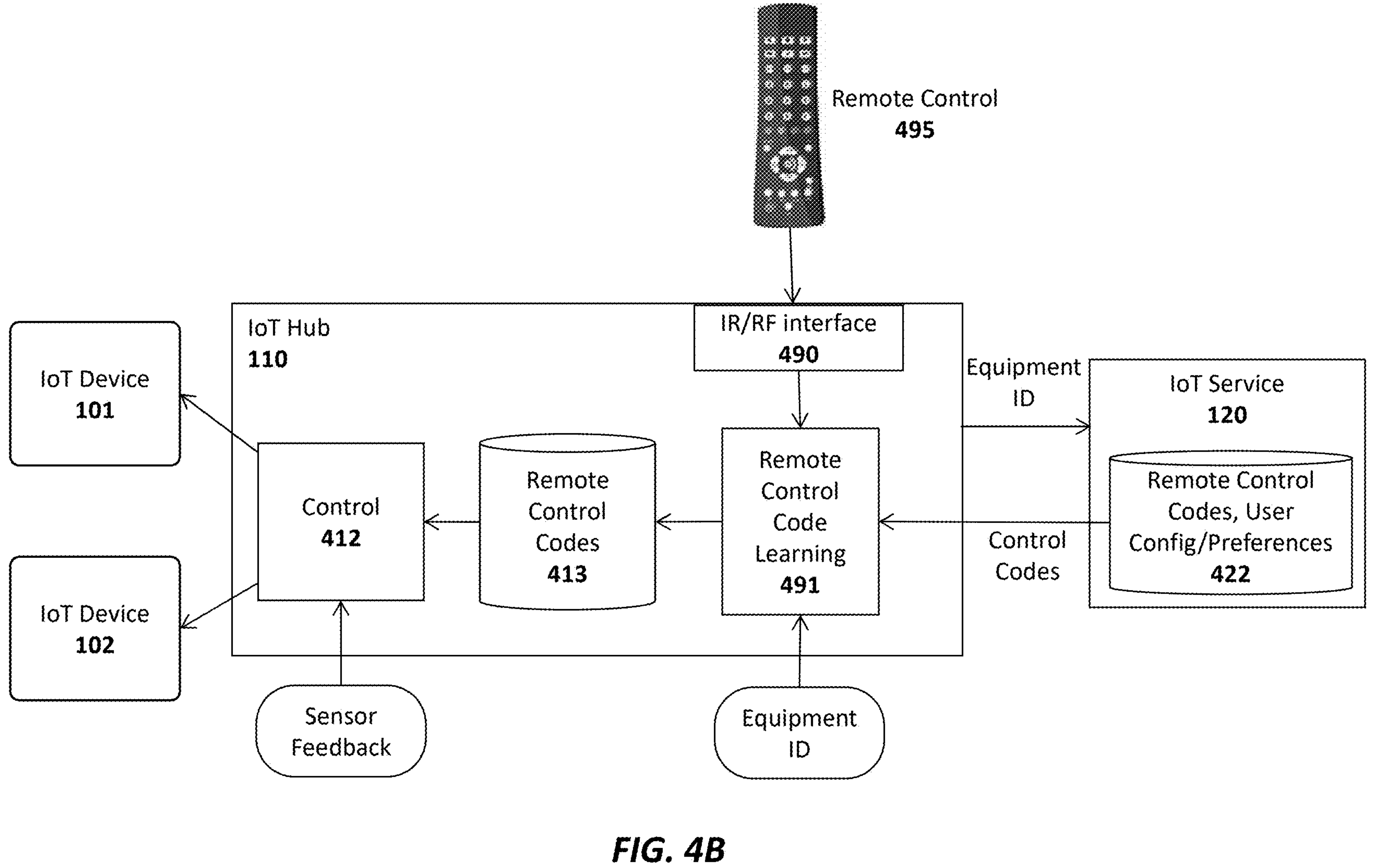

In one embodiment, the control codes required to control each of the pieces of electronics equipment are stored in a database 413 on the IoT hub 110 and/or a database 422 on the IoT service 120. As illustrated in FIG. 4B, the control codes may be provided to the IoT hub 110 from a master database of control codes 422 for different pieces of equipment maintained on the IoT service 120. The end user may specify the types of electronic (or other) equipment to be controlled via the app or browser executed on the user device 135 and, in response, a remote control code learning module 491 on the IoT hub may retrieve the required IR/RF codes from the remote control code database 492 on the IoT service 120 (e.g., identifying each piece of electronic equipment with a unique ID).

In addition, in one embodiment, the IoT hub 110 is equipped with an IR/RF interface 490 to allow the remote control code learning module 491 to "learn" new remote control codes directly from the original remote control 495 provided with the electronic equipment. For example, if control codes for the original remote control provided with the air conditioner 430 is not included in the remote control database, the user may interact with the IoT hub 110 via the app/browser on the user device 135 to teach the IoT hub 110 the various control codes generated by the original remote control (e.g., increase temperature, decrease temperature, etc). Once the remote control codes are learned they may be stored in the control code database 413 on the IoT hub 110 and/or sent back to the IoT service 120 to be included in the central remote control code database 492 (and subsequently used by other users with the same air conditioner unit 430).

In one embodiment, each of the IoT devices 101-103 have an extremely small form factor and may be affixed on or near their respective electronics equipment 430-432 using double-sided tape, a small nail, a magnetic attachment, etc. For control of a piece of equipment such as the air conditioner 430, it would be desirable to place the IoT device 101 sufficiently far away so that the sensor 404 can accurately measure the ambient temperature in the home (e.g., placing the IoT device directly on the air conditioner would result in a temperature measurement which would be too low when the air conditioner was running or too high when the heater was running). In contrast, the IoT device 102 used for controlling lighting may be placed on or near the lighting fixture 431 for the sensor 405 to detect the current lighting level.

In addition to providing general control functions as described, one embodiment of the IoT hub 110 and/or IoT service 120 transmits notifications to the end user related to the current status of each piece of electronics equipment. The notifications, which may be text messages and/or app-specific notifications, may then be displayed on the display of the user's mobile device 135. For example, if the user's air conditioner has been on for an extended period of time but the temperature has not changed, the IoT hub 110 and/or IoT service 120 may send the user a notification that the air conditioner is not functioning properly. If the user is not home (which may be detected via motion sensors or based on the user's current detected location), and the sensors 406 indicate that audiovisual equipment 430 is on or sensors 405 indicate that the lights are on, then a notification may be sent to the user, asking if the user would like to turn off the audiovisual equipment 432 and/or lights 431. The same type of notification may be sent for any equipment type.

Once the user receives a notification, he/she may remotely control the electronics equipment 430-432 via the app or browser on the user device 135. In one embodiment, the user device 135 is a touchscreen device and the app or browser displays an image of a remote control with user-selectable buttons for controlling the equipment 430-432. Upon receiving a notification, the user may open the graphical remote control and turn off or adjust the various different pieces of equipment. If connected via the IoT service 120, the user's selections may be forwarded from the IoT service 120 to the IoT hub 110 which will then control the equipment via the control logic 412. Alternatively, the user input may be sent directly to the IoT hub 110 from the user device 135.

In one embodiment, the user may program the control logic 412 on the IoT hub 110 to perform various automatic control functions with respect to the electronics equipment 430-432. In addition to maintaining a desired temperature, brightness level, and volume level as described above, the control logic 412 may automatically turn off the electronics equipment if certain conditions are detected. For example, if the control logic 412 detects that the user is not home and that the air conditioner is not functioning, it may automatically turn off the air conditioner. Similarly, if the user is not home, and the sensors 406 indicate that audiovisual equipment 430 is on or sensors 405 indicate that the lights are on, then the control logic 412 may automatically transmit commands via the IR/RF blasters 403 and 402, to turn off the audiovisual equipment and lights, respectively.

Figure 5:
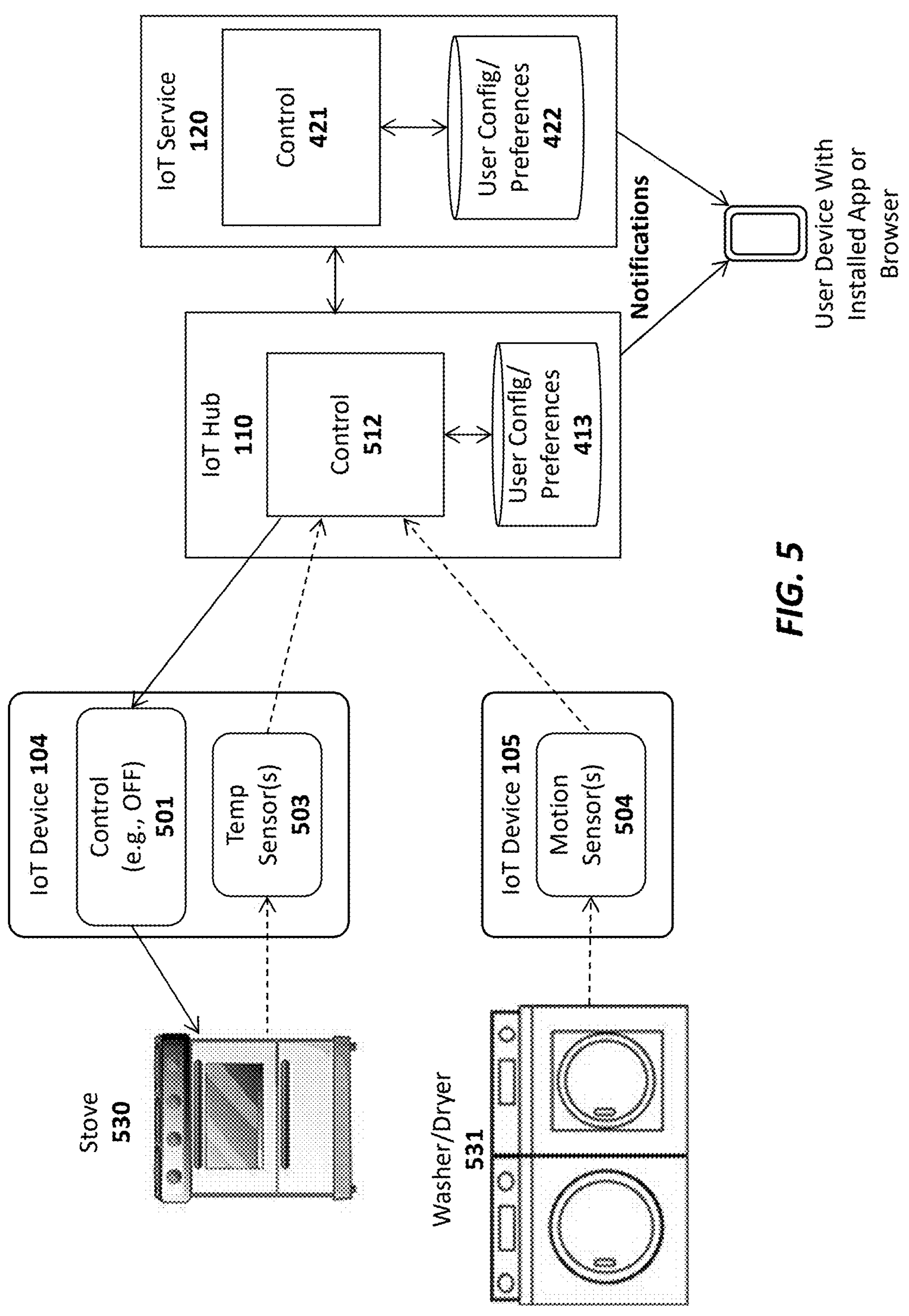
FIG. 5 illustrates embodiments of the invention for collecting data from IoT devices and generating notifications from an IoT hub and/or IoT service.

FIG. 5 illustrates additional embodiments of IoT devices 104-105 equipped with sensors 503-504 for monitoring electronic equipment 530-531. In particular, the IoT device 104 of this embodiment includes a temperature sensor 503 which may be placed on or near a stove 530 to detect when the stove has been left on. In one embodiment, the IoT device 104 transmits the current temperature measured by the temperature sensor 503 to the IoT hub 110 and/or the IoT service 120. If the stove is detected to be on for more than a threshold time period (e.g., based on the measured temperature), then control logic 512 may transmit a notification to the end user's device 135 informing the user that the stove 530 is on. In addition, in one embodiment, the IoT device 104 may include a control module 501 to turn off the stove, either in response to receiving an instruction from the user or automatically (if the control logic 512 is programmed to do so by the user). In one embodiment, the control logic 501 comprises a switch to cut off electricity or gas to the stove 530. However, in other embodiments, the control logic 501 may be integrated within the stove itself.

FIG. 5 also illustrates an IoT device 105 with a motion sensor 504 for detecting the motion of certain types of electronics equipment such as a washer and/or dryer.

Another sensor that may be used is an audio sensor (e.g., microphone and logic) for detecting an ambient volume level. As with the other embodiments described above, this embodiment may transmit notifications to the end user if certain specified conditions are met (e.g., if motion is detected for an extended period of time, indicating that the washer/dryer are not turning off). Although not shown in FIG. 5, IoT device 105 may also be equipped with a control module to turn off the washer/dryer 531 (e.g., by switching off electric/gas), automatically, and/or in response to user input.

In one embodiment, a first IoT device with control logic and a switch may be configured to turn off all power in the user's home and a second IoT device with control logic and a switch may be configured to turn off all gas in the user's home. IoT devices with sensors may then be positioned on or near electronic or gas-powered equipment in the user's home. If the user is notified that a particular piece of equipment has been left on (e.g., the stove 530), the user may then send a command to turn off all electricity or gas in the home to prevent damage. Alternatively, the control logic 512 in the IoT hub 110 and/or the IoT service 120 may be configured to automatically turn off electricity or gas in such situations.

In one embodiment, the IoT hub 110 and IoT service 120 communicate at periodic intervals. If the IoT service 120 detects that the connection to the IoT hub 110 has been lost (e.g., by failing to receive a request or response from the IoT hub for a specified duration), it will communicate this information to the end user's device 135 (e.g., by sending a text message or app-specific notification).

Apparatus and Method for Communicating Data Through an Intermediary Device

As mentioned above, because the wireless technologies used to interconnect IoT devices such as Bluetooth LE are generally short range technologies, if the hub for an IoT implementation is outside the range of an IoT device, the IoT device will not be able to transmit data to the IoT hub (and vice versa).

To address this deficiency, one embodiment of the invention provides a mechanism for an IoT device which is outside of the wireless range of the IoT hub to periodically connect with one or more mobile devices when the mobile devices are within range. Once connected, the IoT device can transmit any data which needs to be provided to the IoT hub to the mobile device which then forwards the data to the IoT hub.

Figure 6:
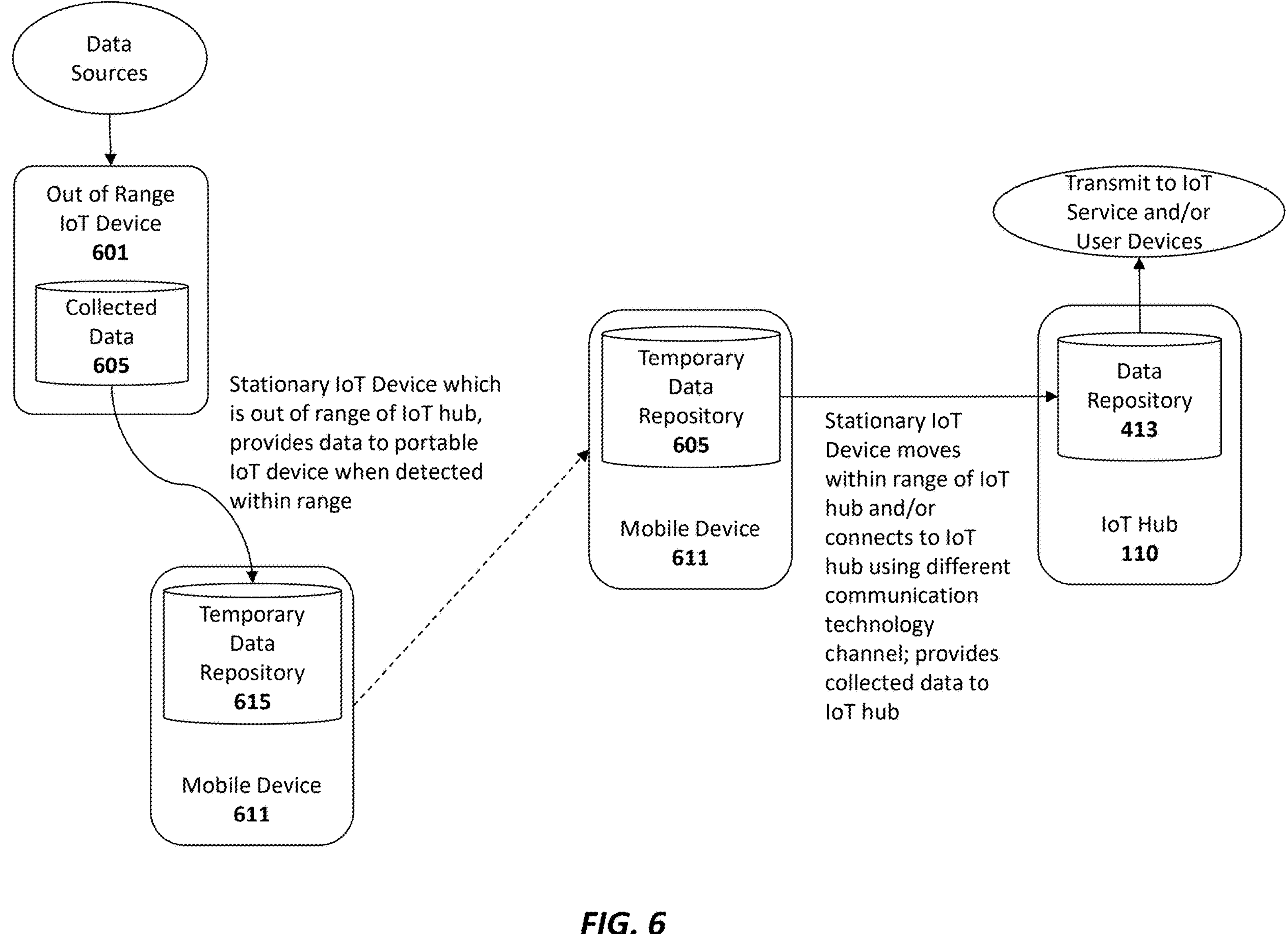
FIG. 6 illustrates one embodiment of a system in which an intermediary mobile device collects data from a stationary IoT device and provides the data to an IoT hub.

As illustrated in FIG. 6 one embodiment includes an IoT hub 110, an IoT device 601 which is out of range of the IoT hub 110 and a mobile device 611. The out of range IoT device 601 may include any form of IoT device capable of collecting and communicating data. For example, the IoT device 601 may comprise a data collection device configured within a refrigerator to monitor the food items available in the refrigerator, the users who consume the food items, and the current temperature. Of course, the underlying principles of the invention are not limited to any particular type of IoT device. The techniques described herein may be implemented using any type of IoT device including those used to collect and transmit data for smart meters, stoves, washers, dryers, lighting systems, HVAC systems, and audiovisual equipment, to name just a few.

Moreover, the mobile device In operation, the IoT device 611 illustrated in FIG. 6 may be any form of mobile device capable of communicating and storing data. For example, in one embodiment, the mobile device 611 is a smartphone with an app installed thereon to facilitate the techniques described herein. In another embodiment, the mobile device 611 comprises a wearable device such as a communication token affixed to a neckless or bracelet, a smartwatch or a fitness device. The wearable token may be particularly useful for elderly users or other users who do not own a smartphone device.

In operation, the out of range IoT device 601 may periodically or continually check for connectivity with a mobile device 611. Upon establishing a connection (e.g., as the result of the user moving within the vicinity of the refrigerator) any collected data 605 on the IoT device 601 is automatically transmitted to a temporary data repository 615 on the mobile device 611. In one embodiment, the IoT device 601 and mobile device 611 establish a local wireless communication channel using a low power wireless standard such as BTLE. In such a case, the mobile device 611 may initially be paired with the IoT device 601 using known pairing techniques.

One the data has been transferred to the temporary data repository, the mobile device 611 will transmit the data once communication is established with the IoT hub 110 (e.g., when the user walks within the range of the IoT hub 110). The IoT hub may then store the data in a central data repository 413 and/or send the data over the Internet to one or more services and/or other user devices. In one embodiment, the mobile device 611 may use a different type of communication channel to provide the data to the IoT hub 110 (potentially a higher power communication channel such as WiFi).

Figure 7:
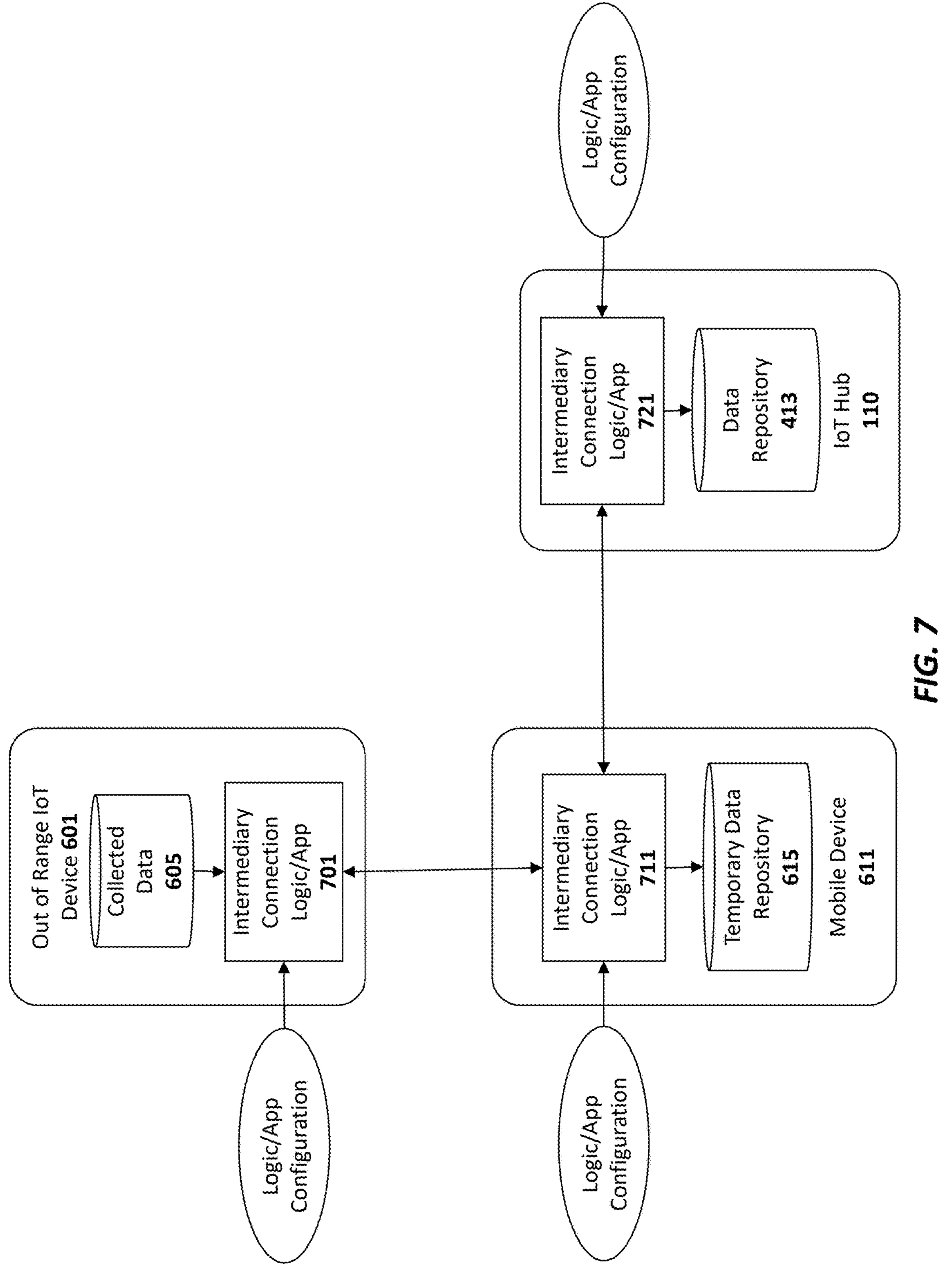
FIG. 7 illustrates intermediary connection logic implemented in one embodiment of the invention.

The out of range IoT device 601, the mobile device 611, and the IoT hub may all be configured with program code and/or logic to implement the techniques described herein. As illustrated in FIG. 7, for example, the IoT device 601 may be configured with intermediary connection logic and/or application, the mobile device 611 may be configured with an intermediary connection logic/application, and the IoT hub 110 may be configured with an intermediary connection logic/application 721 to perform the operations described herein. The intermediary connection logic/application on each device may be implemented in hardware, software, or any combination thereof. In one embodiment, the intermediary connection logic/application 701 of the IoT device 601 searches and establishes a connection with the intermediary connection logic/application 711 on the mobile device (which may be implemented as a device app) to transfer the data to the temporary data repository 615. The intermediary connection logic/application 701 on the mobile device 611 then forwards the data to the intermediary connection logic/application on the IoT hub, which stores the data in the central data repository 413.

As illustrated in FIG. 7, the intermediary connection logic/applications 701, 711, 721, on each device may be configured based on the application at hand. For example, for a refrigerator, the connection logic/application 701 may only need to transmit a few packets on a periodic basis. For other applications (e.g., temperature sensors), the connection logic/application 701 may need to transmit more frequent updates.

Rather than a mobile device 611, in one embodiment, the IoT device 601 may be configured to establish a wireless connection with one or more intermediary IoT devices, which are located within range of the IoT hub 110. In this embodiment, any IoT devices 601 out of range of the IoT hub may be linked to the hub by forming a "chain" using other IoT devices.

In addition, while only a single mobile device 611 is illustrated in FIGS. 6-7 for simplicity, in one embodiment, multiple such mobile devices of different users may be configured to communicate with the IoT device 601. Moreover, the same techniques may be implemented for multiple other IoT devices, thereby forming an intermediary device data collection system across the entire home.

Moreover, in one embodiment, the techniques described herein may be used to collect various different types of pertinent data. For example, in one embodiment, each time the mobile device 611 connects with the IoT device 601, the identity of the user may be included with the collected data 605. In this manner, the IoT system may be used to track the behavior of different users within the home. For example, if used within a refrigerator, the collected data 605 may then include the identify of each user who passes by fridge, each user who opens the fridge, and the specific food items consumed by each user. Different types of data may be collected from other types of IoT devices. Using this data the system is able to determine, for example, which user washes clothes, which user watches TV on a given day, the times at which each user goes to sleep and wakes up, etc. All of this crowd-sourced data may then be compiled within the data repository 413 of the IoT hub and/or forwarded to an external service or user.

Another beneficial application of the techniques described herein is for monitoring elderly users who may need assistance. For this application, the mobile device 611 may be a very small token worn by the elderly user to collect the information in different rooms of the user's home. Each time the user opens the refrigerator, for example, this data will be included with the collected data 605 and transferred to the IoT hub 110 via the token. The IoT hub may then provide the data to one or more external users (e.g., the children or other individuals who care for the elderly user). If data has not been collected for a specified period of time (e.g., 12 hours), then this means that the elderly user has not been moving around the home and/or has not been opening the refrigerator. The IoT hub 110 or an external service connected to the IoT hub may then transmit an alert notification to these other individuals, informing them that they should check on the elderly user. In addition, the collected data 605 may include other pertinent information such as the food being consumed by the user and whether a trip to the grocery store is needed, whether and how frequently the elderly user is watching TV, the frequency with which the elderly user washes clothes, etc.

In another implementation, the if there is a problem with an electronic device such as a washer, refrigerator, HVAC system, etc, the collected data may include an indication of a part that needs to be replaced. In such a case, a notification may be sent to a technician with a request to fix the problem. The technician may then arrive at the home with the needed replacement part.

Figure 8:
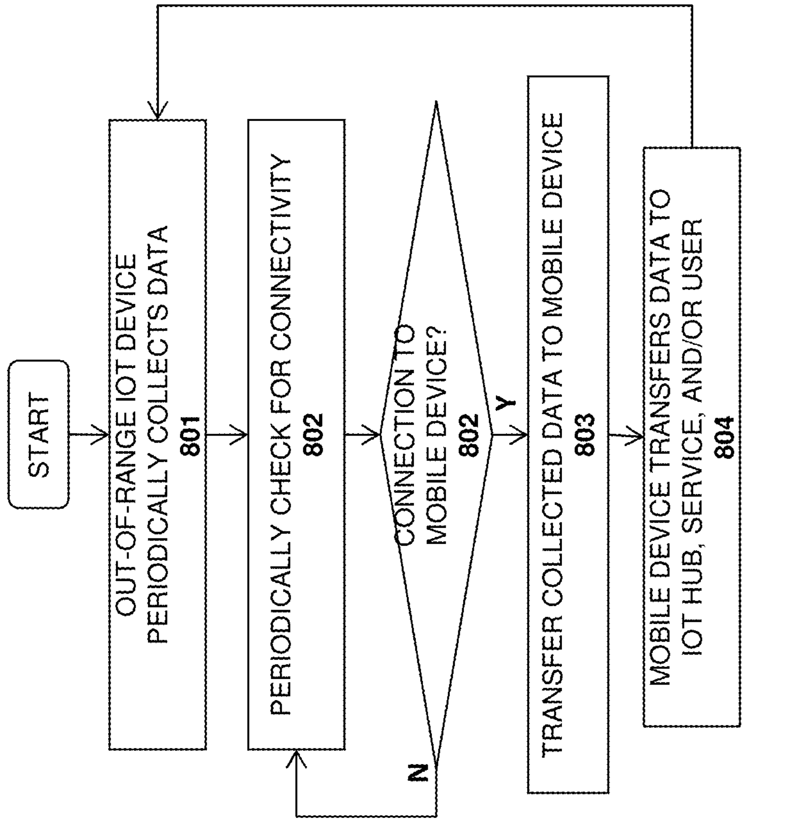
FIG. 8 illustrates a method in accordance with one embodiment of the invention.

A method in accordance with one embodiment of the invention is illustrated in FIG. 8. The method may be implemented within the context of the architectures described above, but is not limited to any particular architecture.

At 801, an IoT device which is out of range of the IoT hub periodically collects data (e.g., opening of the refrigerator door, food items used, etc). At 802 the IoT device periodically or continually checks for connectivity with a mobile device (e.g., using standard local wireless techniques for establishing a connection such as those specified by the BTLE standard). If the connection to the mobile device is established, determined at 802, then at 803, the collected data is transferred to the mobile device at 803. At 804, the mobile device transfers the data to the IoT hub, an external service and/or a user. As mentioned, the mobile device may transmit the data immediately if it is already connected (e.g., via a WiFi link).

Figure 9A:
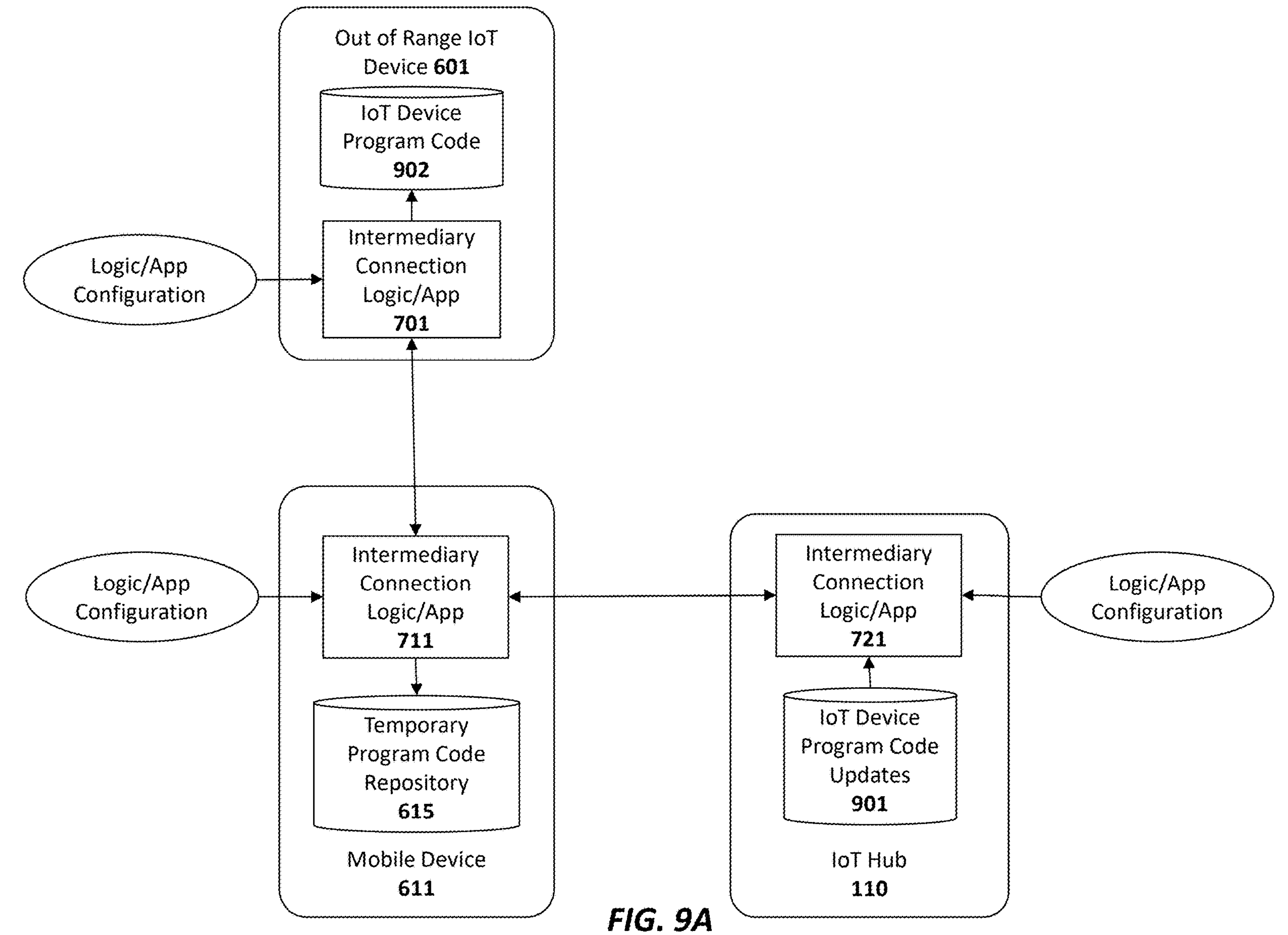
FIG. 9A illustrates an embodiment in which program code and data updates are provided to the IoT device.

In addition to collecting data from IoT devices, in one embodiment, the techniques described herein may be used to update or otherwise provide data to IoT devices. One example is shown in FIG. 9A, which shows an IoT hub 110 with program code updates 901 that need to be installed on an IoT device 601 (or a group of such IoT devices). The program code updates may include system updates, patches, configuration data and any other data needed for the IoT device to operate as desired by the user. In one embodiment, the user may specify configuration options for the IoT device 601 via a mobile device or computer which are then stored on the IoT hub 110 and provided to the IoT device using the techniques described herein. Specifically, in one embodiment, the intermediary connection logic/application 721 on the IoT hub 110 communicates with the intermediary connection logic/application 711 on the mobile device 611 to store the program code updates within a temporary storage 615. When the mobile device 611 enters the range of the IoT device 601, the intermediary connection logic/application 711 on the mobile device 611 connects with the intermediary/connection logic/application 701 on the IoT device 601 to provide the program code updates to the device. In one embodiment, the IoT device 601 may then enter into an automated update process to install the new program code updates and/or data.

Figure 9B:
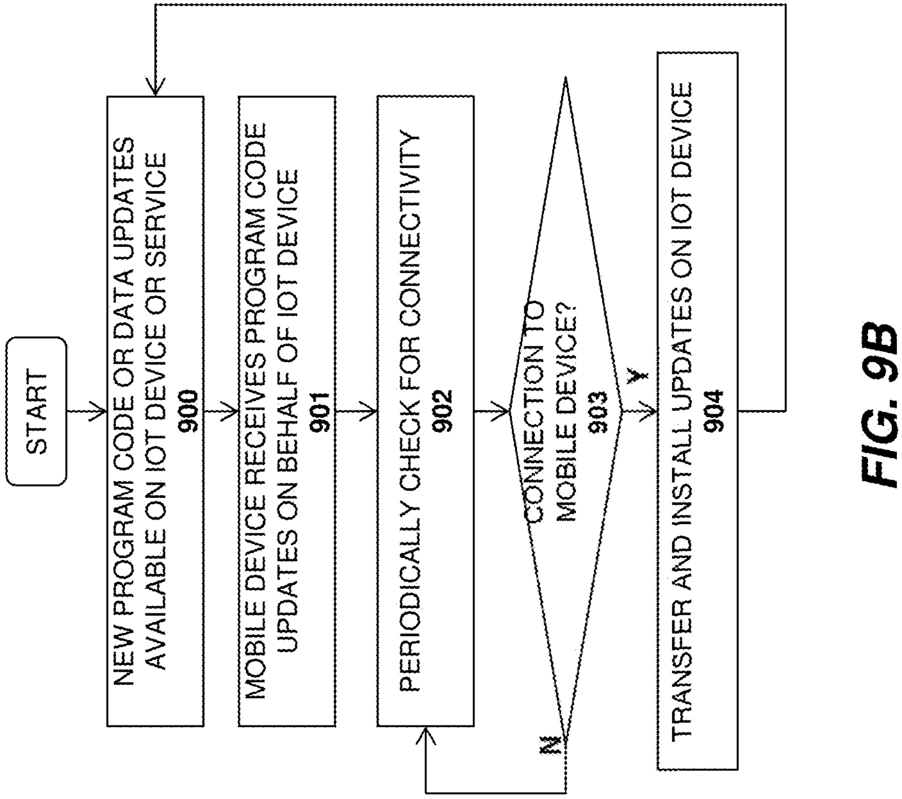
FIG. 9B illustrates an embodiment of a method in which program code and data updates are provided to the IoT device.

A method for updating an IoT device is shown in FIG. 9B. The method may be implemented within the context of the system architectures described above, but is not limited to any particular system architectures.

At 900 new program code or data updates are made available on the IoT hub and/or an external service (e.g., coupled to the mobile device over the Internet). At 901, the mobile device receives and stores the program code or data updates on behalf of the IoT device. The IoT device and/or mobile device periodically check to determine whether a connection has been established at 902. If a connection is established, determined at 903, then at 904 the updates are transferred to the IoT device and installed.

Embodiments for Improved Security

In one embodiment, the low power microcontroller 200 of each IoT device 101 and the low power logic/microcontroller 301 of the IoT hub 110 include a secure key store for storing encryption keys used by the embodiments described below (see, e.g., FIGS. 10-15 and associated text). Alternatively, the keys may be secured in a subscriber identify module (SIM) as discussed below.

Figure 10:
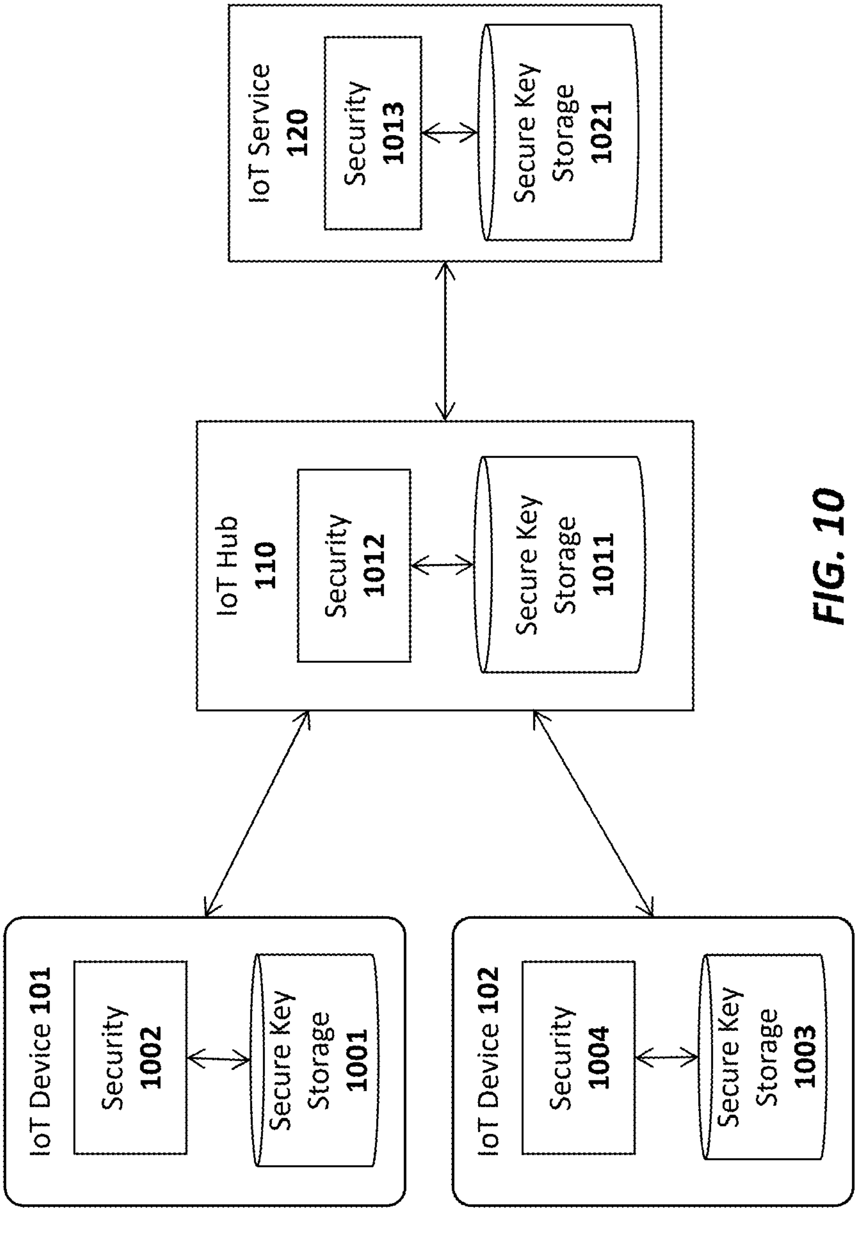
FIG. 10 illustrates a high level view of one embodiment of a security architecture.

FIG. 10 illustrates a high level architecture which uses public key infrastructure (PKI) techniques and/or symmetric key exchange/encryption techniques to encrypt communications between the IoT Service 120, the IoT hub 110 and the IoT devices 101-102.

Embodiments which use public/private key pairs will first be described, followed by embodiments which use symmetric key exchange/encryption techniques. In particular, in an embodiment which uses PKI, a unique public/private key pair is associated with each IoT device 101-102, each IoT hub 110 and the IoT service 120. In one embodiment, when a new IoT hub 110 is set up, its public key is provided to the IoT service 120 and when a new IoT device 101 is set up, it's public key is provided to both the IoT hub 110 and the IoT service 120. Various techniques for securely exchanging the public keys between devices are described below. In one embodiment, all public keys are signed by a master key known to all of the receiving devices (i.e., a form of certificate) so that any receiving device can verify the validity of the public keys by validating the signatures. Thus, these certificates would be exchanged rather than merely exchanging the raw public keys.

As illustrated, in one embodiment, each IoT device 101, 102 includes a secure key storage 1001, 1003, respectively, for security storing each device's private key. Security subsystem 1002, 1304 then utilizes the securely stored private keys to perform the encryption/decryption operations described herein. Similarly, the IoT hub 110 includes a secure storage 1011 for storing the IoT hub private key and the public keys of the IoT devices 101-102 and the IoT service 120; as well as security subsystem 1012 for using the keys to perform encryption/decryption operations. Finally, the IoT service 120 may include a secure storage 1021 for security storing its own private key, the public keys of various IoT devices and IoT hubs, and a security subsystem 1013 for using the keys to encrypt/decrypt communication with IoT hubs and devices. In one embodiment, when the IoT hub 110 receives a public key certificate from an IoT device it can verify it (e.g., by validating the signature using the master key as described above), and then extract the public key from within it and store that public key in it's secure key store 1011.

By way of example, in one embodiment, when the IoT service 120 needs to transmit a command or data to an IoT device 101 (e.g., a command to unlock a door, a request to read a sensor, data to be processed/displayed by the IoT device, etc) the security subsystem 1013 encrypts the data/command using the public key of the IoT device 101 to generate an encrypted IoT device packet. In one embodiment, it then encrypts the IoT device packet using the public key of the IoT hub 110 to generate an IoT hub packet and transmits the IoT hub packet to the IoT hub 110. In one embodiment, the service 120 signs the encrypted message with it's private key or the master key mentioned above so that the device 101 can verify it is receiving an unaltered message from a trusted source. The device 101 may then validate the signature using the public key corresponding to the private key and/or the master key. As mentioned above, symmetric key exchange/encryption techniques may be used instead of public/private key encryption. In these embodiments, rather than privately storing one key and providing a corresponding public key to other devices, the devices may each be provided with a copy of the same symmetric key to be used for encryption and to validate signatures. One example of a symmetric key algorithm is the Advanced Encryption Standard (AES), although the underlying principles of the invention are not limited to any type of specific symmetric keys.

Using a symmetric key implementation, each device 101 enters into a secure key exchange protocol to exchange a symmetric key with the IoT hub 110. A secure key provisioning protocol such as the Dynamic Symmetric Key Provisioning Protocol (DSKPP) may be used to exchange the keys over a secure communication channel (see, e.g., Request for Comments (RFC) 6063). However, the underlying principles of the invention are not limited to any particular key provisioning protocol.

Once the symmetric keys have been exchanged, they may be used by each device 101 and the IoT hub 110 to encrypt communications. Similarly, the IoT hub 110 and IoT service 120 may perform a secure symmetric key exchange and then use the exchanged symmetric keys to encrypt communications. In one embodiment a new symmetric key is exchanged periodically between the devices 101 and the hub 110 and between the hub 110 and the IoT service 120. In one embodiment, a new symmetric key is exchanged with each new communication session between the devices 101, the hub 110, and the service 120 (e.g., a new key is generated and securely exchanged for each communication session). In one embodiment, if the security module 1012 in the IoT hub is trusted, the service 120 could negotiate a session key with the hub security module 1312 and then the security module 1012 would negotiate a session key with each device 120. Messages from the service 120 would then be decrypted and verified in the hub security module 1012 before being re-encrypted for transmission to the device 101.

In one embodiment, to prevent a compromise on the hub security module 1012 a one-time (permanent) installation key may be negotiated between the device 101 and service 120 at installation time. When sending a message to a device 101 the service 120 could first encrypt/MAC with this device installation key, then encrypt/MAC that with the hub's session key. The hub 110 would then verify and extract the encrypted device blob and send that to the device.

In one embodiment of the invention, a counter mechanism is implemented to prevent replay attacks. For example, each successive communication from the device 101 to the hub 110 (or vice versa) may be assigned a continually increasing counter value. Both the hub 110 and device 101 will track this value and verify that the value is correct in each successive communication between the devices. The same techniques may be implemented between the hub 110 and the service 120. Using a counter in this manner would make it more difficult to spoof the communication between each of the devices (because the counter value would be incorrect). However, even without this a shared installation key between the service and device would prevent network (hub) wide attacks to all devices.

In one embodiment, when using public/private key encryption, the IoT hub 110 uses its private key to decrypt the IoT hub packet and generate the encrypted IoT device packet, which it transmits to the associated IoT device 101. The IoT device 101 then uses its private key to decrypt the IoT device packet to generate the command/data originated from the IoT service 120. It may then process the data and/or execute the command. Using symmetric encryption, each device would encrypt and decrypt with the shared symmetric key. If either case, each transmitting device may also sign the message with it's private key so that the receiving device can verify it's authenticity.

A different set of keys may be used to encrypt communication from the IoT device 101 to the IoT hub 110 and to the IoT service 120. For example, using a public/private key arrangement, in one embodiment, the security subsystem 1002 on the IoT device 101 uses the public key of the IoT hub 110 to encrypt data packets sent to the IoT hub 110. The security subsystem 1012 on the IoT hub 110 may then decrypt the data packets using the IoT hub's private key. Similarly, the security subsystem 1002 on the IoT device 101 and/or the security subsystem 1012 on the IoT hub 110 may encrypt data packets sent to the IoT service 120 using the public key of the IoT service 120 (which may then be decrypted by the security subsystem 1013 on the IoT service 120 using the service's private key). Using symmetric keys, the device 101 and hub 110 may share a symmetric key while the hub and service 120 may share a different symmetric key.

While certain specific details are set forth above in the description above, it should be noted that the underlying principles of the invention may be implemented using various different encryption techniques. For example, while some embodiments discussed above use asymmetric public/private key pairs, an alternate embodiment may use symmetric keys securely exchanged between the various IoT devices 101-102, IoT hubs 110, and the IoT service 120. Moreover, in some embodiments, the data/command itself is not encrypted, but a key is used to generate a signature over the data/command (or other data structure). The recipient may then use its key to validate the signature.

Figure 11:
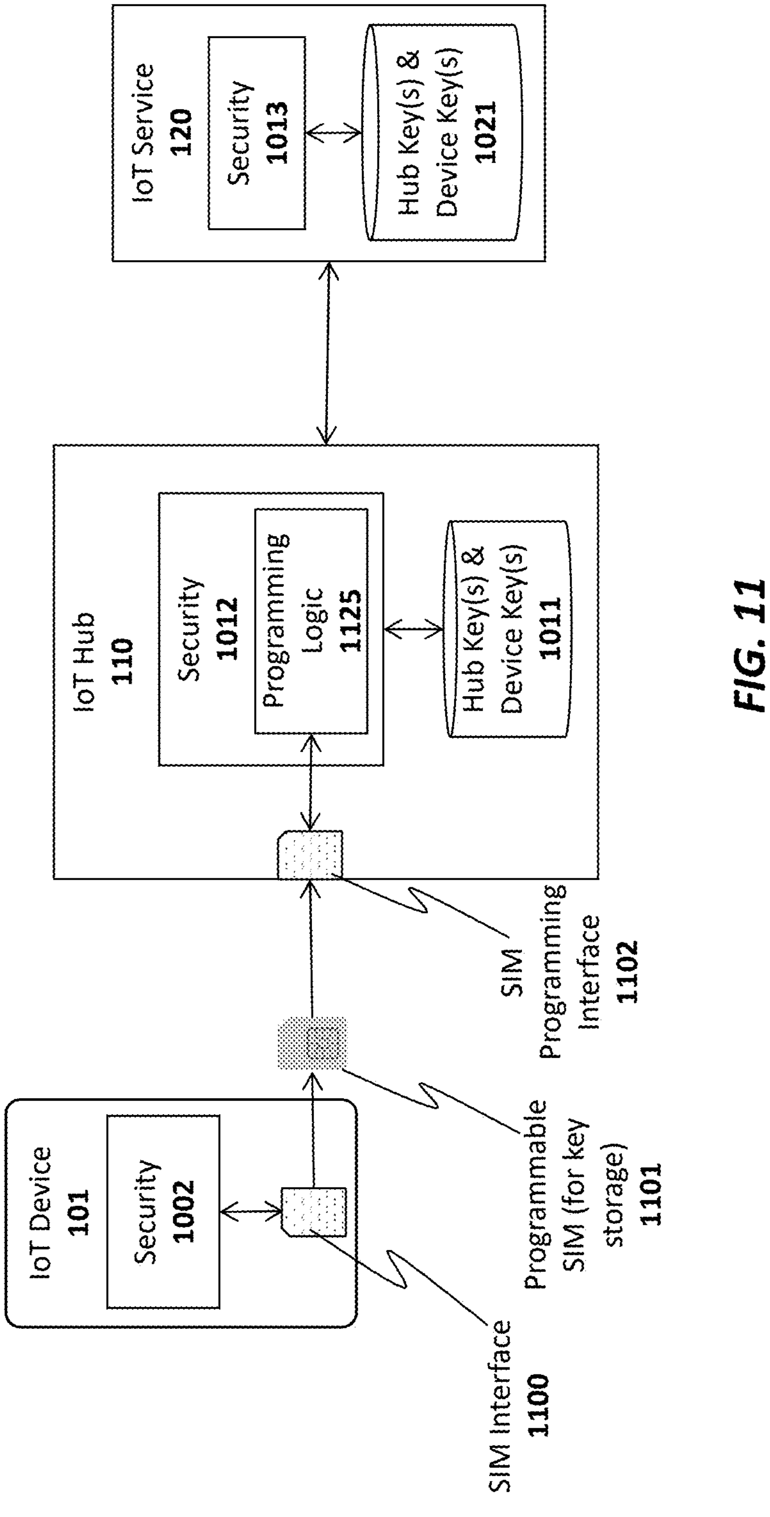
FIG. 11 illustrates one embodiment of an architecture in which a subscriber identity module (SIM) is used to store keys on IoT devices.

As illustrated in FIG. 11, in one embodiment, the secure key storage on each IoT device 101 is implemented using a programmable subscriber identity module (SIM) 1101. In this embodiment, the IoT device 101 may initially be provided to the end user with an un-programmed SIM card 1101 seated within a SIM interface 1100 on the IoT device 101. In order to program the SIM with a set of one or more encryption keys, the user takes the programmable SIM card 1101 out of the SIM interface 500 and inserts it into a SIM programming interface 1102 on the IoT hub 110. Programming logic 1125 on the IoT hub then securely programs the SIM card 1101 to register/pair the IoT device 101 with the IoT hub 110 and IoT service 120. In one embodiment, a public/private key pair may be randomly generated by the programming logic 1125 and the public key of the pair may then be stored in the IoT hub's secure storage device 411 while the private key may be stored within the programmable SIM 1101. In addition, the programming logic 525 may store the public keys of the IoT hub 110, the IoT service 120, and/or any other IoT devices 101 on the SIM card 1401 (to be used by the security subsystem 1302 on the IoT device 101 to encrypt outgoing data). Once the SIM 1101 is programmed, the new IoT device 101 may be provisioned with the IoT Service 120 using the SIM as a secure identifier (e.g., using existing techniques for registering a device using a SIM). Following provisioning, both the IoT hub 110 and the IoT service 120 will securely store a copy of the IoT device's public key to be used when encrypting communication with the IoT device 101.

The techniques described above with respect to FIG. 11 provide enormous flexibility when providing new IoT devices to end users. Rather than requiring a user to directly register each SIM with a particular service provider upon sale/purchase (as is currently done), the SIM may be programmed directly by the end user via the IoT hub 110 and the results of the programming may be securely communicated to the IoT service 120. Consequently, new IoT devices 101 may be sold to end users from online or local retailers and later securely provisioned with the IoT service 120.

While the registration and encryption techniques are described above within the specific context of a SIM (Subscriber Identity Module), the underlying principles of the invention are not limited to a "SIM" device. Rather, the underlying principles of the invention may be implemented using any type of device having secure storage for storing a set of encryption keys. Moreover, while the embodiments above include a removable SIM device, in one embodiment, the SIM device is not removable but the IoT device itself may be inserted within the programming interface 1102 of the IoT hub 110.

In one embodiment, rather than requiring the user to program the SIM (or other device), the SIM is pre-programmed into the IoT device 101, prior to distribution to the end user. In this embodiment, when the user sets up the IoT device 101, various techniques described herein may be used to securely exchange encryption keys between the IoT hub 110/IoT service 120 and the new IoT device 101.

Figure 12A:
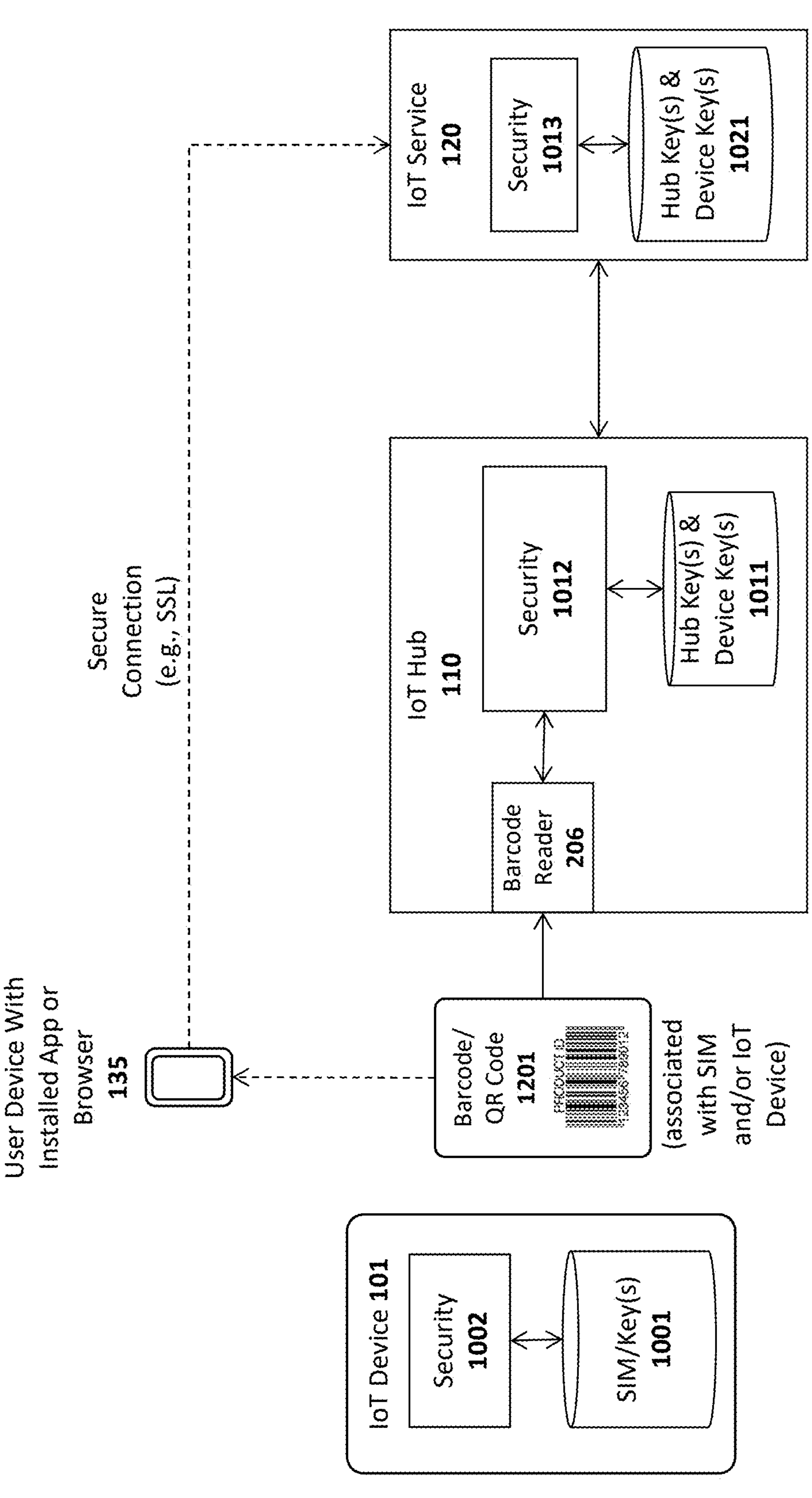
FIG. 12A illustrates one embodiment in which IoT devices are registered using barcodes or QR codes.

For example, as illustrated in FIG. 12A each IoT device 101 or SIM 401 may be packaged with a barcode or QR code 1501 uniquely identifying the IoT device 101 and/or SIM 1001. In one embodiment, the barcode or QR code 1201 comprises an encoded representation of the public key for the IoT device 101 or SIM 1001. Alternatively, the barcode or QR code 1201 may be used by the IoT hub 110 and/or IoT service 120 to identify or generate the public key (e.g., used as a pointer to the public key which is already stored in secure storage). The barcode or QR code 601 may be printed on a separate card (as shown in FIG. 12A) or may be printed directly on the IoT device itself. Regardless of where the barcode is printed, in one embodiment, the IoT hub 110 is equipped with a barcode reader 206 for reading the barcode and providing the resulting data to the security subsystem 1012 on the IoT hub 110 and/or the security subsystem 1013 on the IoT service 120. The security subsystem 1012 on the IoT hub 110 may then store the public key for the IoT device within its secure key storage 1011 and the security subsystem 1013 on the IoT service 120 may store the public key within its secure storage 1021 (to be used for subsequent encrypted communication).

In one embodiment, the data contained in the barcode or QR code 1201 may also be captured via a user device 135 (e.g., such as an iPhone or Android device) with an installed IoT app or browser-based applet designed by the IoT service provider. Once captured, the barcode data may be securely communicated to the IoT service 120 over a secure connection (e.g., such as a secure sockets layer (SSL) connection). The barcode data may also be provided from the client device 135 to the IoT hub 110 over a secure local connection (e.g., over a local WiFi or Bluetooth LE connection).

The security subsystem 1002 on the IoT device 101 and the security subsystem 1012 on the IoT hub 110 may be implemented using hardware, software, firmware or any combination thereof. For example, in one embodiment, the security subsystem 1002, 1012 is implemented within the chips used for establishing the local communication channel 130 between the IoT device 101 and the IoT hub 110 (e.g., the Bluetooth LE chip if the local channel 130 is Bluetooth LE). Regardless of the specific location of the security subsystem 1002, 1012, in one embodiment, the security subsystem 1002, 1012 is designed to establish a secure execution environment for executing certain types of program code. This may be implemented, for example, by using TrustZone technology (available on some ARM processors) and/or Trusted Execution Technology (designed by Intel). Of course, the underlying principles of the invention are not limited to any particular type of secure execution technology.

In one embodiment, the barcode or QR code 1501 may be used to pair each IoT device 101 with the IoT hub 110. For example, rather than using the standard wireless pairing process currently used to pair Bluetooth LE devices, a pairing code embedded within the barcode or QR code 1501 may be provided to the IoT hub 110 to pair the IoT hub with the corresponding IoT device.

Figure 12B:
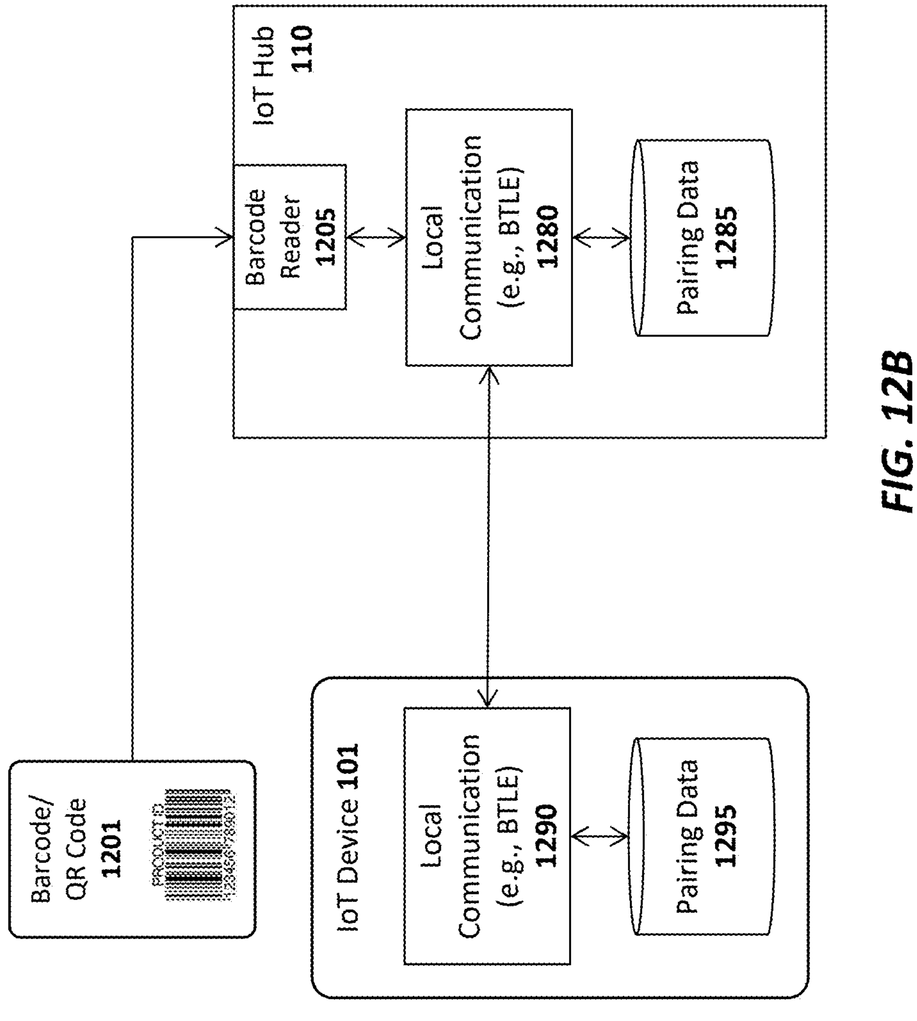
FIG. 12B illustrates one embodiment in which pairing is performed using barcodes or QR codes.

FIG. 12B illustrates one embodiment in which the barcode reader 206 on the IoT hub 110 captures the barcode/QR code 1201 associated with the IoT device 101. As mentioned, the barcode/QR code 1201 may be printed directly on the IoT device 101 or may be printed on a separate card provided with the IoT device 101. In either case, the barcode reader 206 reads the pairing code from the barcode/QR code 1201 and provides the pairing code to the local communication module 1280. In one embodiment, the local communication module 1280 is a Bluetooth LE chip and associated software, although the underlying principles of the invention are not limited to any particular protocol standard. Once the pairing code is received, it is stored in a secure storage containing pairing data 1285 and the IoT device 101 and IoT hub 110 are automatically paired. Each time the IoT hub is paired with a new IoT device in this manner, the pairing data for that pairing is stored within the secure storage 685. In one embodiment, once the local communication module 1280 of the IoT hub 110 receives the pairing code, it may use the code as a key to encrypt communications over the local wireless channel with the IoT device 101.

Similarly, on the IoT device 101 side, the local communication module 1590 stores pairing data within a local secure storage device 1595 indicating the pairing with the IoT hub. The pairing data 1295 may include the pre-programmed pairing code identified in the barcode/QR code 1201. The pairing data 1295 may also include pairing data received from the local communication module 1280 on the IoT hub 110 required for establishing a secure local communication channel (e.g., an additional key to encrypt communication with the IoT hub 110).

Thus, the barcode/QR code 1201 may be used to perform local pairing in a far more secure manner than current wireless pairing protocols because the pairing code is not transmitted over the air. In addition, in one embodiment, the same barcode/QR code 1201 used for pairing may be used to identify encryption keys to build a secure connection from the IoT device 101 to the IoT hub 110 and from the IoT hub 110 to the IoT service 120.

Figure 13:
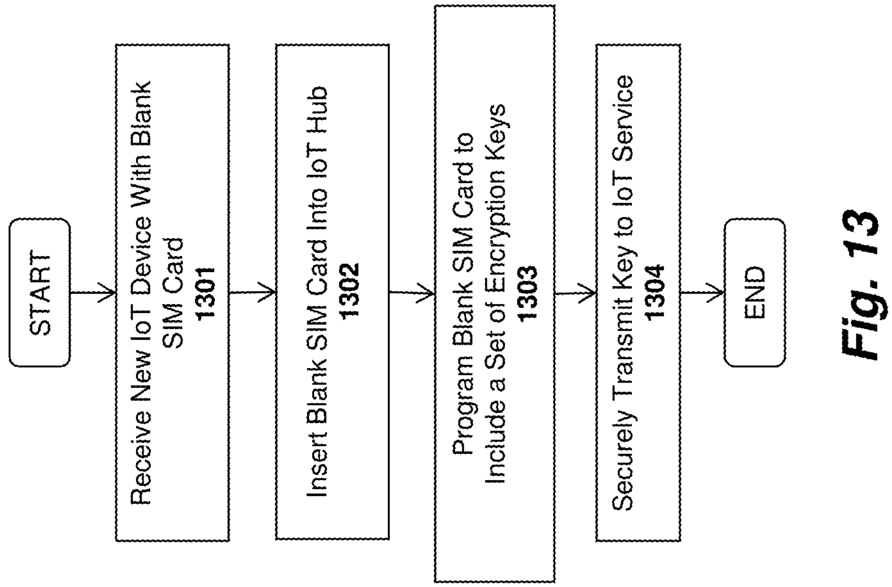
FIG. 13 illustrates one embodiment of a method for programming a SIM using an IoT hub.

A method for programming a SIM card in accordance with one embodiment of the invention is illustrated in FIG. 13. The method may be implemented within the system architecture described above, but is not limited to any particular system architecture.

At 1301, a user receives a new IoT device with a blank SIM card and, at 1602, the user inserts the blank SIM card into an IoT hub. At 1303, the user programs the blank SIM card with a set of one or more encryption keys. For example, as mentioned above, in one embodiment, the IoT hub may randomly generate a public/private key pair and store the private key on the SIM card and the public key in its local secure storage. In addition, at 1304, at least the public key is transmitted to the IoT service so that it may be used to identify the IoT device and establish encrypted communication with the IoT device. As mentioned above, in one embodiment, a programmable device other than a "SIM" card may be used to perform the same functions as the SIM card in the method shown in FIG. 13.

Figure 14:
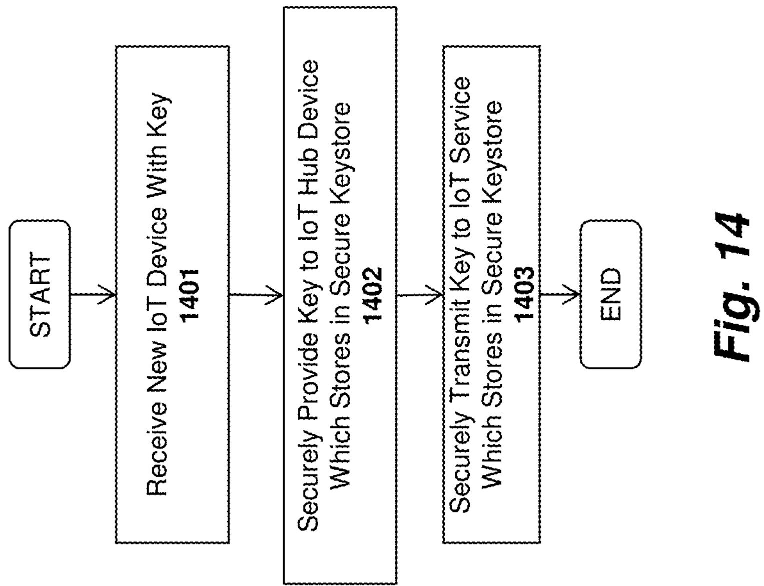
FIG. 14 illustrates one embodiment of a method for registering an IoT device with an IoT hub and IoT service.

A method for integrating a new IoT device into a network is illustrated in FIG. 14. The method may be implemented within the system architecture described above, but is not limited to any particular system architecture.

At 1401, a user receives a new IoT device to which an encryption key has been pre-assigned. At 1402, the key is securely provided to the IoT hub. As mentioned above, in one embodiment, this involves reading a barcode associated with the IoT device to identify the public key of a public/private key pair assigned to the device. The barcode may be read directly by the IoT hub or captured via a mobile device via an app or bowser. In an alternate embodiment, a secure communication channel such as a Bluetooth LE channel, a near field communication (NFC) channel or a secure WiFi channel may be established between the IoT device and the IoT hub to exchange the key. Regardless of how the key is transmitted, once received, it is stored in the secure keystore of the IoT hub device. As mentioned above, various secure execution technologies may be used on the IoT hub to store and protect the key such as Secure Enclaves, Trusted Execution Technology (TXT), and/or Trustzone. In addition, at 803, the key is securely transmitted to the IoT service which stores the key in its own secure keystore. It may then use the key to encrypt communication with the IoT device. One again, the exchange may be implemented using a certificate/signed key. Within the hub 110 it is particularly important to prevent modification/addition/removal of the stored keys.

Figure 15:
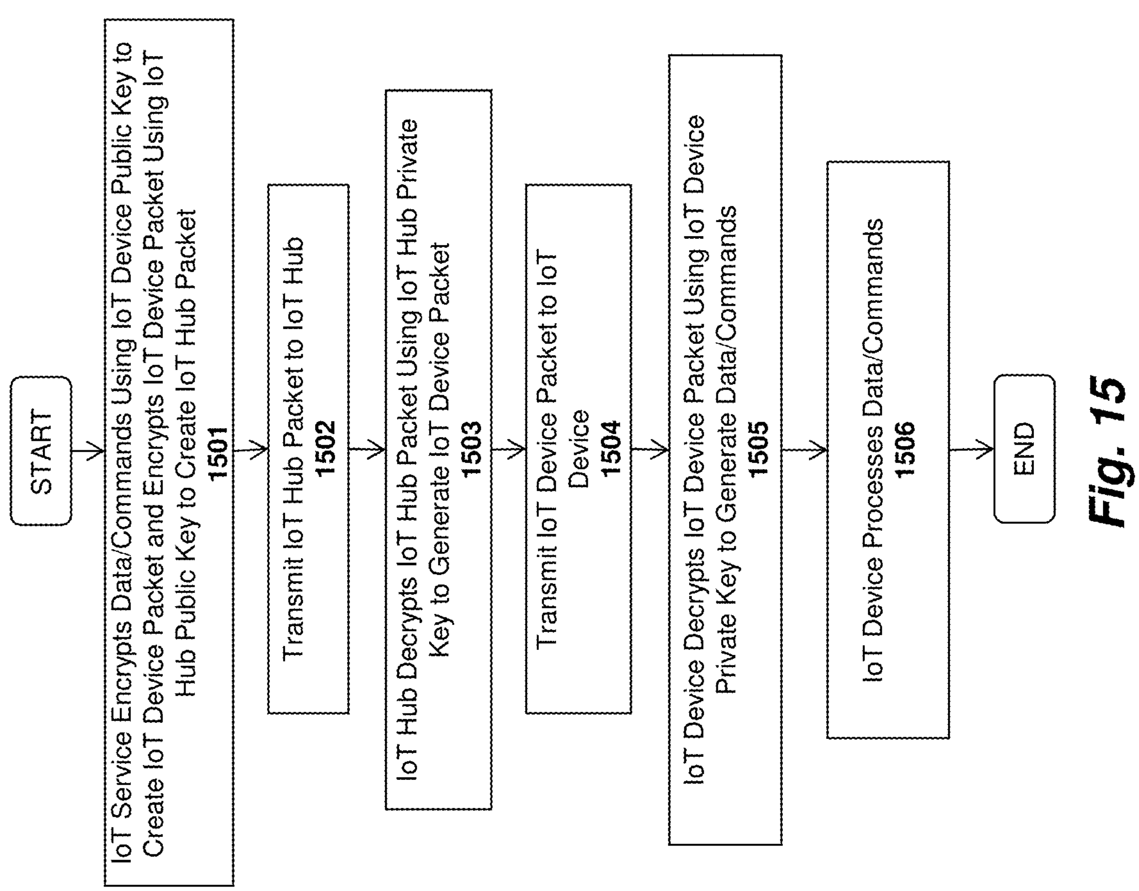
FIG. 15 illustrates one embodiment of a method for encrypting data to be transmitted to an IoT device.

A method for securely communicating commands/data to an IoT device using public/private keys is illustrated in FIG. 15. The method may be implemented within the system architecture described above, but is not limited to any particular system architecture.

At 1501, the IoT service encrypts the data/commands using the IoT device public key to create an IoT device packet. It then encrypts the IoT device packet using IoT hub's public key to create the IoT hub packet (e.g., creating an IoT hub wrapper around the IoT device packet). At 1502, the IoT service transmits the IoT hub packet to the IoT hub. At 1503, the IoT hub decrypts the IoT hub packet using the IoT hub's private key to generate the IoT device packet. At 1504 it then transmits the IoT device packet to the IoT device which, at 1505, decrypts the IoT device packet using the IoT device private key to generate the data/commands. At 1506, the IoT device processes the data/commands.

In an embodiment which uses symmetric keys, a symmetric key exchange may be negotiated between each of the devices (e.g., each device and the hub and between the hub and the service). Once the key exchange is complete, each transmitting device encrypts and/or signs each transmission using the symmetric key before transmitting data to the receiving device.

Apparatus and Method for Establishing Secure Communication Channels in an Internet of Things (IoT) System In one embodiment of the invention, encryption and decryption of data is performed between the IoT service 120 and each IoT device 101, regardless of the intermediate devices used to support the communication channel (e.g., such as the user's mobile device 611 and/or the IoT hub 110). One embodiment which communicates via an IoT hub 110 is illustrated in FIG. 16A and another embodiment which does not require an IoT hub is illustrated in FIG. 16B.

Figure 16A:
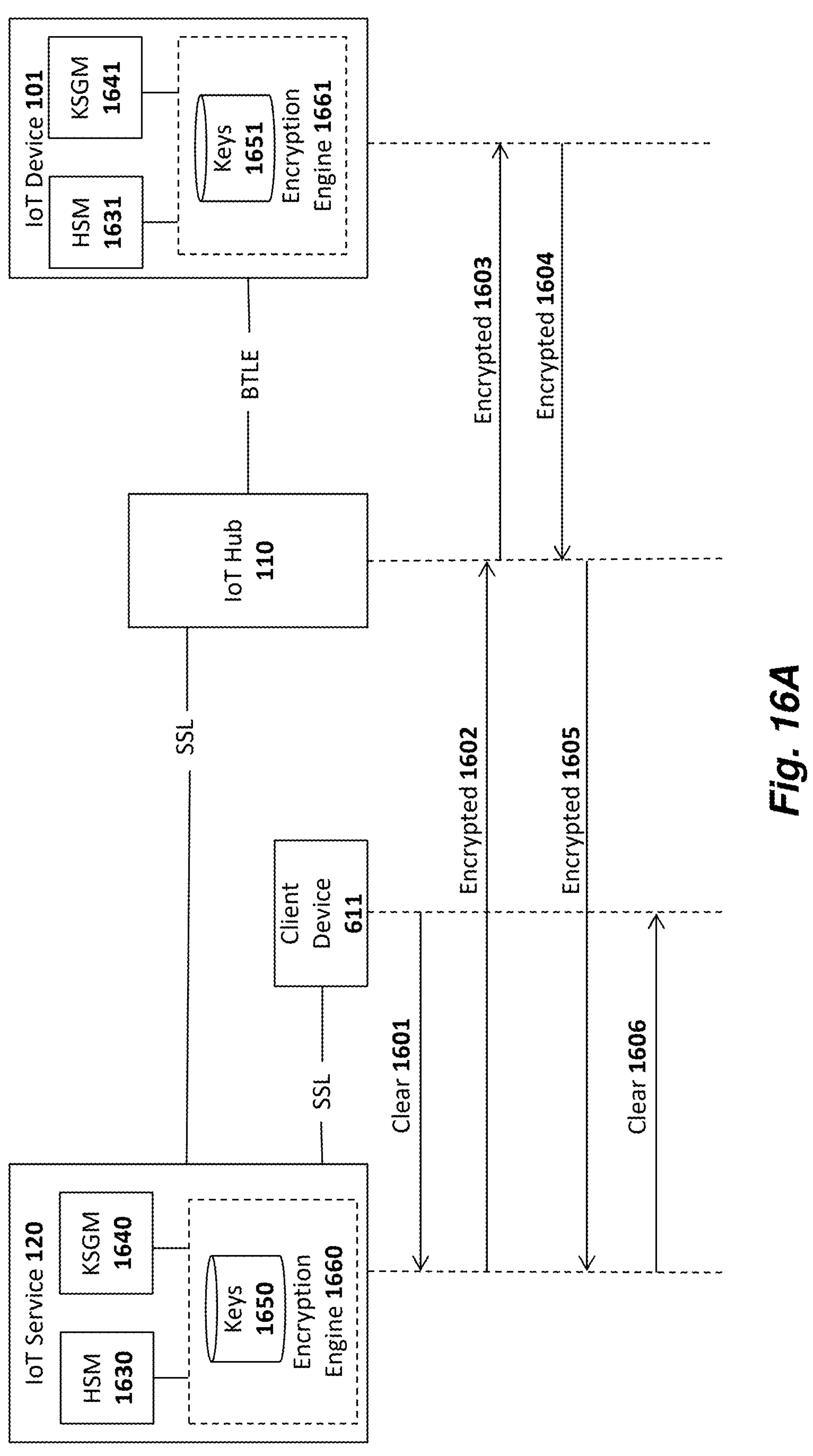
FIGS. 16A-B illustrate different embodiments of the invention for encrypting data between an IoT service and an IoT device.
Figure 16B:
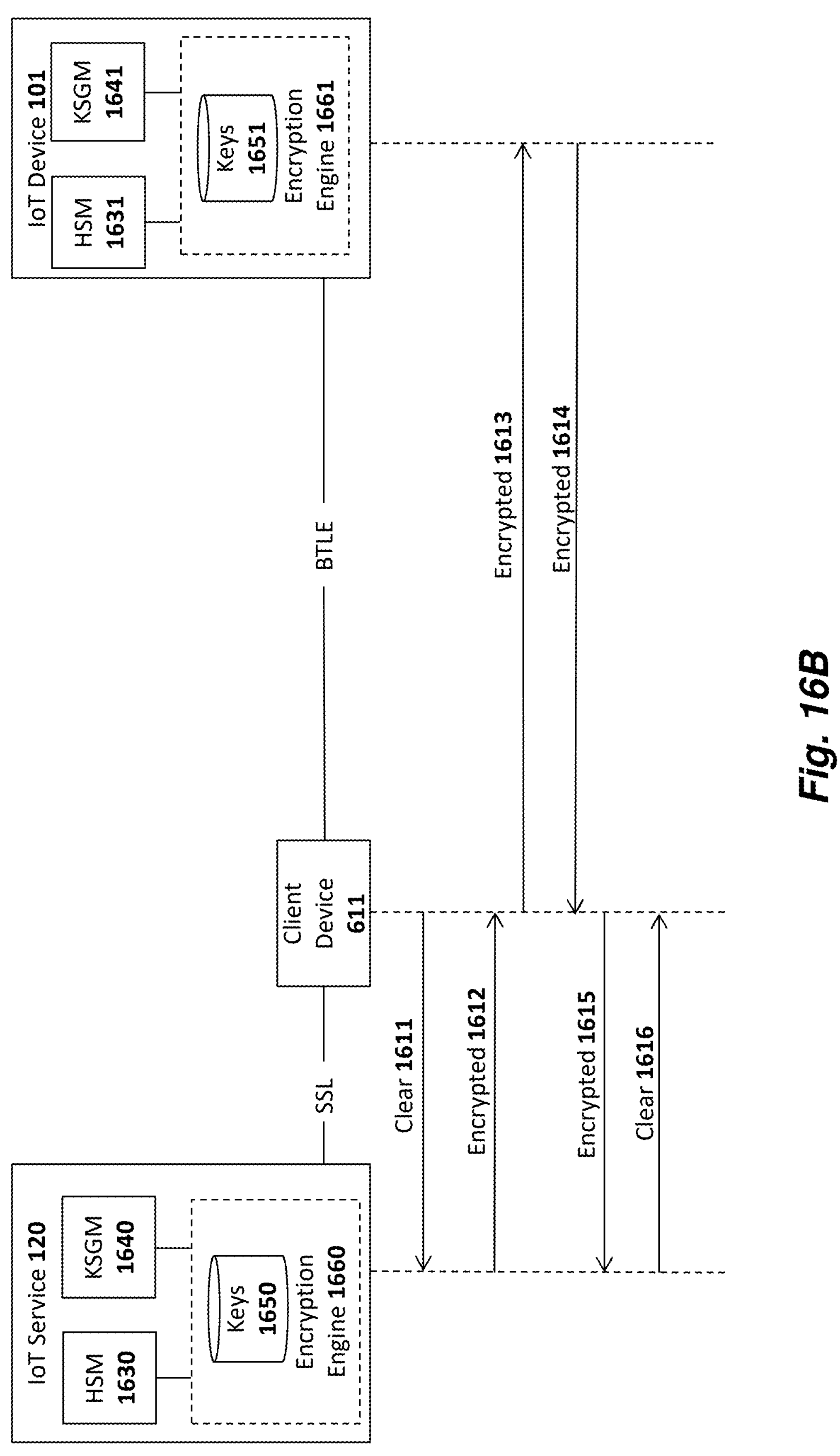

Turning first to FIG. 16A, the IoT service 120 includes an encryption engine 1660 which manages a set of "service session keys" 1650 and each IoT device 101 includes an encryption engine 1661 which manages a set of "device session keys" 1651 for encrypting/decrypting communication between the IoT device 101 and IoT service 120. The encryption engines may rely on different hardware modules when performing the security/encryption techniques described herein including a hardware security module 1630-1631 for (among other things) generating a session public/private key pair and preventing access to the private session key of the pair and a key stream generation module 1640-1641 for generating a key stream using a derived secret. In one embodiment, the service session keys 1650 and the device session keys 1651 comprise related public/private key pairs. For example, in one embodiment, the device session keys 1651 on the IoT device 101 include a public key of the IoT service 120 and a private key of the IoT device 101. As discussed in detail below, in one embodiment, to establish a secure communication session, the public/private session key pairs, 1650 and 1651, are used by each encryption engine, 1660 and 1661, respectively, to generate the same secret which is then used by the SKGMs 1640-1641 to generate a key stream to encrypt and decrypt communication between the IoT service 120 and the IoT device 101. Additional details associated with generation and use of the secret in accordance with one embodiment of the invention are provided below.

In FIG. 16A, once the secret has been generated using the keys 1650-1651, the client will always send messages to the IoT device 101 through the IoT service 120, as indicated by Clear transaction 1611. "Clear" as used herein is meant to indicate that the underlying message is not encrypted using the encryption techniques described herein. However, as illustrated, in one embodiment, a secure sockets layer (SSL) channel or other secure channel (e.g., an Internet Protocol Security (IPSEC) channel) is established between the client device 611 and IoT service 120 to protect the communication. The encryption engine 1660 on the IoT service 120 then encrypts the message using the generated secret and transmits the encrypted message to the IoT hub 110 at 1602. Rather than using the secret to encrypt the message directly, in one embodiment, the secret and a counter value are used to generate a key stream, which is used to encrypt each message packet. Details of this embodiment are described below with respect to FIG. 17.

As illustrated, an SSL connection or other secure channel may be established between the IoT service 120 and the IoT hub 110. The IoT hub 110 (which does not have the ability to decrypt the message in one embodiment) transmits the encrypted message to the IoT device at 1603 (e.g., over a Bluetooth Low Energy (BTLE) communication channel). The encryption engine 1661 on the IoT device 101 may then decrypt the message using the secret and process the message contents. In an embodiment which uses the secret to generate a key stream, the encryption engine 1661 may generate the key stream using the secret and a counter value and then use the key stream for decryption of the message packet.

The message itself may comprise any form of communication between the IoT service 120 and IoT device 101. For example, the message may comprise a command packet instructing the IoT device 101 to perform a particular function such as taking a measurement and reporting the result back to the client device 611 or may include configuration data to configure the operation of the IoT device 101.

If a response is required, the encryption engine 1661 on the IoT device 101 uses the secret or a derived key stream to encrypt the response and transmits the encrypted response to the IoT hub 110 at 1604, which forwards the response to the IoT service 120 at 1605. The encryption engine 1660 on the IoT service 120 then decrypts the response using the secret or a derived key stream and transmits the decrypted response to the client device 611 at 1606 (e.g., over the SSL or other secure communication channel).

FIG. 16B illustrates an embodiment which does not require an IoT hub. Rather, in this embodiment, communication between the IoT device 101 and IoT service 120 occurs through the client device 611 (e.g., as in the embodiments described above with respect to FIGS. 6-9B). In this embodiment, to transmit a message to the IoT device 101 the client device 611 transmits an unencrypted version of the message to the IoT service 120 at 1611. The encryption engine 1660 encrypts the message using the secret or the derived key stream and transmits the encrypted message back to the client device 611 at 1612. The client device 611 then forwards the encrypted message to the IoT device 101 at 1613, and the encryption engine 1661 decrypts the message using the secret or the derived key stream. The IoT device 101 may then process the message as described herein. If a response is required, the encryption engine 1661 encrypts the response using the secret and transmits the encrypted response to the client device 611 at 1614, which forwards the encrypted response to the IoT service 120 at 1615. The encryption engine 1660 then decrypts the response and transmits the decrypted response to the client device 611 at 1616.

Figure 17:
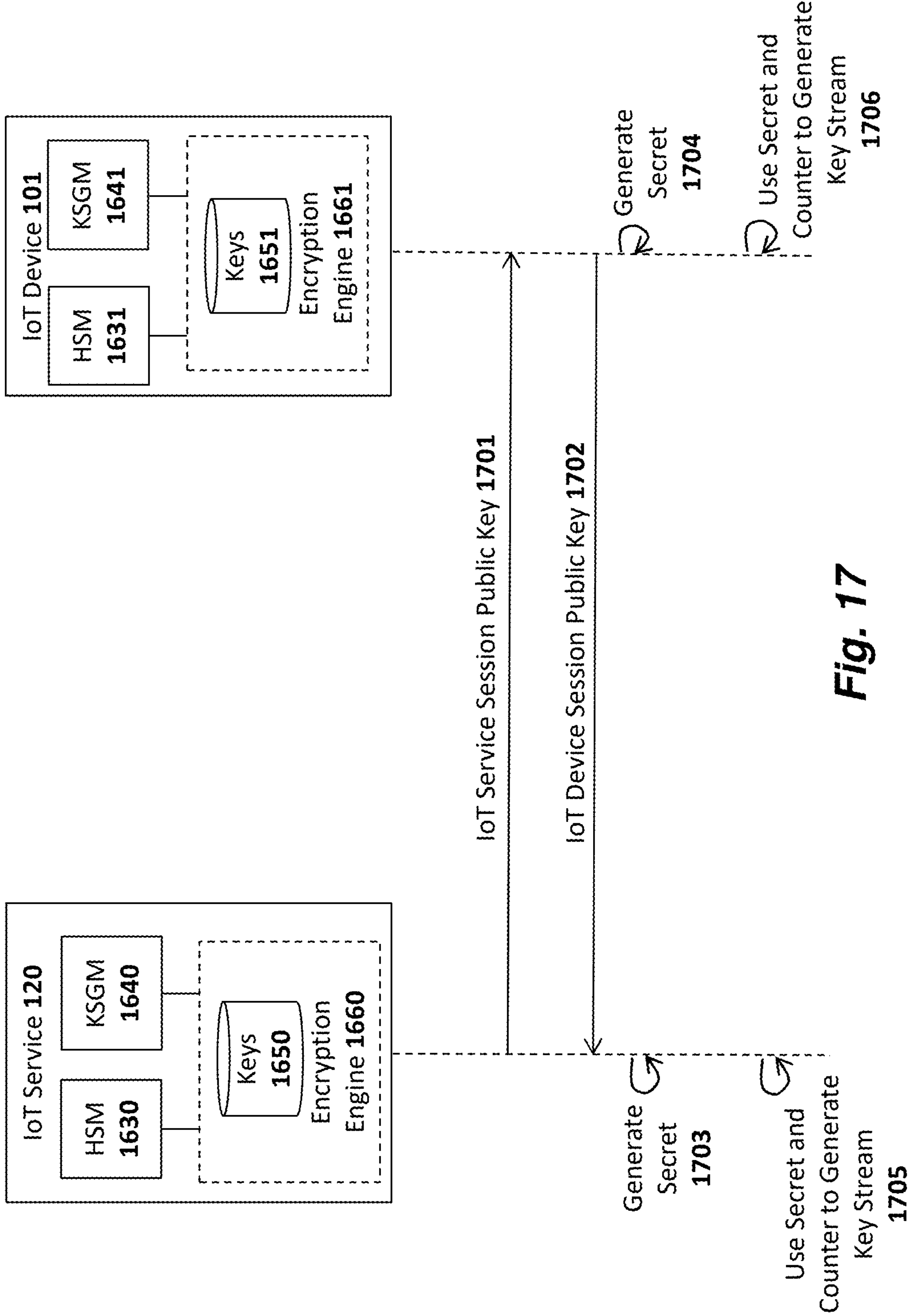
FIG. 17 illustrates embodiments of the invention for performing a secure key exchange, generating a common secret, and using the secret to generate a key stream.

FIG. 17 illustrates a key exchange and key stream generation which may initially be performed between the IoT service 120 and the IoT device 101. In one embodiment, this key exchange may be performed each time the IoT service 120 and IoT device 101 establish a new communication session. Alternatively, the key exchange may be performed and the exchanged session keys may be used for a specified period of time (e.g., a day, a week, etc). While no intermediate devices are shown in FIG. 17 for simplicity, communication may occur through the IoT hub 110 and/or the client device 611.

In one embodiment, the encryption engine 1660 of the IoT service 120 sends a command to the HSM 1630 (e.g., which may be such as a CloudHSM offered by Amazon®) to generate a session public/private key pair. The HSM 1630 may subsequently prevent access to the private session key of the pair. Similarly, the encryption engine on the IoT device 101 may transmit a command to the HSM 1631 (e.g., such as an Atecc508 HSM from Atmel Corporation®) which generates a session public/private key pair and prevents access to the session private key of the pair. Of course, the underlying principles of the invention are not limited to any specific type of encryption engine or manufacturer.

In one embodiment, the IoT service 120 transmits its session public key generated using the HSM 1630 to the IoT device 101 at 1701. The IoT device uses its HSM 1631 to generate its own session public/private key pair and, at 1702, transmits its public key of the pair to the IoT service 120. In one embodiment, the encryption engines 1660-1661 use an Elliptic curve Diffie-Hellman (ECDH) protocol, which is an anonymous key agreement that allows two parties with an elliptic curve public-private key pair, to establish a shared secret. In one embodiment, using these techniques, at 1703, the encryption engine 1660 of the IoT service 120 generates the secret using the IoT device session public key and its own session private key. Similarly, at 1704, the encryption engine 1661 of the IoT device 101 independently generates the same secret using the IoT service 120 session public key and its own session private key. More specifically, in one embodiment, the encryption engine 1660 on the IoT service 120 generates the secret according to the formula secret=IoT device session pub key*IoT service session private key, where '*' means that the IoT device session public key is point-multiplied by the IoT service session private key. The encryption engine 1661 on the IoT device 101 generates the secret according to the formula secret=IoT service session pub key*IoT device session private key, where the IoT service session public key is point multiplied by the IoT device session private key. In the end, the IoT service 120 and IoT device 101 have both generated the same secret to be used to encrypt communication as described below. In one embodiment, the encryption engines 1660-1661 rely on a hardware module such as the KSGMs 1640-1641 respectively to perform the above operations for generating the secret.

Once the secret has been determined, it may be used by the encryption engines 1660 and 1661 to encrypt and decrypt data directly. Alternatively, in one embodiment, the encryption engines 1660-1661 send commands to the KSGMs 1640-1641 to generate a new key stream using the secret to encrypt/decrypt each data packet (i.e., a new key stream data structure is generated for each packet). In particular, one embodiment of the key stream generation module 1640-1641 implements a Galois/Counter Mode (GCM) in which a counter value is incremented for each data packet and is used in combination with the secret to generate the key stream. Thus, to transmit a data packet to the IoT service 120, the encryption engine 1661 of the IoT device 101 uses the secret and the current counter value to cause the KSGMs 1640-1641 to generate a new key stream and increment the counter value for generating the next key stream. The newly-generated key stream is then used to encrypt the data packet prior to transmission to the IoT service 120. In one embodiment, the key stream is XORed with the data to generate the encrypted data packet. In one embodiment, the IoT device 101 transmits the counter value with the encrypted data packet to the IoT service 120. The encryption engine 1660 on the IoT service then communicates with the KSGM 1640 which uses the received counter value and the secret to generate the key stream (which should be the same key stream because the same secret and counter value are used) and uses the generated key stream to decrypt the data packet.

In one embodiment, data packets transmitted from the IoT service 120 to the IoT device 101 are encrypted in the same manner. Specifically, a counter is incremented for each data packet and used along with the secret to generate a new key stream. The key stream is then used to encrypt the data (e.g., performing an XOR of the data and the key stream) and the encrypted data packet is transmitted with the counter value to the IoT device 101. The encryption engine 1661 on the IoT device 101 then communicates with the KSGM 1641 which uses the counter value and the secret to generate the same key stream which is used to decrypt the data packet. Thus, in this embodiment, the encryption engines 1660-1661 use their own counter values to generate a key stream to encrypt data and use the counter values received with the encrypted data packets to generate a key stream to decrypt the data.

In one embodiment, each encryption engine 1660-1661 keeps track of the last counter value it received from the other and includes sequencing logic to detect whether a counter value is received out of sequence or if the same counter value is received more than once. If a counter value is received out of sequence, or if the same counter value is received more than once, this may indicate that a replay attack is being attempted. In response, the encryption engines 1660-1661 may disconnect from the communication channel and/or may generate a security alert.

Figure 18:
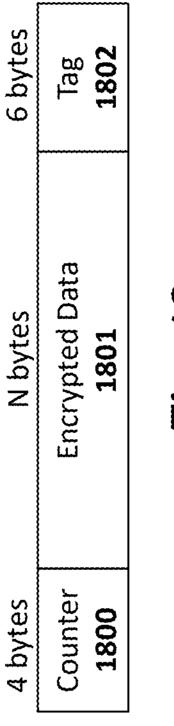
FIG. 18 illustrates a packet structure in accordance with one embodiment of the invention.

FIG. 18 illustrates an exemplary encrypted data packet employed in one embodiment of the invention comprising a 4-byte counter value 1800, a variable-sized encrypted data field 1801, and a 6-byte tag 1802. In one embodiment, the tag 1802 comprises a checksum value to validate the decrypted data (once it has been decrypted).

As mentioned, in one embodiment, the session public/private key pairs 1650-1651 exchanged between the IoT service 120 and IoT device 101 may be generated periodically and/or in response to the initiation of each new communication session.

One embodiment of the invention implements additional techniques for authenticating sessions between the IoT service 120 and IoT device 101. In particular, in one embodiment, hierarchy of public/private key pairs is used including a master key pair, a set of factory key pairs, and a set of IoT service key pairs, and a set of IoT device key pairs. In one embodiment, the master key pair comprises a root of trust for all of the other key pairs and is maintained in a single, highly secure location (e.g., under the control of the organization implementing the IoT systems described herein). The master private key may be used to generate signatures over (and thereby authenticate) various other key pairs such as the factory key pairs. The signatures may then be verified using the master public key. In one embodiment, each factory which manufactures IoT devices is assigned its own factory key pair which may then be used to authenticate IoT service keys and IoT device keys. For example, in one embodiment, a factory private key is used to generate a signature over IoT service public keys and IoT device public keys. These signature may then be verified using the corresponding factory public key. Note that these IoT service/device public keys are not the same as the "session" public/private keys described above with respect to FIGS. 16A-B. The session public/private keys described above are temporary (i.e., generated for a service/device session) while the IoT service/device key pairs are permanent (i.e., generated at the factory).

With the foregoing relationships between master keys, factory keys, service/device keys in mind, one embodiment of the invention performs the following operations to provide additional layers of authentication and security between the IoT service 120 and IoT device 101:

A. In one embodiment, the IoT service 120 initially generates a message containing the following:
 1. The IoT service's unique ID:
  The IoT service's serial number;
  a Timestamp;
  The ID of the factory key used to sign this unique ID;
  a Class of the unique ID (i.e., a service);
  IoT service's public key
  The signature over the unique ID.
 2. The Factory Certificate including:
  A timestamp.
  The ID of the master key used to sign the certificate
  The factory public key
  The signature of the Factory Certificate
 3. IoT service session public key (as described above with respect to FIGS. 16A-B)
 4. IoT service session public key signature (e.g., signed with the IoT service's private key)

B. In one embodiment, the message is sent to the IoT device on the negotiation channel (described below). The IoT device parses the message and:
 1. Verifies the signature of the factory certificate (only if present in the message payload)
 2. Verifies the signature of the unique ID using the key identified by the unique ID
 3. Verifies the IoT service session public key signature using the IoT service's public key from the unique ID
 4. Saves the IoT service's public key as well as the IoT service's session public key
 5. Generates the IoT device session key pair C. The IoT device then generates a message containing the following:
 1. IoT device's unique ID
  IoT device serial number
  Timestamp
  ID of factory key used to sign this unique ID
  Class of unique ID (i.e., IoT device)
  IoT device's public key Signature of unique ID
2. IoT device's session public key
3. Signature of (IoT device session public key+IoT service session public key) signed with IoT device's key D. This message is sent back to the IoT service. The IoT service parses the message and:
1. Verifies the signature of the unique ID using the factory public key
2. Verifies the signature of the session public keys using the IoT device's public key
3. Saves the IoT device's session public key E. The IoT service then generates a message containing a signature of (IoT device session public key+IoT service session public key) signed with the IoT service's key.

F. The IoT device parses the message and:
1. Verifies the signature of the session public keys using the IoT service's public key
2. Generates the key stream from the IoT device session private key and the IoT service's session public key
3. The IoT device then sends a "messaging available" message.

G. The IoT service then does the following:
1. Generates the key stream from the IoT service session private key and the IoT device's session public key
2. Creates a new message on the messaging channel which contains the following:
Generates and stores a random 2 byte value.
Set attribute message with the boomerang attribute Id (discussed below) and the random value H. The IoT device receives the message and:
1. Attempts to decrypt the message
2. Emits an Update with the same value on the indicated attribute Id I. The IoT service recognizes the message payload contains a boomerang attribute update and:
1. Sets its paired state to true
2. Sends a pairing complete message on the negotiator channel J. IoT device receives the message and sets his paired state to true While the above techniques are described with respect to an "IoT service" and an "IoT device," the underlying principles of the invention may be implemented to establish a secure communication channel between any two devices including user client devices, servers, and Internet services.

The above techniques are highly secure because the private keys are never shared over the air (in contrast to current Bluetooth pairing techniques in which a secret is transmitted from one party to the other). An attacker listening to the entire conversation will only have the public keys, which are insufficient to generate the shared secret. These techniques also prevent a man-in-the-middle attack by exchanging signed public keys. In addition, because GCM and separate counters are used on each device, any kind of "replay attack" (where a man in the middle captures the data and sends it again) is prevented. Some embodiments also prevent replay attacks by using asymmetrical counters.

Techniques for Exchanging Data and Commands without Formally Pairing Devices GATT is an acronym for the Generic Attribute Profile, and it defines the way that two Bluetooth Low Energy (BTLE) devices transfer data back and forth. It makes use of a generic data protocol called the Attribute Protocol (ATT), which is used to store Services, Characteristics and related data in a simple lookup table using 16-bit Characteristic IDs for each entry in the table. Note that while the "characteristics" are sometimes referred to as "attributes."

On Bluetooth devices, the most commonly used characteristic is the devices "name" (having characteristic ID 10752 (0x2A00)). For example, a Bluetooth device may identify other Bluetooth devices within its vicinity by reading the "Name" characteristic published by those other Bluetooth devices using GATT. Thus, Bluetooth device have the inherent ability to exchange data without formally pairing/bonding the devices (note that "paring" and "bonding" are sometimes used interchangeably; the remainder of this discussion will use the term "pairing").

One embodiment of the invention takes advantage of this capability to communicate with BTLE-enabled IoT devices without formally pairing with these devices. Pairing with each individual IoT device would extremely inefficient because of the amount of time required to pair with each device and because only one paired connection may be established at a time.

Figure 19:
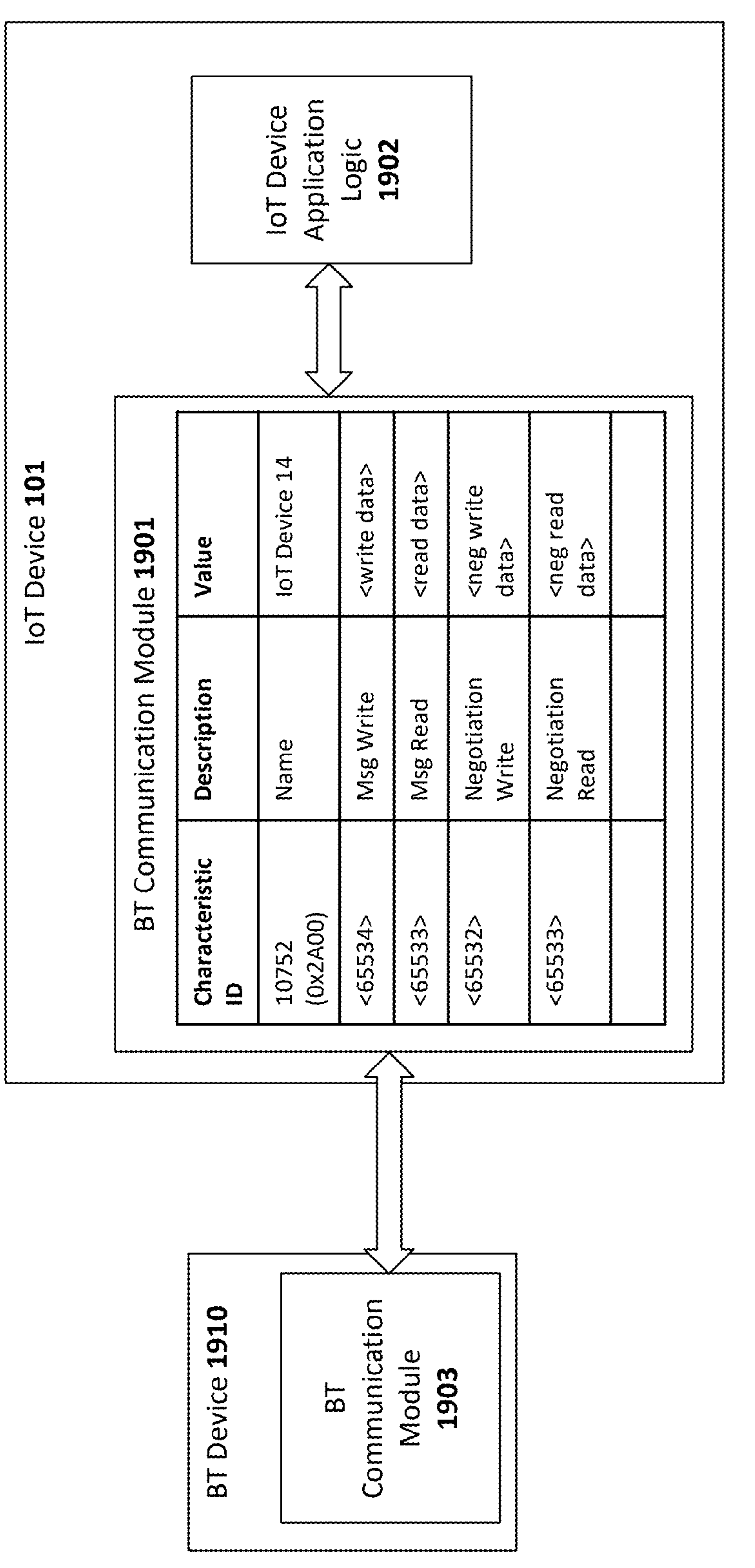
FIG. 19 illustrates techniques employed in one embodiment for writing and reading data to/from an IoT device without formally pairing with the IoT device.

FIG. 19 illustrates one particular embodiment in which a Bluetooth (BT) device 1910 establishes a network socket abstraction with a BT communication module 1901 of an IoT device 101 without formally establishing a paired BT connection. The BT device 1910 may be included in an IoT hub 110 and/or a client device 611 such as shown in FIG. 16A. As illustrated, the BT communication module 1901 maintains a data structure containing a list of characteristic IDs, names associated with those characteristic IDs and values for those characteristic IDs. The value for each characteristic may be stored within a 20-byte buffer identified by the characteristic ID in accordance with the current BT standard. However, the underlying principles of the invention are not limited to any particular buffer size.

In the example in FIG. 19, the "Name" characteristic is a BT-defined characteristic which is assigned a specific value of "IoT Device 14." One embodiment of the invention specifies a first set of additional characteristics to be used for negotiating a secure communication channel with the BT device 1910 and a second set of additional characteristics to be used for encrypted communication with the BT device 1910. In particular, a "negotiation write" characteristic, identified by characteristic ID <65532> in the illustrated example, may be used to transmit outgoing negotiation messages and the "negotiation read" characteristic, identified by characteristic ID <65533> may be used to receive incoming negotiation messages. The "negotiation messages" may include messages used by the BT device 1910 and the BT communication module 1901 to establish a secure communication channel as described herein. By way of example, in FIG. 17, the IoT device 101 may receive the IoT service session public key 1701 via the "negotiation read" characteristic <65533>. The key 1701 may be transmitted from the IoT service 120 to a BTLE-enabled IoT hub 110 or client device 611 which may then use GATT to write the key 1701 to the negotiation read value buffer identified by characteristic ID <65533>. IoT device application logic 1902 may then read the key 1701 from the value buffer identified by characteristic ID <65533> and process it as described above (e.g., using it to generate a secret and using the secret to generate a key stream, etc).

If the key 1701 is greater than 20 bytes (the maximum buffer size in some current implementations), then it may be written in 20-byte portions. For example, the first 20 bytes may be written by the BT communication module 1903 to characteristic ID <65533> and read by the IoT device application logic 1902, which may then write an acknowledgement message to the negotiation write value buffer identified by characteristic ID <65532>. Using GATT, the BT communication module 1903 may read this acknowledgement from characteristic ID <65532> and responsively write the next 20 bytes of the key 1701 to the negotiation read value buffer identified by characteristic ID <65533>. In this manner, a network socket abstraction defined by characteristic IDs <65532> and <65533> is established for exchanging negotiation messages used to establish a secure communication channel.

In one embodiment, once the secure communication channel is established, a second network socket abstraction is established using characteristic ID <65534> (for transmitting encrypted data packets from IoT device 101) and characteristic ID <65533> (for receiving encrypted data packets by IoT device). That is, when BT communication module 1903 has an encrypted data packet to transmit (e.g., such as encrypted message 1603 in FIG. 16A), it starts writing the encrypted data packet, 20 bytes at a time, using the message read value buffer identified by characteristic ID <65533>. The IoT device application logic 1902 will then read the encrypted data packet, 20 bytes at a time, from the read value buffer, sending acknowledgement messages to the BT communication module 1903 as needed via the write value buffer identified by characteristic ID <65532>.

In one embodiment, the commands of GET, SET, and UPDATE described below are used to exchange data and commands between the two BT communication modules 1901 and 1903. For example, the BT communication module 1903 may send a packet identifying characteristic ID <65533> and containing the SET command to write into the value field/buffer identified by characteristic ID <65533> which may then be read by the IoT device application logic 1902. To retrieve data from the IoT device 101, the BT communication module 1903 may transmit a GET command directed to the value field/buffer identified by characteristic ID <65534>. In response to the GET command, the BT communication module 1901 may transmit an UPDATE packet to the BT communication module 1903 containing the data from the value field/buffer identified by characteristic ID <65534>. In addition, UPDATE packets may be transmitted automatically, in response to changes in a particular attribute on the IoT device 101. For example, if the IoT device is associated with a lighting system and the user turns on the lights, then an UPDATE packet may be sent to reflect the change to the on/off attribute associated with the lighting application.

Figure 20:
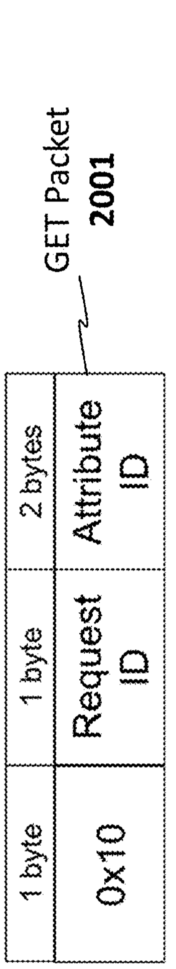
FIG. 20 illustrates an exemplary set of command packets employed in one embodiment of the invention.

FIG. 20 illustrates exemplary packet formats used for GET, SET, and UPDATE in accordance with one embodiment of the invention. In one embodiment, these packets are transmitted over the message write <65534> and message read <65533> channels following negotiation. In the GET packet 2001, a first 1-byte field includes a value (0X10) which identifies the packet as a GET packet. A second 1-byte field includes a request ID, which uniquely identifies the current GET command (i.e., identifies the current transaction with which the GET command is associated). For example, each instance of a GET command transmitted from a service or device may be assigned a different request ID. This may be done, for example, by incrementing a counter and using the counter value as the request ID. However, the underlying principles of the invention are not limited to any particular manner for setting the request ID.

A 2-byte attribute ID identifies the application-specific attribute to which the packet is directed. For example, if the GET command is being sent to IoT device 101 illustrated in FIG. 19, the attribute ID may be used to identify the particular application-specific value being requested. Returning to the above example, the GET command may be directed to an application-specific attribute ID such as power status of a lighting system, which comprises a value identifying whether the lights are powered on or off (e.g., 1=on, 0=off). If the IoT device 101 is a security apparatus associated with a door, then the value field may identify the current status of the door (e.g., 1=opened, 0=closed). In response to the GET command, a response may be transmitting containing the current value identified by the attribute ID.

The SET packet 2002 and UPDATE packet 2003 illustrated in FIG. 20 also include a first 1-byte field identifying the type of packet (i.e., SET and UPDATE), a second 1-byte field containing a request ID, and a 2-byte attribute ID field identifying an application-defined attribute. In addition, the SET packet includes a 2-byte length value identifying the length of data contained in an n-byte value data field. The value data field may include a command to be executed on the IoT device and/or configuration data to configure the operation of the IoT device in some manner (e.g., to set a desired parameter, to power down the IoT device, etc). For example, if the IoT device 101 controls the speed of a fan, the value field may reflect the current fan speed.

The UPDATE packet 2003 may be transmitted to provide an update of the results of the SET command. The UPDATE packet 2003 includes a 2-byte length value field to identify the length of the n-byte value data field which may include data related to the results of the SET command. In addition, a 1-byte update state field may identify the current state of the variable being updated. For example, if the SET command attempted to turn off a light controlled by the IoT device, the update state field may indicate whether the light was successfully turned off.

Figure 21:
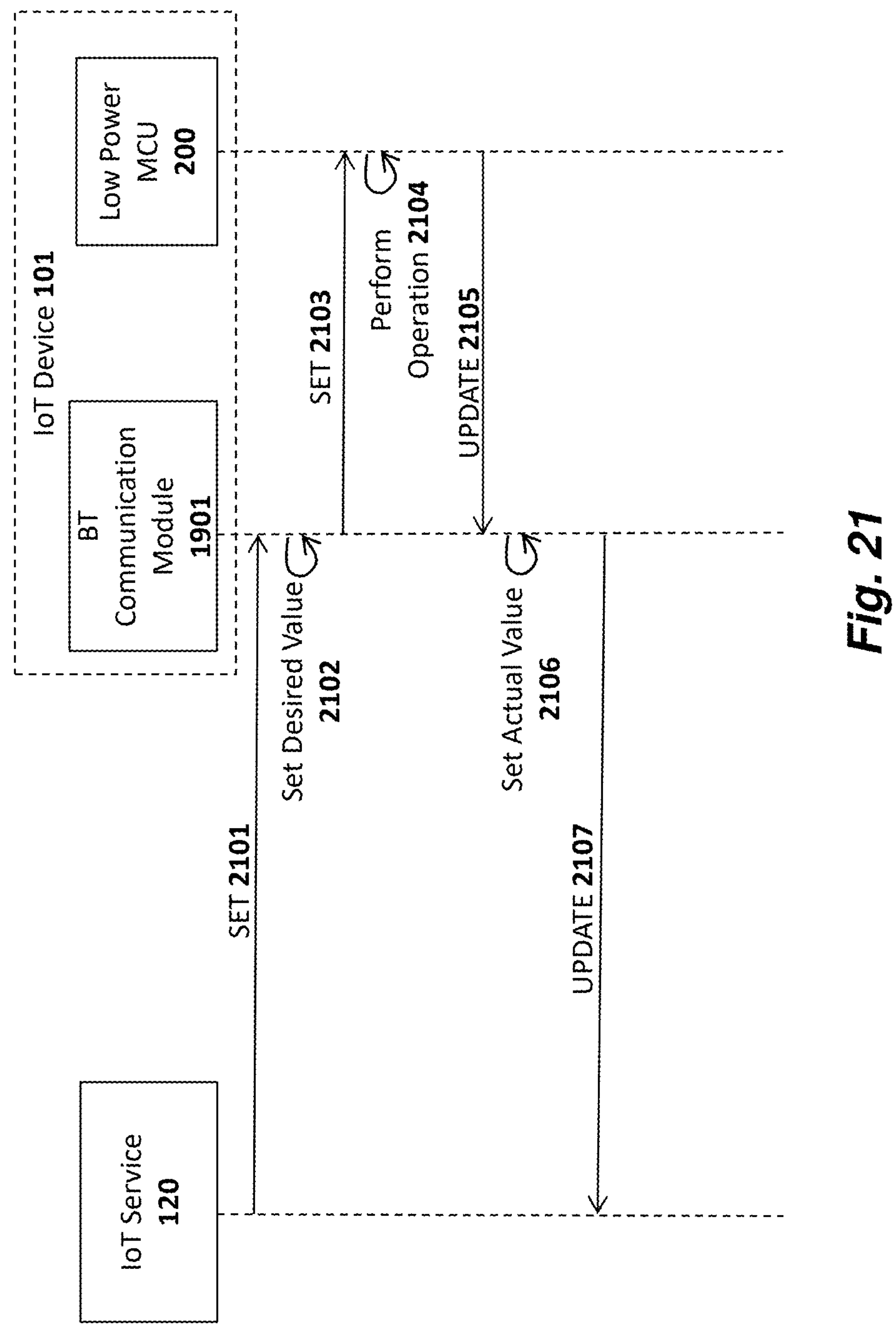
FIG. 21 illustrates an exemplary sequence of transactions using command packets.

FIG. 21 illustrates an exemplary sequence of transactions between the IoT service 120 and an IoT device 101 involving the SET and UPDATE commands. Intermediary devices such as the IoT hub and the user's mobile device are not shown to avoid obscuring the underlying principles of the invention. At 2101, the SET command 2101 is transmitted form the IoT service to the IoT device 101 and received by the BT communication module 1901 which responsively updates the GATT value buffer identified by the characteristic ID at 2102. The SET command is read from the value buffer by the low power microcontroller (MCU) 200 at 2103 (or by program code being executed on the low power MCU such as IoT device application logic 1902 shown in FIG. 19). At 2104, the MCU 200 or program code performs an operation in response to the SET command. For example, the SET command may include an attribute ID specifying a new configuration parameter such as a new temperature or may include a state value such as on/off (to cause the IoT device to enter into an "on" or a low power state). Thus, at 2104, the new value is set in the IoT device and an UPDATE command is returned at 2105 and the actual value is updated in a GATT value field at 2106. In some cases, the actual value will be equal to the desired value. In other cases, the updated value may be different (i.e., because it may take time for the IoT device 101 to update certain types of values). Finally, at 2107, the UPDATE command is transmitted back to the IoT service 120 containing the actual value from the GATT value field.

Figure 22:
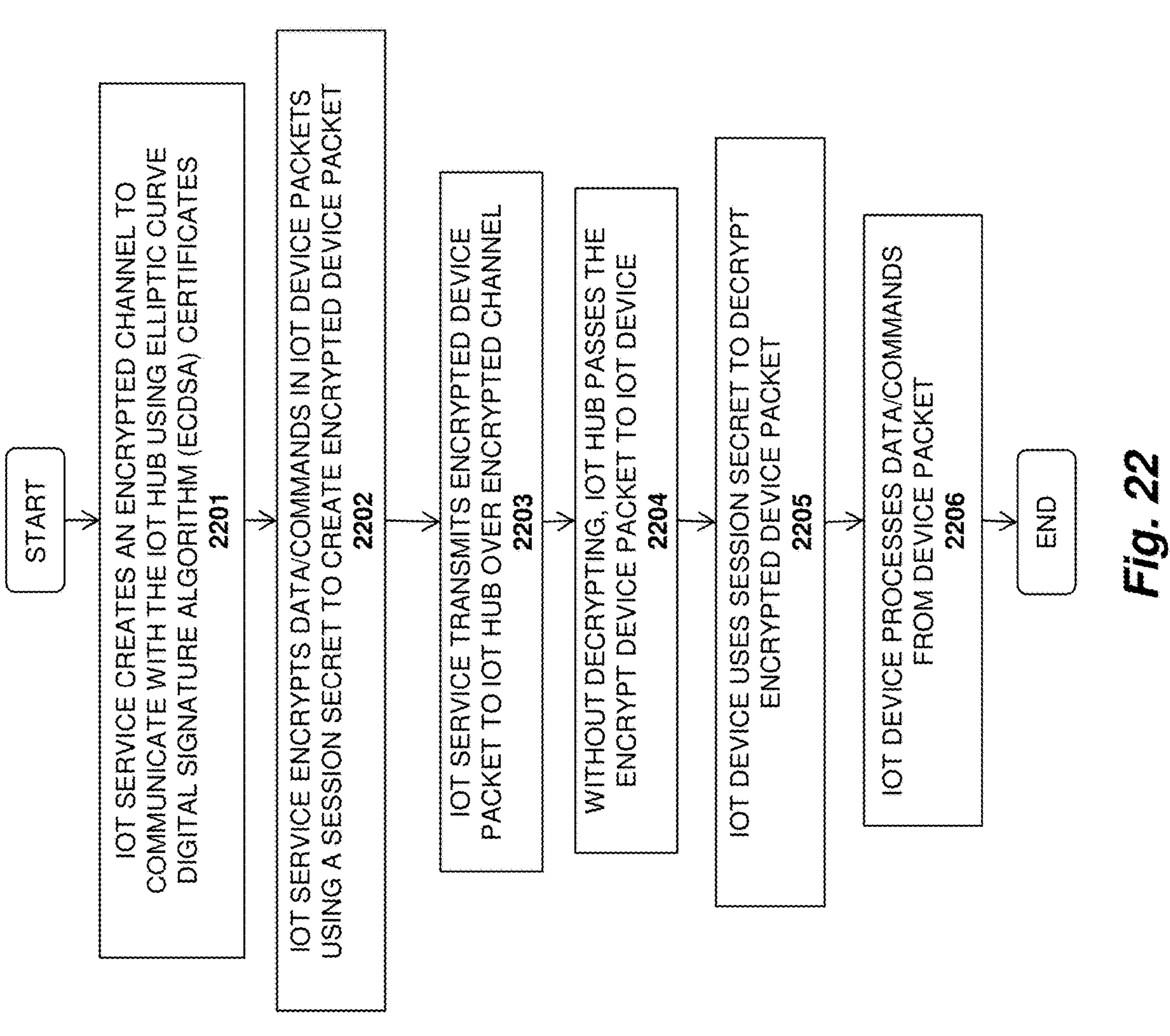
FIG. 22 illustrates a method in accordance with one embodiment of the invention.

FIG. 22 illustrates a method for implementing a secure communication channel between an IoT service and an IoT device in accordance with one embodiment of the invention.

The method may be implemented within the context of the network architectures described above but is not limited to any specific architecture.

At 2201, the IoT service creates an encrypted channel to communicate with the IoT hub using elliptic curve digital signature algorithm (ECDSA) certificates. At 2202, the IoT service encrypts data/commands in IoT device packets using the a session secret to create an encrypted device packet. As mentioned above, the session secret may be independently generated by the IoT device and the IoT service. At 2203, the IoT service transmits the encrypted device packet to the IoT hub over the encrypted channel. At 2204, without decrypting, the IoT hub passes the encrypted device packet to the IoT device. At 2205, the IoT device uses the session secret to decrypt the encrypted device packet. As mentioned, in one embodiment this may be accomplished by using the secret and a counter value (provided with the encrypted device packet) to generate a key stream and then using the key stream to decrypt the packet. At 2206, the IoT device then extracts and processes the data and/or commands contained within the device packet.

Thus, using the above techniques, bi-directional, secure network socket abstractions may be established between two BT-enabled devices without formally pairing the BT devices using standard pairing techniques. While these techniques are described above with respect to an IoT device 101 communicating with an IoT service 120, the underlying principles of the invention may be implemented to negotiate and establish a secure communication channel between any two BT-enabled devices.

Figure 23A:
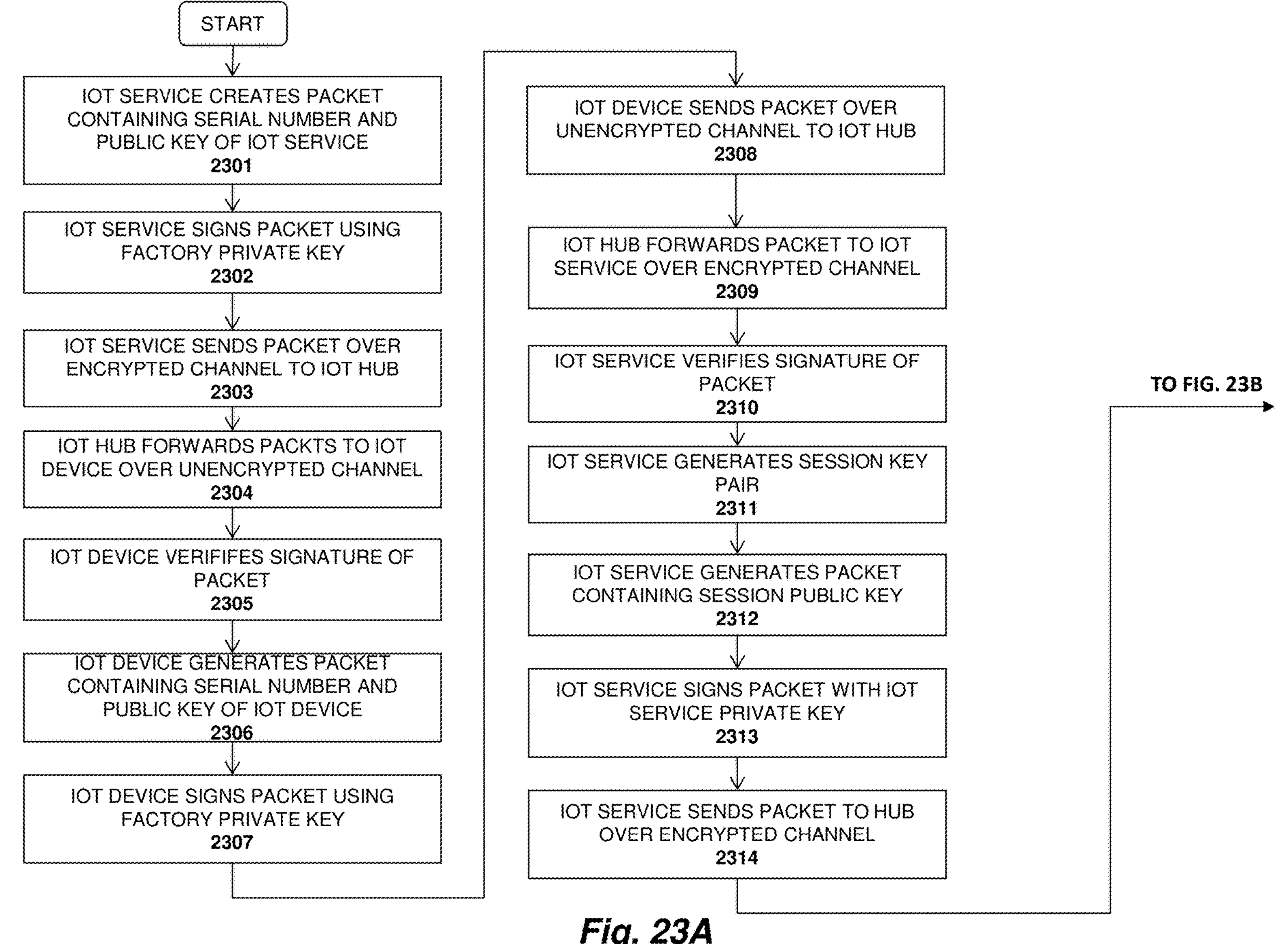
FIGS. 23A-C illustrate a method for secure pairing in accordance with one embodiment of the invention.
Figure 23B:
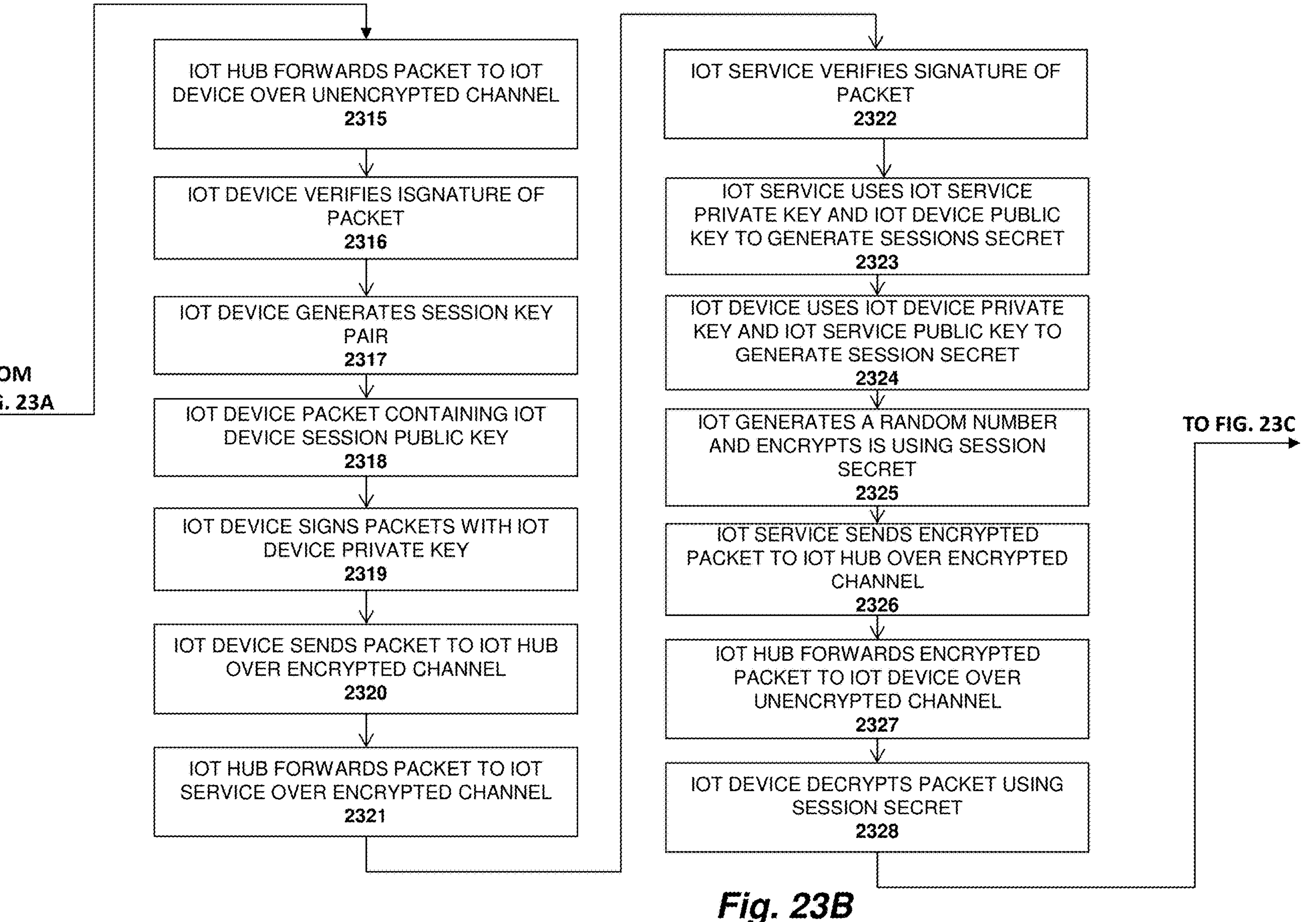
Figure 23C:
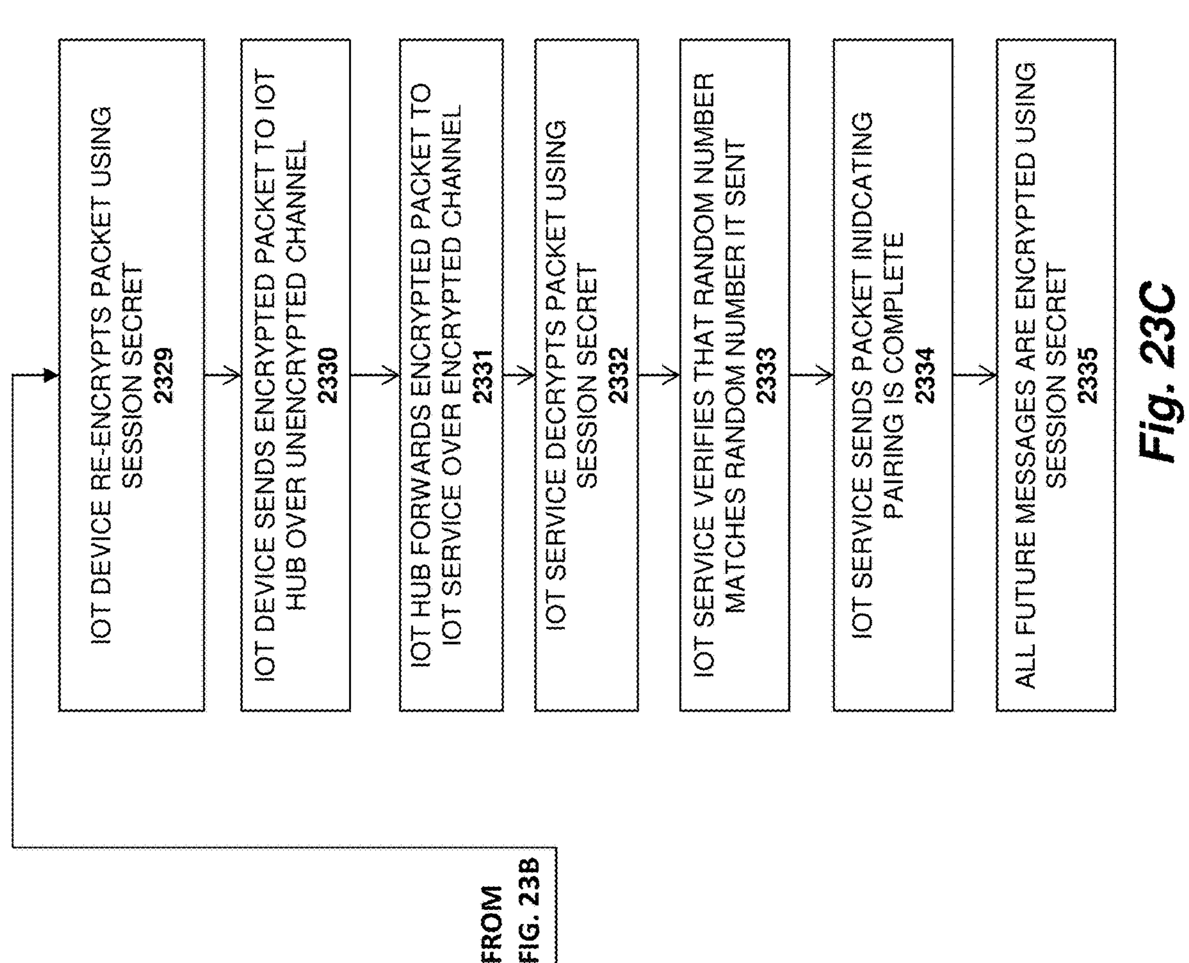

FIGS. 23A-C illustrate a detailed method for pairing devices in accordance with one embodiment of the invention. The method may be implemented within the context of the system architectures described above, but is not limited to any specific system architectures.

At 2301, the IoT Service creates a packet containing serial number and public key of the IoT Service. At 2302, the IoT Service signs the packet using the factory private key. At 2303, the IoT Service sends the packet over an encrypted channel to the IoT hub and at 2304 the IoT hub forwards the packet to IoT device over an unencrypted channel. At 2305, the IoT device verifies the signature of packet and, at 2306, the IoT device generates a packet containing the serial number and public key of the IoT Device. At 2307, the IoT device signs the packet using the factory private key and at 2308, the IoT device sends the packet over the unencrypted channel to the IoT hub.

At 2309, the IoT hub forwards the packet to the IoT service over an encrypted channel and at 2310, the IoT Service verifies the signature of the packet. At 2311, the IoT Service generates a session key pair, and at 2312 the IoT Service generates a packet containing the session public key. The IoT Service then signs the packet with IoT Service private key at 2313 and, at 2314, the IoT Service sends the packet to the IoT hub over the encrypted channel.

Turning to FIG. 23B, the IoT hub forwards the packet to the IoT device over the unencrypted channel at 2315 and, at 2316, the IoT device verifies the signature of packet. At 2317 the IoT device generates session key pair (e.g., using the techniques described above), and, at 2318, an IoT device packet is generated containing the IoT device session public key. At 2319, the IoT device signs the IoT device packet with IoT device private key. At 2320, the IoT device sends the packet to the IoT hub over the unencrypted channel and, at 2321, the IoT hub forwards the packet to the IoT service over an encrypted channel.

At 2322, the IoT service verifies the signature of the packet (e.g., using the IoT device public key) and, at 2323, the IoT service uses the IoT service private key and the IoT device public key to generate the session secret (as described in detail above). At 2324, the IoT device uses the IoT device private key and IoT service public key to generate the session secret (again, as described above) and, at 2325, the IoT device generates a random number and encrypts it using the session secret. At 2326, the IoT service sends the encrypted packet to IoT hub over the encrypted channel. At 2327, the IoT hub forwards the encrypted packet to the IoT device over the unencrypted channel. At 2328, the IoT device decrypts the packet using the session secret.

Turning to FIG. 23C, the IoT device re-encrypts the packet using the session secret at 2329 and, at 2330, the IoT device sends the encrypted packet to the IoT hub over the unencrypted channel. At 2331, the IoT hub forwards the encrypted packet to the IoT service over the encrypted channel. The IoT service decrypts the packet using the session secret at 2332. At 2333 the IoT service verifies that the random number matches the random number it sent. The IoT service then sends a packet indicating that pairing is complete at 2334 and all subsequent messages are encrypted using the session secret at 2335.

Apparatus and Method for Cryptographically Securing Unpowered or Non-Electronic IoT Devices Attestation of providence and of single use is necessary for a large class of products including, by way of example, and not limitation, home medical testing kits and digital tax stamps for controlled substances. However, because many of these products are non-electronic, vigorous attestation can be challenging. Embodiments of the invention include techniques for securely attesting such products using key-based signatures and a defined chain of trust.

The embodiments described above provide cryptographic protections for IoT devices using a Public Key Infrastructure which relies on a chain of trust. In some of these embodiments IoT devices can transmit data to communicate their identity as well as a device certificate that is signed by a which, in turn, was signed by any number of devices in a chain, up to a common Root key. For example, in FIGS. 23A-C, a factory private key is used to cryptographically secure communication between an IoT device and the IoT service. In particular, at 2302, the IoT service signs an outgoing packet using the factory private key and at 2307, the IoT device signs an outgoing packet using the factory private key. These operations form a portion of a larger sequence of transactions for generating a session secret to encrypt communication between the IoT device and the IoT service. Thus, this sequence of operations rely on an operational, connected IoT device.

In these embodiments, the certificate chain can be traversed to validate that the device is authentic. In addition, these embodiments rely on a well-defined factory provisioning process which produces a record of devices that can be compared against when a device is interacted with.

Embodiments of the invention perform a modified series of transactions to cryptographically secure inactive or non-electronic devices or products (sometimes referred to as "passive" products), while still relying on the chain of trust and aspects of the cryptographic framework described above. In this use case, only the authenticity of the passive product needs to be verified because the dataflow is only from the passive product to the IoT service.

A sufficient amount of cryptographic information is encoded in a machine-readable optical code (e.g., QR code or barcode) on the passive product for the mobile app and/or the IoT service to identify and verify the authenticity of the product. Because factories are not perfect at maintaining and delivering factory logs, these embodiments can do so even in the event of the occasional missed product to ensure an acceptable customer experience, while still ensuring that the factory did, in fact, produce the passive product device in question.

Figure 24:
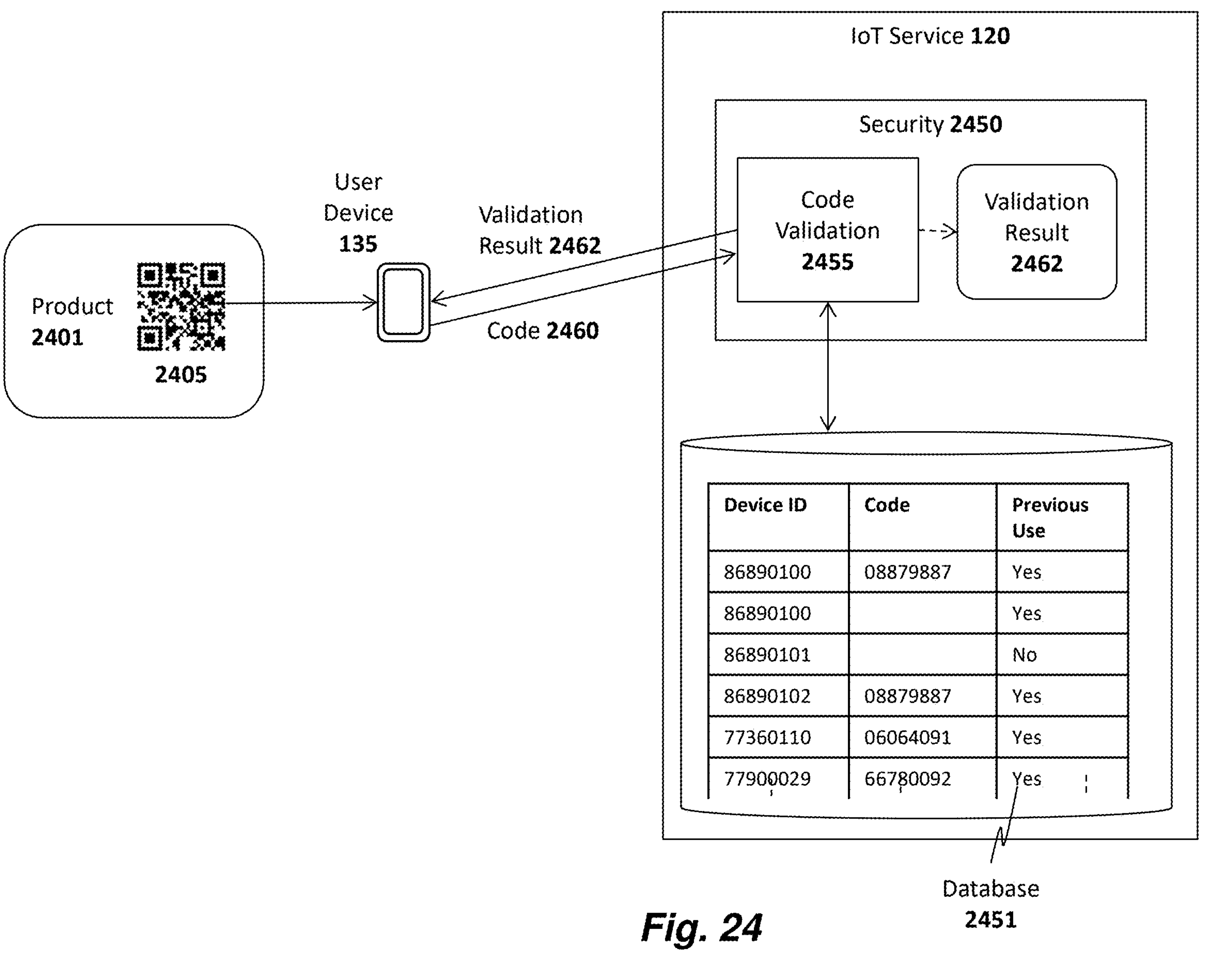
FIG. 24 illustrates an example of non-electronic or unpowered (i.e., "passive") device validation.

Referring to FIG. 24, one embodiment of the invention operates in accordance with the following sequence of operations to authenticate a passive product 2401. By way of example, and not limitation, the passive product 2401 may be medical test kit used to test for an infectious disease. As such, the test kit must be validated to confirm that it has not been previously used.

From the mobile app on the user's device 135 (which may be the same as the IoT device app described herein), the machine-readable optical label 2405 (e.g., a 2D barcode) is scanned and the resulting code 2460 is transmitted to a security module 2450 on the IoT service 120. As mentioned, the client device 135 may initially establish a secure communication channel with the IoT service 120 (e.g., an SSL channel).

The security module 2450 attempts to verify the code 2460 extracted from the optical label 2405. A code validation module 2455 may initially query the product database 2451 to determine if the code 2460 has previously been used. In one embodiment, as soon as a particular product has been used, the database 2451 is updated accordingly—and the same product can not be used more than once. Thus, if the product has been previously used, the validation result 2462 transmitted to the user device 135 informs the user of the error and prevents recording of any test result.

If the code 2460 passes the "prior use" check, then a digital signature check is performed, to confirm that a signature included with the code 2460 is valid. For example, the code validation module 2455 may regenerate the signature over the product ID and other metadata initially used to generate the signature, to determine whether the signature is valid. If the signature check fails, then the validation result 2462 will indicate a failure on a digital signature check; the user will be informed that the test is invalid and should not be used.

If, however, the code 2460 passes both the prior use check and the signature validation, then the security module 2450 will mark it as used in the database 2451 so that it cannot be reused. The validation result 2462 will then indicate to the user that the test is valid and can be used.

Figure 25:
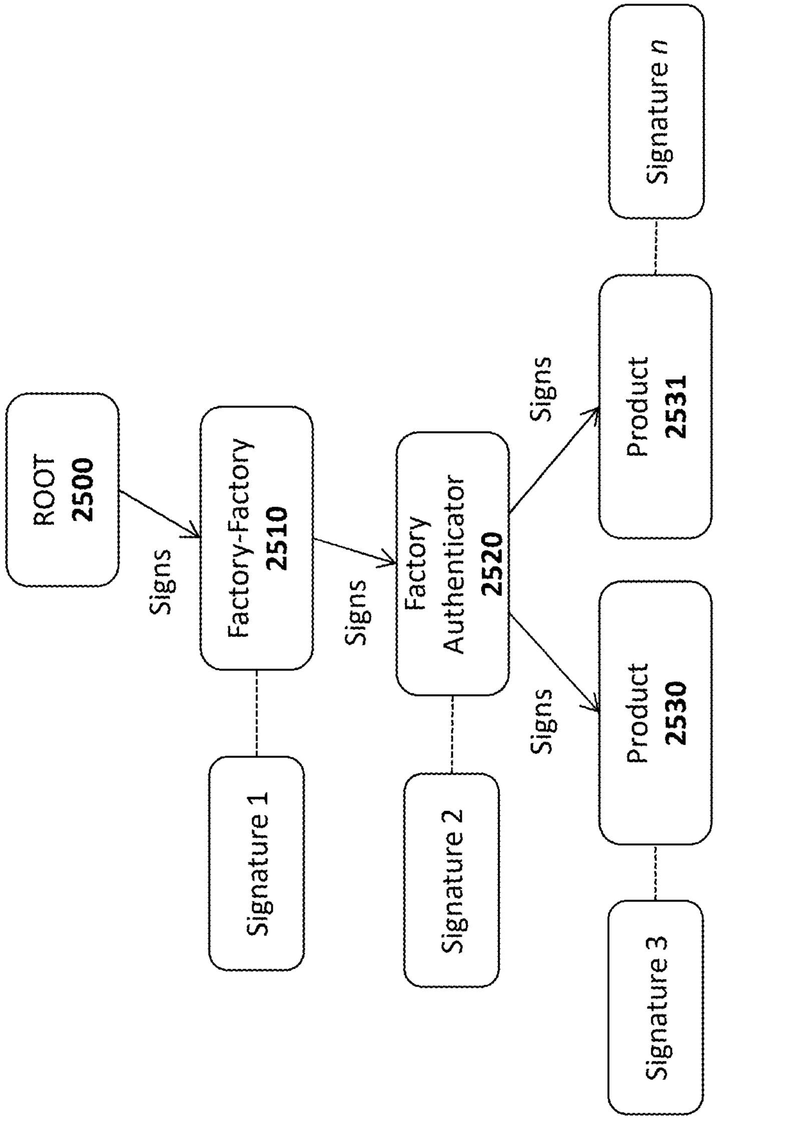
FIG. 25 illustrates multiple layers of signatures forming a chain of trust.

Additional details associated with the code 2460, including the signature, encoded in the machine-readable optical code are provided below. FIG. 25 illustrates the chain of trust used to generate signatures on various forms of products 2530-2531, including non-electronic, "passive" products described herein. A root of trust 2500 includes a secret key used to generate a signature on a factory-factory authentication device key 2510, which is used as the cryptographic root of trust at a particular factory. The factory-factory authenticator 2510 is sometimes referred to herein as the "level 1" factory authenticator. The factory-factory device key 2510 may be used to generate signatures over one or more keys of factory authenticator devices 2520, or "level 2" factory authenticators, which are used on the floor of the factory to generate signatures on the various products 2530-2531.

Figure 26:
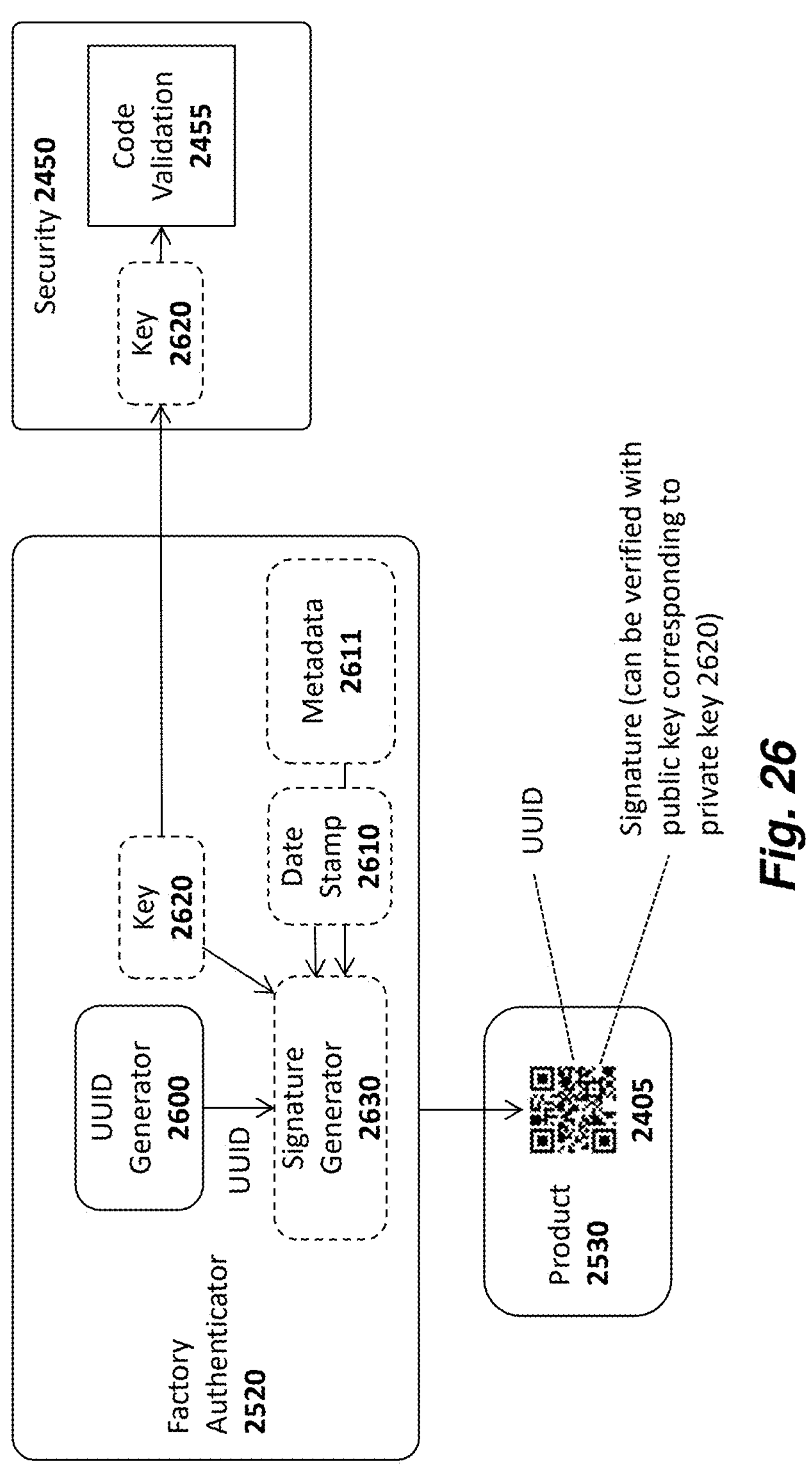
FIG. 26 illustrates an embodiment of a factory authenticator which has been authenticated to operate in a factory.

FIG. 26 illustrates additional details of the operations performed by the factory authenticator 2520 to generate the optical label 2405 for a product 2530, allowing the product 2530 to be cryptographically validated. In various embodiments, the factory authenticator 2520 may be a data processing device with a CPU (or other processor) and memory for executing the authentication operations described herein. The factory authenticator may also include dedicated hardware for performing these operations and for securely storing its assigned keys (e.g., a HSM device). A user interface may be provided to allow a factory worker to control the operations described herein.

In the illustrated embodiment, the universally unique identifier (UUID) generator 2600 generates a large random number to be used as a unique ID. The UUID is sufficiently large to ensure that it is statistically highly unlikely that there will ever be two devices assigned the same UUID (e.g., 128 bits).

In one embodiment, a signature generator 2630 of the factory authenticator 2520 uses the factory authenticator key 2620 to generate a signature over the UUID, a date stamp 2610, and other specified metadata 2611 associated with the factory authenticator 2520. For example, the metadata 2611 may include a unique identification code and/or hardware/software version associated with the authenticator 2520. Various other forms of metadata may be combined with the UUID to generate the signature. Once generated, the signature may be encoded in the optical label 2405 along with the UUID. In one embodiment, the UUID, metadata, and signature are encoded in a 40×40 QR code; however, the underlying principles of the invention are not limited to this implementation.

As illustrated, the key 2620 is provided to the security module 2450 so that the code validation logic 2455 can subsequently validate the signature extracted from the optical label 2405 as described with respect to FIG. 24. For example, the security module 2450 may regenerate the signature over the UUID and metadata using the key 2620 and validate the product 2530 if the signatures match.

Figure 27B:
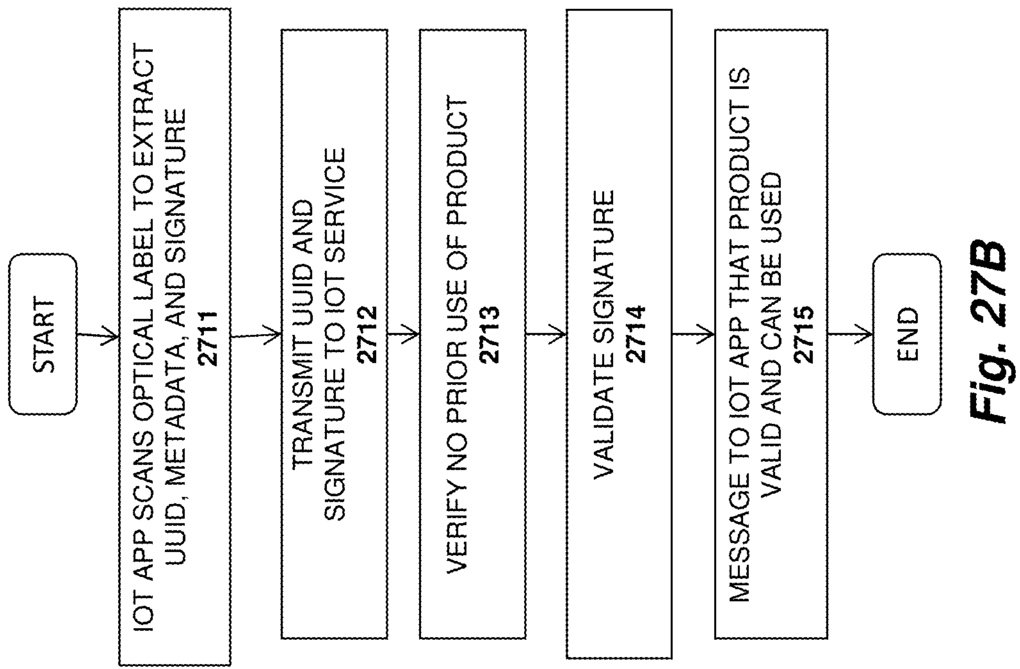
FIGS. 27A-B illustrates a method in accordance with an embodiment of the invention.
Figure 27A:
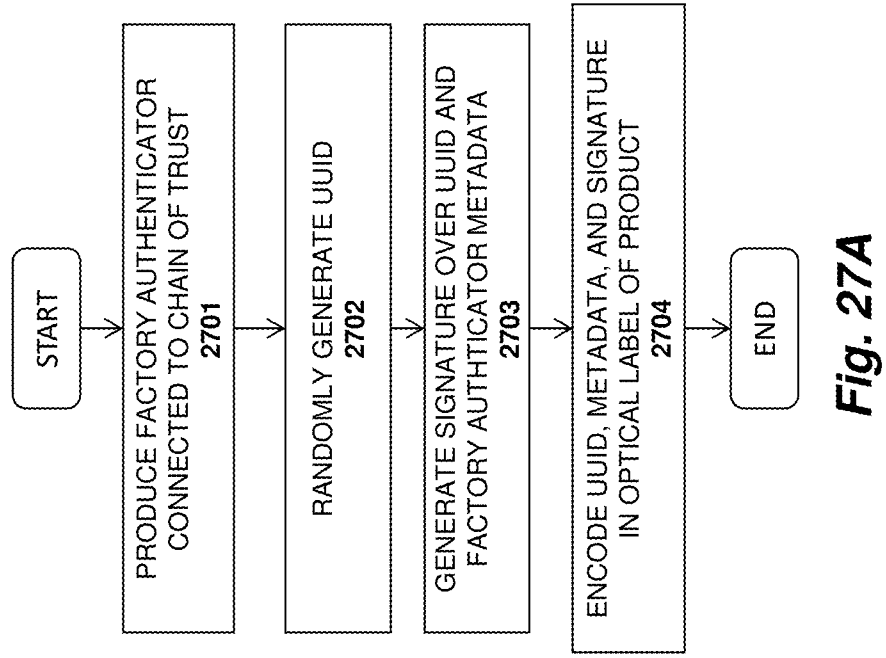

A method for cryptographically securing a product is illustrated in FIG. 27A and a method for validating the cryptographically secured product is illustrated in FIG. 27B. These methods may be executed in the context of the system architectures described above, but are not limited to any particular system architecture.

At 2701, a factory authenticator is produced from an authentication device further up towards the root of trust (e.g., the factory-factory authenticator described above). At 2702, a UUID is randomly generated and, at 2703, a signature is generated over the UUID and factory authenticator metadata (e.g., version identifiers, date stamp, etc). At 2704, the UUID, metadata, and signature are encoded in an optical label of the product.

At 2711 of FIG. 27B, the IoT app causes the mobile device to capture an image of the optical label to extract the UUID, metadata, and signature. At 2712, the UUID, metadata and signature are transmitted to the IoT service and, at 2713, the IoT service initially verifies that there has been no prior use of the product. This step is particularly important for at home medical test kits, which can only be used once.

Once it has been determined that the test kit has not been previously used, at 2714, the IoT service validates the signature. For example, it may regenerate the signature with the same key and over the same data (e.g., the UUID and metadata) as used to generate the encoded signature. If the signatures match, then at 2715, a message is sent to the IoT app that the product is valid and can be used.

The above techniques can be used to track and cryptographically validate any type of products, but may be particularly beneficial for certain types of products which require a heightened level of security, such as at-home medical testing kits, and digital tax stamps for controlled substances (e.g., alcohol, cannibus, etc). However, virtually any type of product tracking system can benefit from the authentication techniques described herein.

Apparatus and Method for Efficient and Secure Pairing and Communication

One embodiment of the invention includes mechanisms for securely pairing a Bluetooth peripheral with a computer or mobile device. In particular, a QR code generated by a factory authenticator, as described above, is used to uniquely identify a peripheral device to securely expedite the pairing process.

Figure 28:
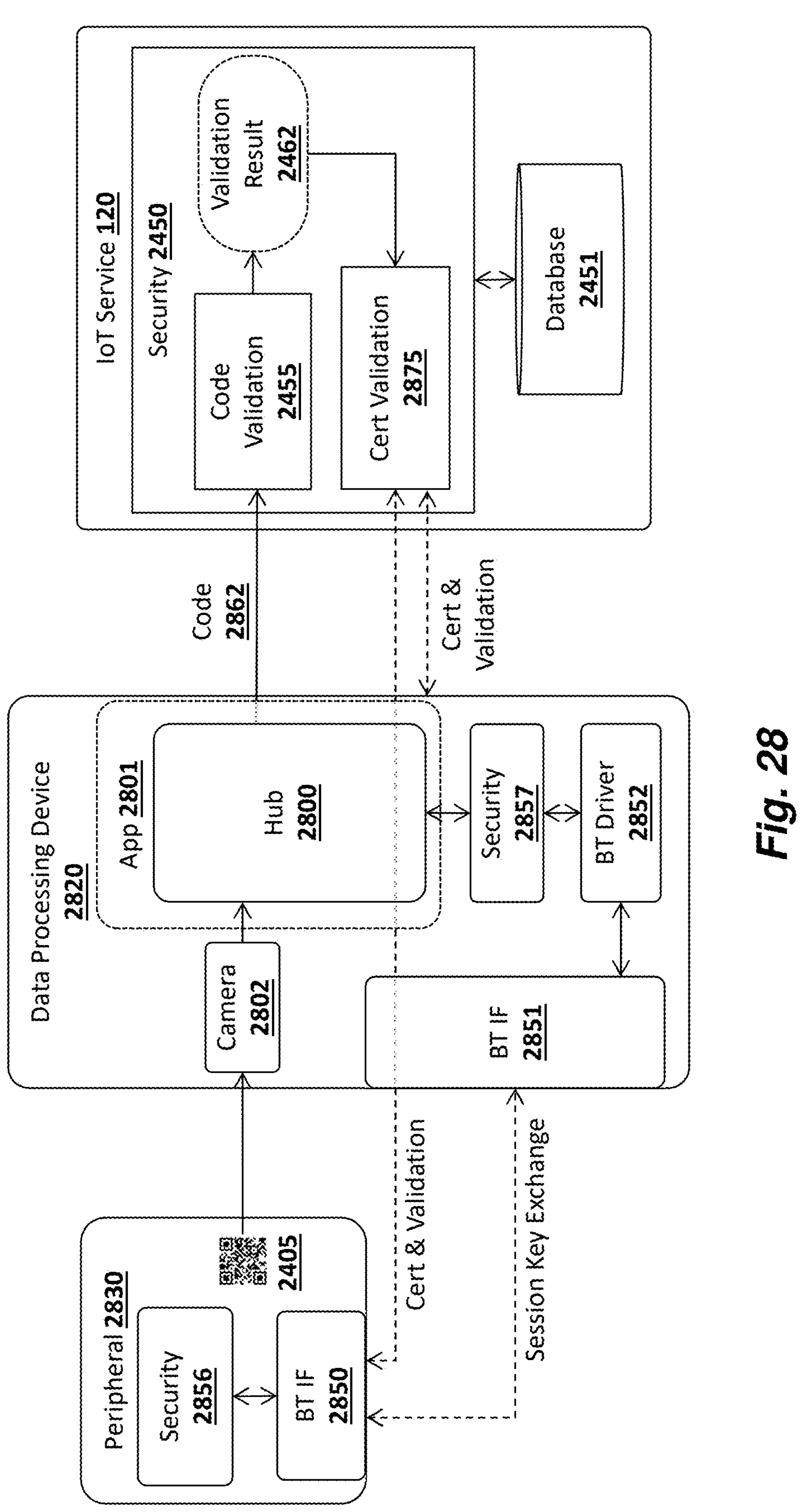
FIG. 28 illustrates one embodiment for pairing a peripheral with a computer or mobile device.

Referring to FIG. 28, in one embodiment, a QR code 2405 is captured by a camera 2802 of a data processing device 2820 to pair the peripheral device 2830 with the data processing device 2820. In this embodiment, the data processing device executes an app 2801 associated with the IoT service 120 which includes a hub 2800 to communicatively couple the peripheral 2830 to the IoT service 120. The IoT service 120 acts as an intermediary between the peripheral 2830 and the data processing device 2820 during the pairing process. In one implementation, the IoT service 120 includes a security subsystem 2450 which verifies the identity of the peripheral 2830 based on the QR code 2405 and validates the certificates generated by the peripheral device 2830 and the data processing device 2820. A session key is then exchanged between the peripheral device 2830 and data processing device 2820 to establish a secure Bluetooth channel.

In operation, the Bluetooth interface 2850 of the peripheral 2830 establishes a link with the Bluetooth interface 2851 of the data processing device 2820, allowing the peripheral 2830 to securely connect with the IoT service 120 via the hub 2800. The code 2862 captured from the QR code 2405 with the camera 2802, is provided by the hub 2800 to the IoT service 120. Code validation logic 2455 validates the code 2862 using identification data related to the peripheral 2830 stored in the database 2451 (e.g., a Device ID, UUID, factory-generated keys, etc). As described above, the code 2862 may include a signature generated over a unique peripheral ID which can be verified by the code validation logic 2455.

If the validation result 2462 indicates that the code 2862 is valid, then the security subsystem 2856 on the peripheral 2830 and security subsystem 2857 on the data processing device 2820 generate separate public/private key pairs and corresponding certificates (e.g., using a combination of the public key and device-specific data). For example, the security subsystem 2856 on the peripheral 2830 may combine the peripheral public key with the peripheral's MAC address and/or Device ID (or any other unique identifier) to generate the peripheral certificate and the security subsystem 2857 on the data processing device 2820 may combine the data processing device's public key with the device's MAC address and/or UUID to generate the data processing device certificate. Of course, various other information may be included in the certificates while still complying with the underlying principles of the invention.

The certificates are sent to the IoT service 120 where certificate validation logic 2875 validates and generates a signature over the certificates (e.g., signing the certificates with the IoT service private key) and returns the signed certificates to the peripheral device 2830 and data processing device 2820. Once validated, the security subsystem 2856 of the peripheral and security subsystem 2857 of the data processing device 2820 use the key pairs to securely generate and share a secret, which is used to produce the session key for secure Bluetooth communication. For example, the peripheral security logic 2856 may generate the session key using its private key and the data processing device public key while the data processing device security logic 2857 may generate the session key using its private key and the peripheral public key.

In one implementation, the session key is then used by the Bluetooth driver 2852 to encrypt/decrypt communication. The Bluetooth driver 2852 may be a human interface device (HID) driver which provides for secure HID communication and translates to the normal HID driver format used for a particular operating system (e.g., Windows 11, MacOS, Linux, etc).

Thus, by using the IoT service 120 as a trusted intermediary, the peripheral device 2830 can be efficiently and securely paired with the data processing device 2820 simply by capturing the QR code 2405 provided on the peripheral 2830. This is in contrast to current Bluetooth pairing implementations in which at least some unencrypted information is transmitted in the clear and which is a burdensome process for the end user.

Figure 29:
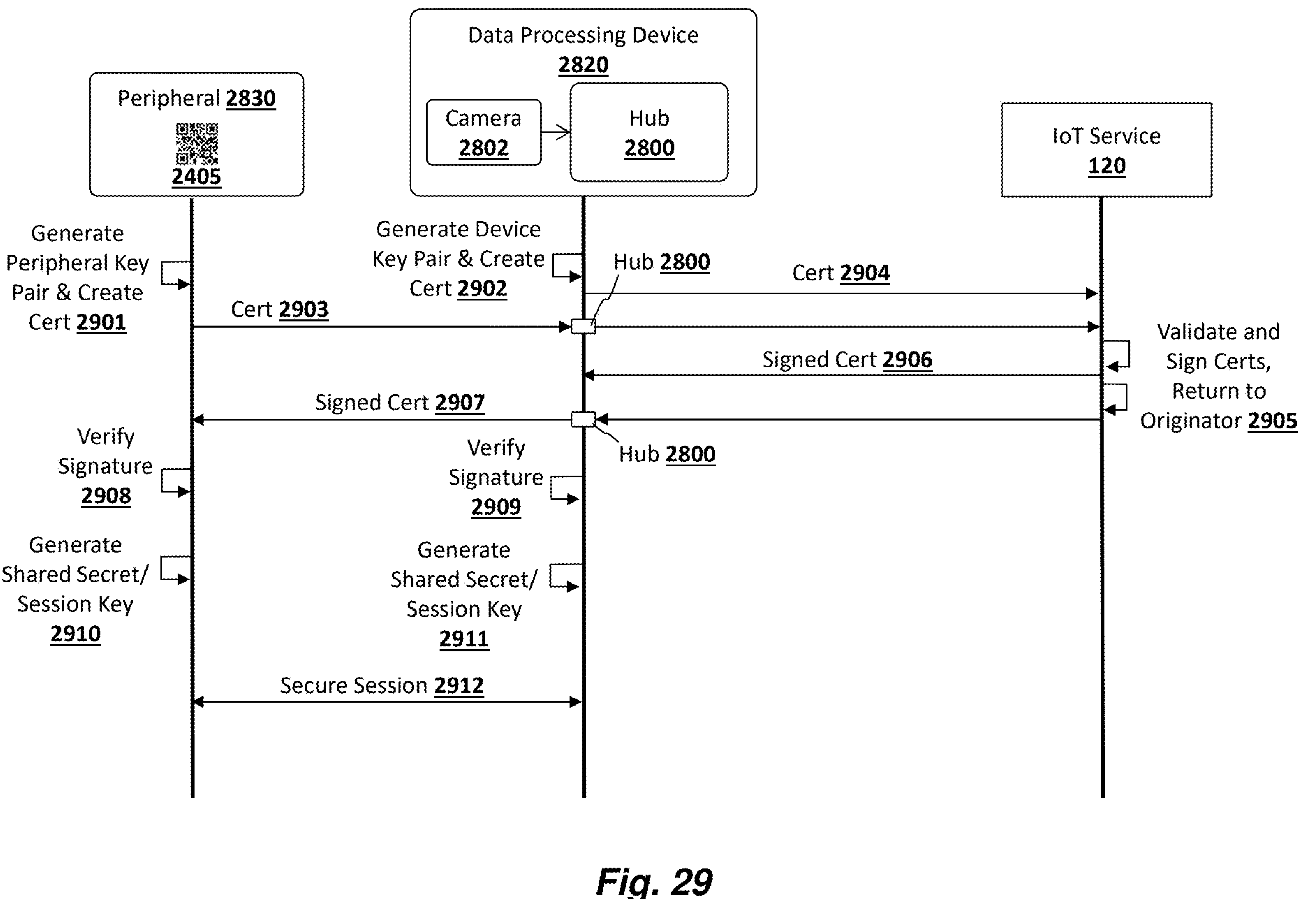
FIG. 29 illustrates one embodiment of a sequence of transactions for pairing a peripheral with a computer or mobile device.

FIG. 29 illustrates a sequence of transactions for pairing the peripheral 2830 with the data processing device 2820 in accordance with one implementation. Once the QR code 2405 has been verified (as described above), at 2901, the peripheral generates a key pair and an associated certificate 2901 (e.g., using the public key and device-specific code(s)). Similarly, at 2902, the data processing device 2820 generates a key pair and an associated certificate. At 2903 the peripheral certificate is transmitted to the IoT service 120 via the hub 2800 and, at 2904, the data processing device certificate is transmitted to the IoT service 120. At 2905, the IoT service 120 validates and signs each of the certificates and sends back the signed certificates back to the data processing device 2820 (at 2906) and peripheral 2830 (at 2907 via the hub 2800).

Once the signatures are verified by the peripheral 2830 and data processing device 2820, at 2908 and 2909, respectively, they each generate a shared secret at 2910 and 2911, respectively. For example, the peripheral 2830 may use its private key and the data processing device's public key to generate the secret and the data processing device 2820 may use its private key and the peripheral's public key to generate the secret. They each use the secret for a session key (either alone or in combination with other identification data) to establish a secure session at 2912.

Apparatus and Method for Activation and Deactivation of Devices to Prevent Unauthorized Acquisition and Use Embodiments of the invention leverage the service-based architecture described herein to prevent theft or unauthorized use of various types of devices (including but not limited to IoT devices). By way of example, and not limitation, when a user purchases a new device at a point of sale (POS) location, the POS system extracts the unique device ID generated in accordance with the implementations described herein and transmits a purchase message with the device ID to the IoT service. The IoT service identifies the device using the device ID and sets a corresponding flag in the device database indicating that the device has been successfully purchased.

Figure 30:
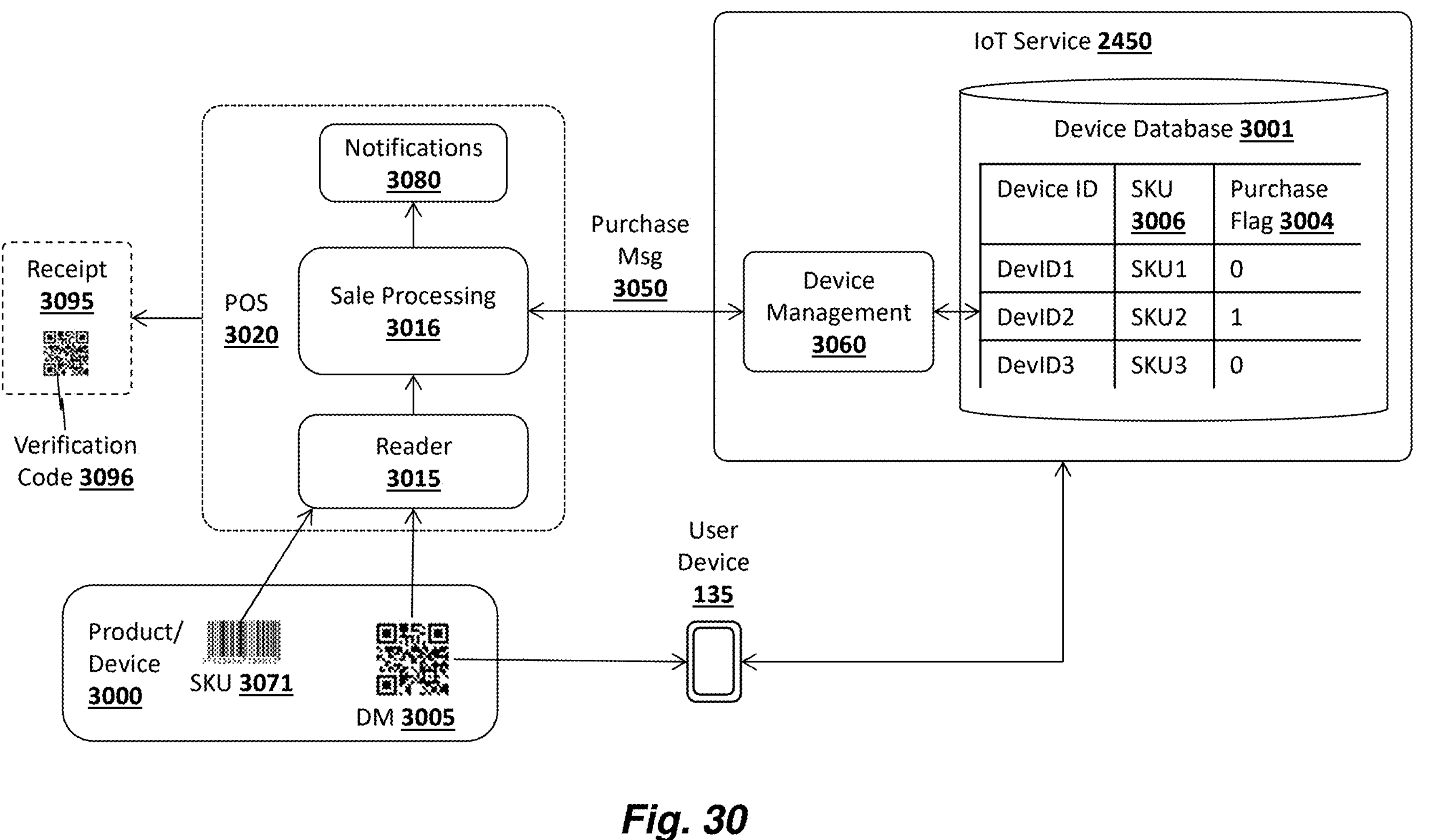
FIG. 30 illustrates one embodiment of the invention for pairing a headset with a multimedia system.

FIG. 30 illustrates one embodiment in which a reader 3015 of a POS system 3020 acquires the device ID of a product/device 3000 by scanning and decoding the data matrix 3005 encoded on the product and/or the product packaging. The reader 3015 may alternatively or additionally be an RF-based reader, capable of reading the device ID from a radio frequency ID (RFID) tag incorporated in the product/device 3000 (or the product packaging) and/or may use near field communication (NFC) to acquire the device ID from the product/device 3000, depending on how the device ID is encoded in the product/device 3000. NFC uses communications protocols and data exchange formats based on radio-frequency identification (RFID) standards including ISO/IEC 14443 and FeliCa. Other embodiments of the invention may rely on other data communication protocols to read the device ID.

Regardless of how the device ID is acquired, sale processing logic 3050 at the POS terminal 3020 (which is pre-authenticated with the IoT service 2450) transmits a message 3050 to the IoT service 2450 (e.g., based on the API exposed by the IoT service 2450) including the device ID and indicating that the device was successfully purchased. Device management logic 3060 parses/reads the message 3050 and responsively sets the purchase flag associated with the device ID in the device database 3001 (e.g., DevID2 has its purchase flag set to 1 in the illustrated example).

In some embodiments, when a customer purchases the product at the POS 3020, the universal product code (UPC) 3071 is initially scanned. The cashier (or customer at a self-scan location) is then asked to scan the data matrix 3005 of the product to capture the device ID. Alternatively, the data contained in the UPC and data matrix may be combined into a single data matrix or barcode. If the reader 3015 includes RF capabilities such as NFC, then the reader 3015 may automatically capture the device ID when the SKU 3071 is scanned (e.g., using NFC, RFID, or other RF-based protocols). For example, scanning the SKU 3071 and/or bringing the product/device 3000 in the vicinity of the NFC transceiver may automatically trigger it to read the device ID. While a single reader 3015 is shown in FIG. 30 for simplicity, different implementations may include multiple different types of readers including optical readers and RF-based readers.

In one embodiment, the sale processing logic 3016 and/or IoT service 2450 tracks the SKUs 3071 assigned to the various device IDs (e.g., as indicated by the SKU column 3006 in the device database 3001 of the IoT service 2450). Using this association, the sale processing logic 3016 verifies that the device ID from the data matrix 3005 corresponds to the SKU 3071. If not, then it may generate a notification 3080 at the POS 3020 (e.g., displayed on the POS monitor) that additional steps may be required to associate the product 3000 with the SKU 3071 and/or register/activate the product with the IoT service 2450. In some cases, the POS 3020 may interrupt the purchase and/or require authorization to proceed by individual at the POS location.

Once the sale is completed, the sale processing logic 3016 calls the IoT service 120 via the API to set the purchase flag 3004 for all device IDs and/or SKUs 3071 captured during the sale process, thus moving them from store inventory to customer-owned in the device database 3001. The device management logic 3060 responsively sets the purchase flags 3004 for all device IDs received in the transaction.

In one embodiment, the POS system 3020 generates a verification code 3096 which the user may be prompted to enter when registering the product 3000 on the IoT service 2450 or otherwise activating the product 3000. The verification code 3096 may be provided on a printed receipt 3095 and/or sent electronically to the user (e.g., emailed, texted, associated with the user's account on a server, etc). If the IoT service 2450 does not have the device ID in its database 3001, and/or if the purchase flag 3004 is not set, and/or if the SKU is not correctly associated with the device ID, then the user may be prompted to scan or enter the verification code 3069 (e.g., via the user's mobile device 130) during the device registration or activation process.

When the customer subsequently attempts to add the product 3000 to their account on the IoT service 2450 using the IoT app on the mobile device 130 by scanning the data matrix 3005 or wirelessly capturing the device ID (e.g., via a BTLE connection), the device management logic 3060 on the IoT service 2450 verifies that the purchase flag 3004 has been set in the database 3001. If it has, then the device 3000 is registered in the IoT service 2450 (e.g., using one or more of the techniques described herein for IoT device provisioning/registration).

If the purchase flag 3004 has been set, but the device ID is still not linked to a product SKU, then the IoT app on the mobile device 135 may prompt the user to scan or enter the verification code 3096 provided by the POS system 3020 or to scan or enter the SKU 3071. Using this information, the device manager 3060 can link the device ID from the data matrix 3005 to the SKU 3071 in the device database 3001 and register the product/device 3000 with the IoT service 2450.

In some instances, if the purchase flag 3004 for the device ID has not been set in the database 3001, then the IoT app on the mobile device 135 will prompt the user to scan the verification code 3096 provided from the POS system 3020. The verification code 3096 provides proof of purchase and the link between the SKU and device ID. Using the verification code 3096 to authenticate the purchase, the device management logic 3060 registers the product/device 3000 with the IoT service 2450, setting the purchase flag 3004 and links the device ID to the SKU 3071 in the device database 3001.

If the user cannot locate the verification code, then the user may be prompted to scan the SKU 3071, rescan the data matrix 3005, and/or enter additional information. The device manager 3060 may run a troubleshooting handler with this information to attempt to identify the product 3000 and/or determine why the purchase flag 3004 has not been set. For example, due to an error at the factory, the data matrix 3005 may not have been bonded to the device 3000. If this is determined to be the cause, then the device manager 3060 may link the device ID from the data matrix 3005 to the device (e.g., via the SKU 3071) in the device database 3001 and register the product/device 3000 with the IoT service 2450.

If the problem cannot be resolved via the troubleshooting process, the app of the mobile device 130 may prompt the customer to return to the store or call a number to resolve the issue; such resolutions may involve a tool that the customer service team uses to manually authenticate the purchase. These manual authorizations could be logged for fraud detection purposes.

Figures 31A, 31B:
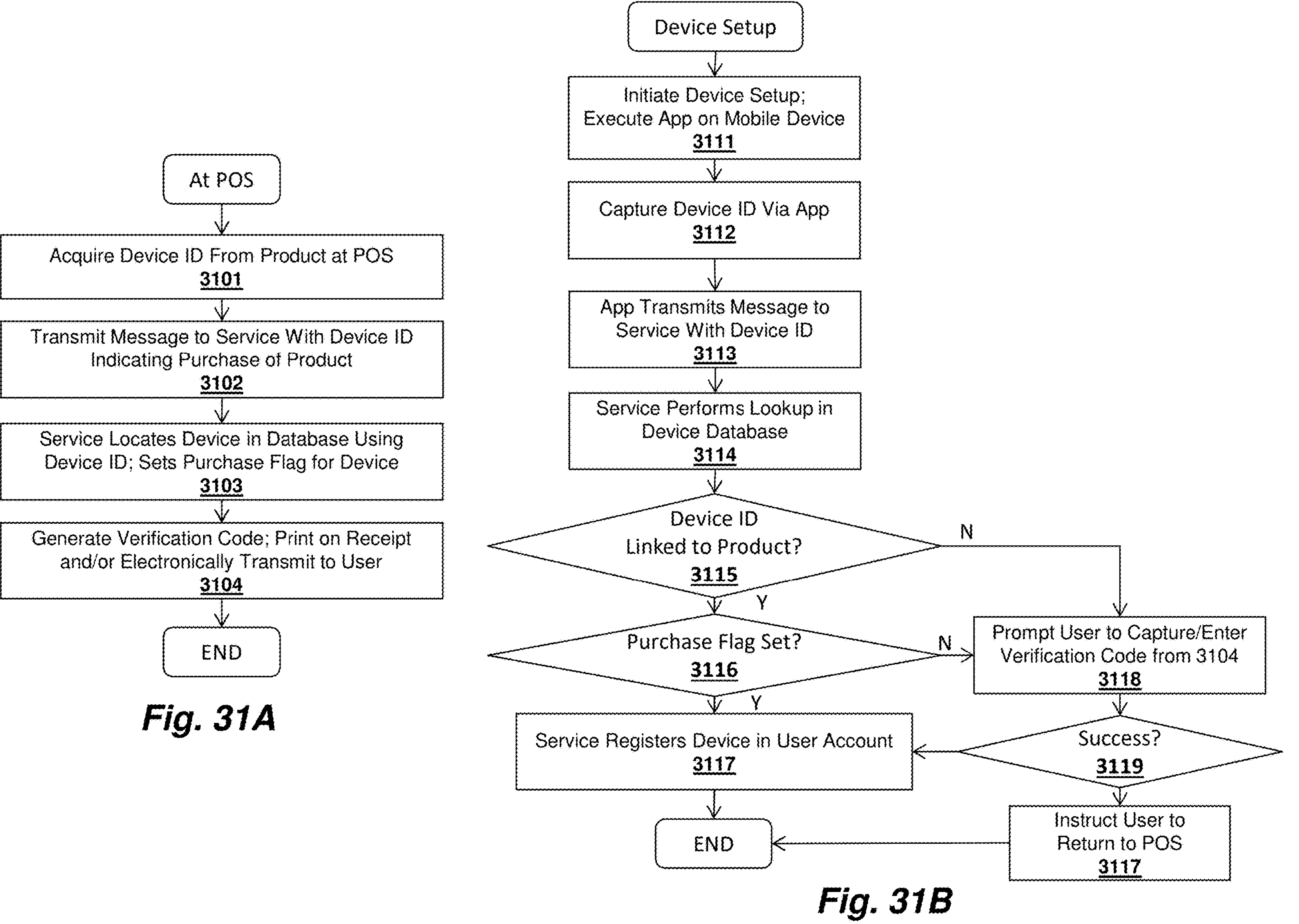
FIG. 31A illustrates a method implemented at a POS system.
FIG. 31B illustrates a method implemented to setup/activate a device.

FIG. 31A illustrates a method implemented at a POS system in accordance with some embodiments and FIG. 31B illustrates a method implemented to setup/activate a device in accordance with some embodiments of the invention.

At 3101, the device ID of the product is acquired at the POS. As mentioned, this may be a UUID encoded in an optical code or in an RFID device. At 3102, a message is transmitted from the POS system to the service indicating that the product with the device ID has been purchased. At 3103, the service locates the product in a database using the device ID and sets a purchase flag to indicate that the product has been purchased. At 3104, the POS system generates a verification code (e.g., using a combination of the device ID, SKU, and purchase verification), which it prints on the receipt and/or electronically transmits to the user (e.g., via email, text, etc).

Turning now to FIG. 31B, at 3111, the user executes the app on the mobile device to initiate device setup. At 3112, the user captures the device ID via the app. For example, the user may be prompted to use the camera to capture the data matrix on the device or the device packaging or may be prompted to establish a wireless connection to the device (e.g., via BTLE or WiFi) to retrieve the device ID.

At 3113, the app transmits a message to the service containing the device ID (and potentially other relevant information). At 3114, the service performs a lookup in the device database using the device ID. If the device ID is linked to the product, determined at 3115, and the purchase flag has been set, determined at 3116, then the service registers the device in the user's account at 3117. If the device ID is not linked to the product and/or the purchase flag has not been set, then at 3118, the user is prompted by the app to capture or enter the verification code generated by the POS at 3104. If the user successfully enters the verification code, determined at 3119, then the service registers the device in the user's account. If the verification code is not entered at 3119, the user is instructed to return to the POS or call a number for further assistance.

Thus, for products that depend on the IoT service 2450 for functionality (e.g., such as an IoT security camera, thermostat, fire detector, or light switch), the customer is buying both the product and the data matrix as a token allow the product to work on at least the baseline tier (or any other tier in the case of a subscription). If the product was stolen, it will not be linked to an account on the IoT service 2450 and will be useless unless the customer properly purchases the product, as indicated by the purchase flag 3004.

Some embodiments of the invention validate purchases and activate corresponding products which are not designed to operate with the IoT service 2450 or are otherwise useful without connecting to the IoT service. Examples of such devices include tools (e.g., cordless drills, circular saws, sanders, etc), appliances (e.g., microwaves, blenders, etc), audio/video products (e.g., TVs, Bluetooth speakers, etc), although the underlying principles of the invention are not limited to any particular product types.

Figure 32:
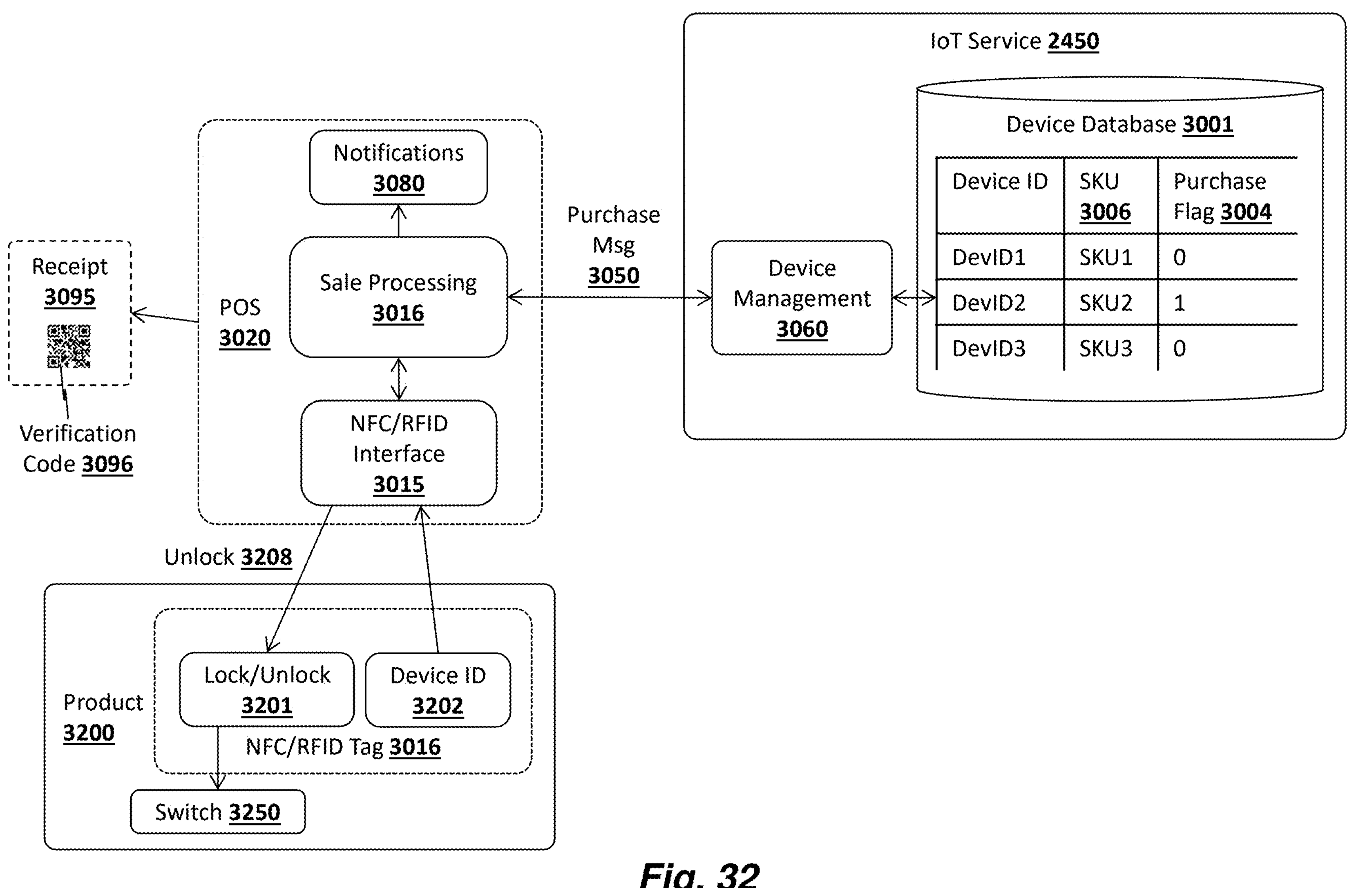
FIG. 32 illustrates one embodiment of a system for using a temporary session key to share video.

FIG. 32 illustrates one particular embodiment in which each device 3200 is configured with an NFC/RFID tag 3016 which encodes a unique device ID 3202 (e.g., a UUID value) and includes a lock/unlock module 3201, which can be in a locked state or an unlocked state. In one embodiment, the lock/unlock module 3201 is set to a locked state at the time of manufacture and remains in this state until the product is purchased.

The NFC/RFID tag 3016 is integrated on the circuit board or integrated circuit of the product 3200 (e.g., the microcontroller unit (MCU)). The lock/unlock module 3201 may be electrically coupled to an internal electrical switch 3250 to enable or disable operation of the product 3200. For example, the IC switch is set to an unswitched or "off" state when the lock/unlock module 3201 is in the unlocked state and is set to a switched or "on" state when the lock/unlock module 3201 is in the locked state. If the product 3200 includes an MCU, the MCU may read the state of the lock/unlock module 3201 upon initialization to determine whether to enter into an active state.

In the example illustrated in FIG. 32, during checkout, the device ID 3202 is captured by an NFC/RFID interface 3015 of the POS system 3020. Alternatively, or in addition, the device ID 3202 may be encoded in a data matrix and scanned by an optical reader of the POS system 3020 as described above. Once the product 3200 has been purchased, the sale processing logic 3016 transmits a message to the IoT service 2450 and the device management logic 3060 sets the corresponding purchase flag 3004 in the device database 3001 as in the embodiments described above. In addition, in the illustrated embodiment, the NFC/RFID interface 3015 transmits an unlock command 3208 to the NFC/RFID tag 3016 which moves the lock/unlock module 3201 from the locked state to the unlocked state, thereby enabling operation of the product 3200.

Figure 33:
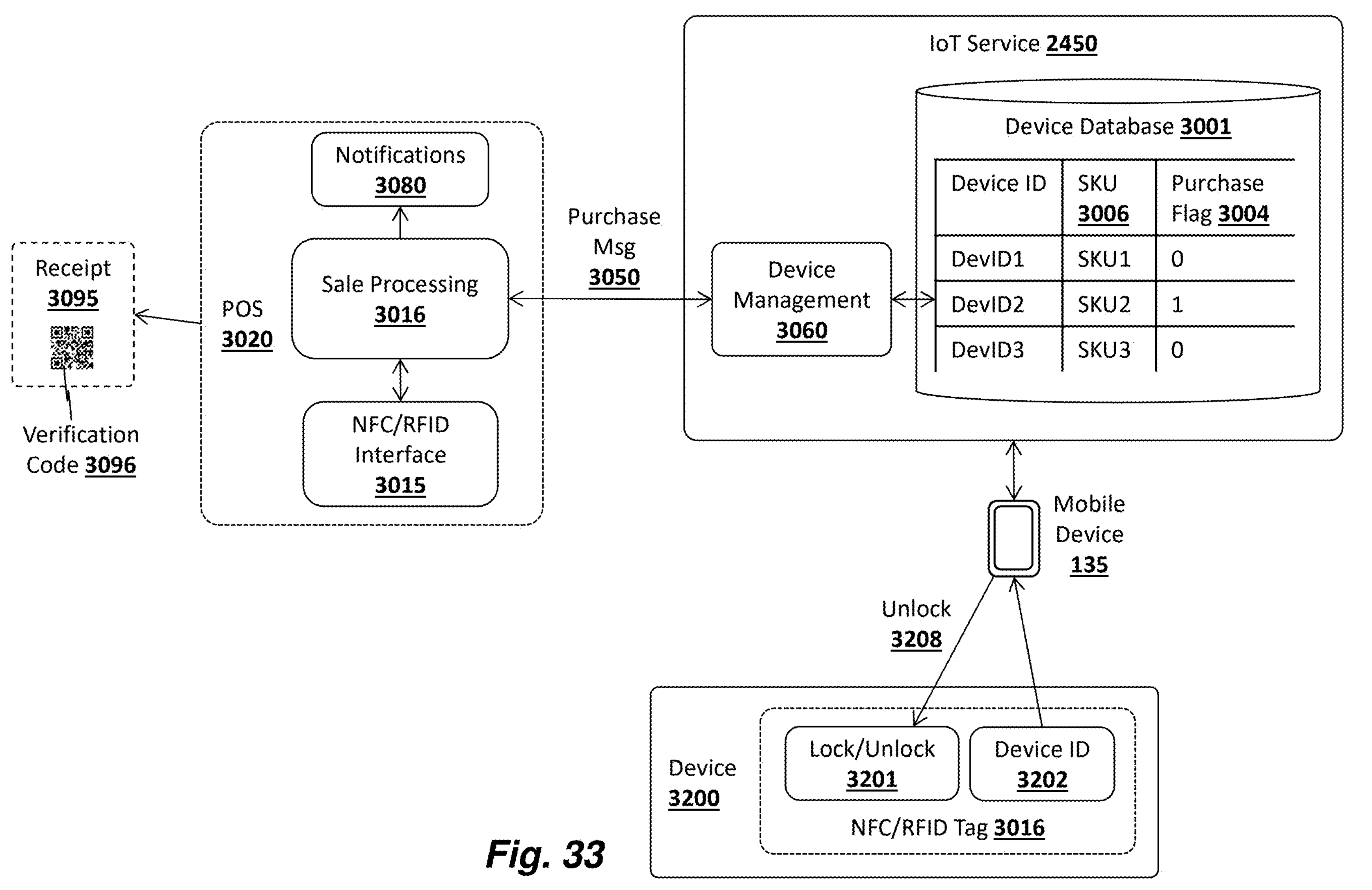
FIG. 33 illustrates another embodiment of a system for using a temporary session key to share video.

In some implementations, the product 3200 can also be unlocked after purchase, when the user is no longer at the POS 3020 location. Referring to FIG. 33, the device ID 3202 may be captured with a user device 135 running an app which connects to the IoT service 2450. The app may be the IoT app 2801 described above, or may be an app of the retailer from which the product 3200 was purchased (e.g., the Home Depot app, the Best Buy app, etc).

In operation, the device ID is captured with the camera of the mobile device 135 (e.g., from a data matrix) or using an NFC/RFID interface or other wireless interface of the mobile device 135. The device ID is transmitted from the app of the mobile device 135 to the IoT service 2450. The device management logic 3060 performs a lookup in the device database 3001 using the device ID to confirm that the corresponding purchase flag 3004 is set. If purchase flag 3004 is set, the IoT service 2450 transmits an "unlock" message to the user device 135. The app may then prompt the user to position the mobile device 135 near the device 3200 to allow an NFC/RFID link to be established. Once established, the mobile device 135 transmits an unlock command 3208 to the lock/unlock module 3201 of the NFC/RFID tag 3016, setting it to the unlocked state as described above, thereby enabling operation of the device 3200.

In one embodiment, the lock/unlock module 3201 can be set to the unlocked state once, upon proof of purchase, and is immutable. Thus, once the device is unlocked it cannot be locked again. Alternatively, some embodiments allow the lock/unlock module 3201 to be transitioned between locked and unlocked by an authorized and authenticated user. For example, the user of the mobile device 135 may configure the lock/unlock module 3201 to automatically transition back to the locked state when it has not been used for a specified period of time (e.g., 1 hour, 12 hours, two days, etc). Once in the locked state, the user can unlock the device 3200 via the app on the mobile device 135 as described above. In some implementations, the NFC/RFID tag 3016 may include a clock/calendar and/or timer functionality to allow the user to set a usage schedule for the device 3200. The device 3200 will then automatically transition between the locked and unlocked states based on the schedule. Even when using a schedule, however, the lock/unlock module 3201 may still require periodic connectivity with a mobile device 135 of the user to be unlocked. Thus, if the device 3200 is stolen, it will eventually become unusable because only the authorized user has the ability to unlock the device 3200.

In one embodiment, the user can remove the device 3200 from the user's account on the IoT service 2450 when selling the device 3200. For example, the app on the mobile device 135 may provide an option to remove the device from the user's account. In response to the user selecting this option, the mobile device 135 transmits a message to the IoT service 2450, causing the device management logic 3060 to remove the association between the device ID of the device 3200 and the user's account. The purchase flag 3004 remains set in the device database 3001 such that the new user can activate the device 3200 as described above (e.g., via registering the device 3200 with the new user's account and sending an unlock command 3208 to unlock the device 3200).

The same sequence of operations may be performed for devices which are associated with a user's account and then returned to the retailer. In one embodiment, the retailer is provided with a sufficient privilege level on the IoT service 2450 to remove a returned device from the initial user's account, making the device 3200 available for use by a subsequent purchaser.

The embodiments of the invention described above discourage theft, because stolen devices will be inoperative. By way of example, and not limitation, the foreperson at a construction site may control the lock/unlock state of a variety of tools and/or batteries—e.g., setting a daily schedule during which the tools are active and outside of which the tools become locked. If a tool is stolen, it will become inoperative without receiving periodic authorization from the foreman's mobile device 135 running the app. Similarly, if a tool is stolen from a retailer, it will never be made operative because the purchase flag associated with the tool will never be set on the service, and therefore an unlock command will never be authorized to unlock the device.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals-such as carrier waves, infrared signals, digital signals, etc.).

Apparatus and Method for Verification of Product Package Contents and Activation of Corresponding Devices Some embodiments of the invention leverage the service-based architecture described herein to prevent theft or unauthorized use of various types of devices, but without the need for a visible data matrix as described in the previous embodiments (although a data matrix may still be used for some implementations).

In these embodiments, a wireless module in the device is triggered to wake up at checkout. The wireless module may be a Bluetooth (e.g., BLE) module, radio frequency ID (RFID) module, near field communication (NFC) module, WiFi module, or any other module capable of wirelessly communicating the device data as described below. While Bluetooth and NFC are described below with respect to certain embodiments, the underlying principles of the invention are not limited to any particular wireless communication protocol. In one embodiment, the BLE module or NFC module may be activated in response to a radio frequency (RF) burst. In some implementations, the energy from a specific RF burst may be used to power one of these modules long enough to complete the transaction. In other implementations a RF signal may be used to activate an otherwise powered down module. Using energy harvesting, ambient electromagnetic energy (e.g., generated from the POS terminal) may be converted into usable electrical power.

For a Bluetooth implementation, the product code is scanned as previously described (e.g., via an optical scanner in the case the product code is printed on the product package). The device is awakened by the RF burst at the POS area (though this may have already occurred due to other scanning activity in the area). The device's Bluetooth module is activated and advertises in a Bluetooth extended advertising packet the contents that would have been in the data matrix on the package. As mentioned, this can include, but is not limited to, the device's UUID, the device type, a manufacturing date, etc, and any other relevant information which can be used to uniquely identify the device.

In some implementations described below, the product code is a UPC code. It should be noted, however, that the embodiments of the invention may be used with any type of product ID code.

In an embodiment which uses a WiFi module rather than Bluetooth, the WiFi module transmits the device data in Vendor Specific Action Frames in a similar fashion as BLE advertising packets for connectionless message passing.

The POS system queries the store back-end for a corresponding device manifest keyed off of the product identifier code. In these implementations, the device manifest includes an indication of the sub-units included in the product packaging and is stored in the back-end system when the product and associated product identifier code is added to the store/retailer's POS/sales system. The store back-end may be located at the store location, in a Cloud service, or both, depending on the back-end implementation (e.g., a local back-end instance may be operative and synchronized with the Cloud service). With the product's device manifest, the POS system can identify any sub-units in the product packaging (e.g., a tool bundle kit which includes tools and batteries). The POS system may search for each of the device type(s) listed in the device manifest to ensure that they are in close proximity to the POS system.

If it locates a match within the manifest, the POS system connects with the device(s) and allows the sale to proceed. If items in the manifest are missing from the POS area, the sale may be held up by either asking the user to reposition the product or flagging the item as possibly being defective. If a mis-match occurs the sale may be blocked because incorrect items may be in the product box.

When the sale is completed (i.e., after receiving payment from the user) the POS system transmits a request to the store back-end to sign each of the device certificates listed in the manifest and receives a response with the signed certificate(s). The POS system then sends the signed certificate(s) to each device in the manifest.

For a NFC/RFID implementation, a similar set of transactions may be performed, but the NFC reader/writer uses a wider transmit (tx)/receive (rx) path. The product UPC (or other form of product ID code) is scanned and the devices are awakened by an RF burst at the POS area. By way of example, and not limitation, the RF burst may be 13.56 MHz for NFC, or at other frequencies for other RFID implementations.

The POS system queries the store back-end as described above for the UPC device manifest to identify any sub-units in the product package. An NFC/RFID reader at the POS system uses one or more device deconflicting techniques to discover each individual device. For each device, the NFC/RFID reader queries to read out the device-specific data, which is the same data that would have been in the data matrix on the package (e.g., UUID, device type, manufacture date, etc).

Once the device-specific data has been collected, the POS system operates in the same (or similar) manner as previously described for the Bluetooth or WiFi implementations—i.e., comparing the manifest information with the devices it was able to locate. If it locates a match within the manifest, the POS system connects with the device(s) and allows the sale to proceed. If items in the manifest are missing from the POS area, the sale may be held up by either asking the user to reposition the product or flagging the item as possibly being defective. If a mis-match occurs the sale may be blocked because incorrect items may be in the product box.

When the sale is complete (payment received) the POS system transmits a request to the store back-end to sign each of the device certificates listed in the manifest. Upon receiving the signed certificates, the POS system wakes up the device(s) with the NFC or RFID field and connects to each device in the manifest (e.g., one-by-one) to write the signed certificate to that device.

The POS system may also provide instructions to the cashier/customer to reposition the product package with respect to the POS system's reader/writer depending upon the range.

For online or catalog sales, the "POS system" is a fulfillment station where the product package is boxed and prepared for shipment. In these implementations, the fulfillment station is configured to operate in substantially the same manner as the POS system described herein. For example, in response to a product ID scanner at the fulfillment station, such as a UPC scanner if the product ID is a UPC, an RF burst can be triggered to activate the devices within the product package, which then communicate device identification information to the fulfillment station (e.g., via WiFi, Bluetooth, RFID, NFC, etc). The fulfillment station retrieves the UPC manifest (e.g., from a back-end database) and compares the devices detected with the UPC manifest. Thus, if any devices are missing from the product package, this problem can be identified at the fulfillment station, prior to shipping the product package to the user.

In some embodiments, if a manufacturer is shipping a product package to a retailer that does not have support for the techniques described herein (e.g., does not support a wireless connection to receive the device information from packaged devices), the manufacturer can unlock the devices at the manufacturer's factory during pack out. In these cases, a product distribution station at the factory can perform all or a subset of the functions described above with respect to the POS system and fulfillment station to confirm the devices included in the product package. Similarly these same functions can be carried out by an authorized distributor at a product distribution station in their distribution warehouse.

Thus, embodiments of the invention may be implemented within any distribution channel from the manufacturer to the retailer, from the retailer to the user, or directly from the manufacturer to the user. Any intermediate station within one of these distribution channels may be configured in accordance with the embodiments of the invention described herein with respect to the POS system.

Using these embodiments, there is no need for a data matrix for each protected sub-device. The manifest, identified via the UPC code, has device types attached to it. Thus, a tool such as a drill can be manufactured in exactly the same way for a tool only sale as for a tool+battery package. This also ensures that the correct tool and corresponding batteries are in a kit when sold AND when returned. For example, when returning the product, the POS system at the return desk can query the package to ensure that all of the devices listed in the UPC manifest are present in the package.

Figure 34:
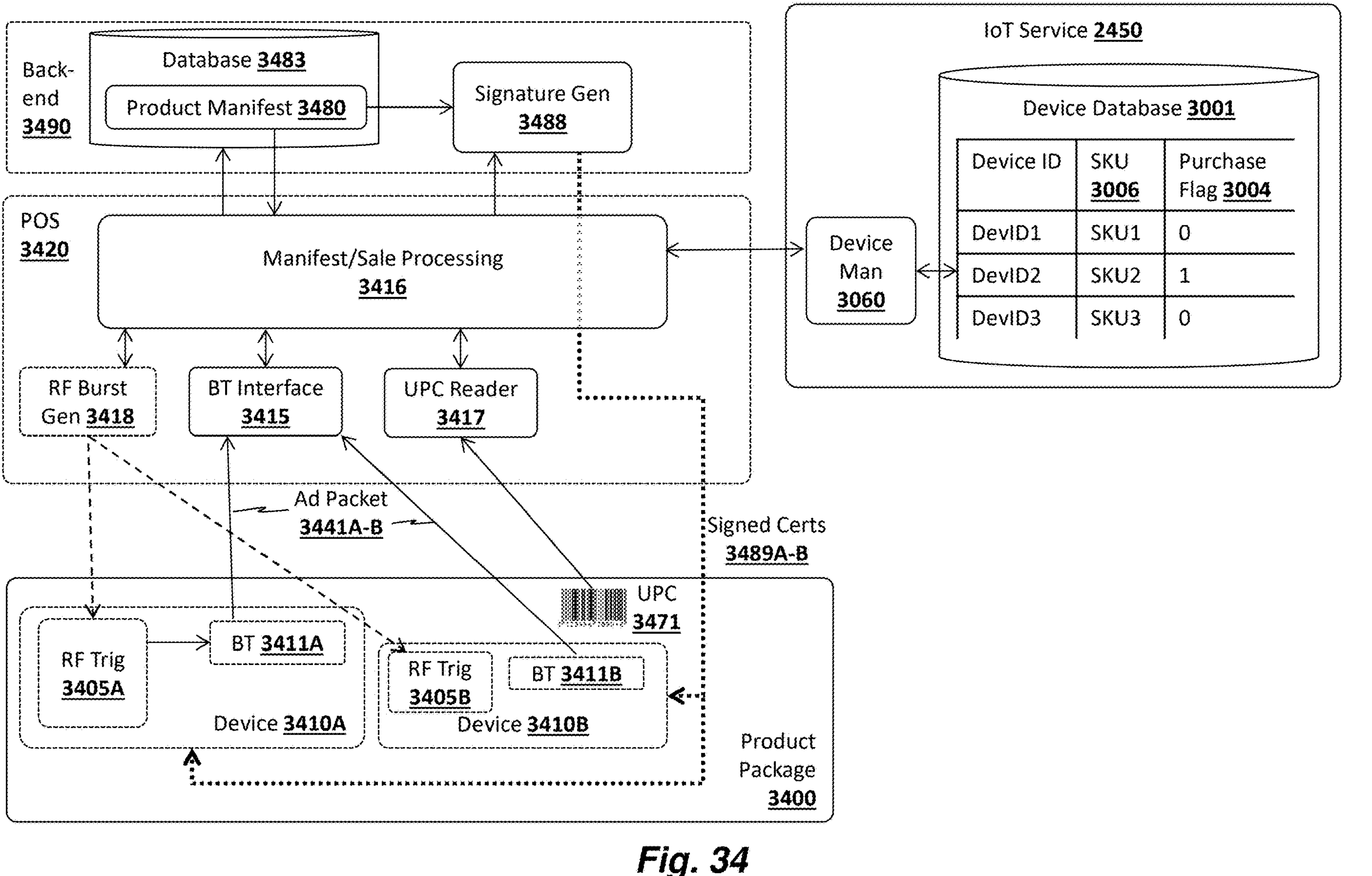
FIG. 34 illustrates one embodiment which uses Bluetooth communication.

FIG. 34 illustrates a Bluetooth implementation in accordance with some embodiments of the invention. In some embodiments, a low energy (LE) implementation of Bluetooth (BT) is used, such as the LE implementations of Bluetooth 5.2, 5.3, or 5.4. Note, however, that the underlying principles of the invention are not limited to any particular Bluetooth implementation.

As mentioned, the product UPC code 3471 of the product package 3400 is scanned with a UPC reader 3417 on the POS system 3420 as previously described. An RF trigger module 3405A-B awakens one or more devices (e.g., devices 3410A-B in the illustrated example) in the product packaging 3400 in response to an RF burst at the POS area. In some embodiments, an RF burst generator 3418 in the POS system is configured to generate the RF burst when the UPC code 3471 is scanned. Alternatively, the RF burst generator 3418 may periodically generate RF bursts (e.g., every few seconds) to activate any devices which are nearby.

Once activated, each device's Bluetooth module 3411A-B is configured to transmit a Bluetooth extended advertising packet 3441A-B containing the data that would have been in the data matrix on the package (as described with respect to the prior embodiments). As mentioned, this can include, but is not limited to, the UUID of the device 3410A-B, the device type, a manufacturing date, hardware and/or software version information, a MAC address, etc, and any other relevant information which can be used to uniquely identify each device 3410A-B.

In some embodiments, manifest/sale processing logic 3416 uses the UPC data 3471 to generate a query for the UPC device manifest to the store's back-end system 3490. The UPC device manifest indicates the set of devices which are expected to be included in the product packaging 3400. The back-end system 3490 uses the UPC data provided to retrieve the UPC device manifest 3480 from a back-end database 3483 and transmits the manifest to the manifest/sale processing logic 3416.

In one embodiment, the manifest/sale processing logic 3416 uses the UPC device manifest to identify any sub-units in the product packaging 3400 (e.g., such as a tool bundle kit which includes both tools and batteries) and may then search in detected advertising packets 3441A-B for the devices 3410A-B that are expected to be in the product package 3400. If it is able to match the detected devices 3410A-B with the corresponding UPC device manifest, the manifest/sale processing logic 3416 connects with the device(s) 3410A-B and allows the sale to proceed.

In one embodiment, when the sale is completed (i.e., after receiving payment from the user) the manifest/sale processing logic 3016 transmits a request to the store back-end 3490 to sign the device certificates for the devices listed in the manifest 3480. Signature generation logic 3488 in the back-end system generates the signatures and transmits the signed certificates 3489A-B to the manifest/sale processing logic 3416, which transmits the signed certificates to each device 3410A-B. Although the signed certificates 3489A-B are illustrated over a separate communication path for clarity, the signed certificates 3489A-B may be transmitted to the devices 3410A-B via the BT interface 3415.

The signed certificates may be stored on the devices 3410A-B in a non-volatile storage and/or used to unlock the devices 3410A-B, using any of the techniques described above (e.g., via a lock/unlock module 3201 and switch 3250). In addition, the device database 3001 on the IoT service 2450 may be updated as previously described (e.g., setting a purchase flag 3004 in the device database 3001 for the corresponding devices).

Figure 35:
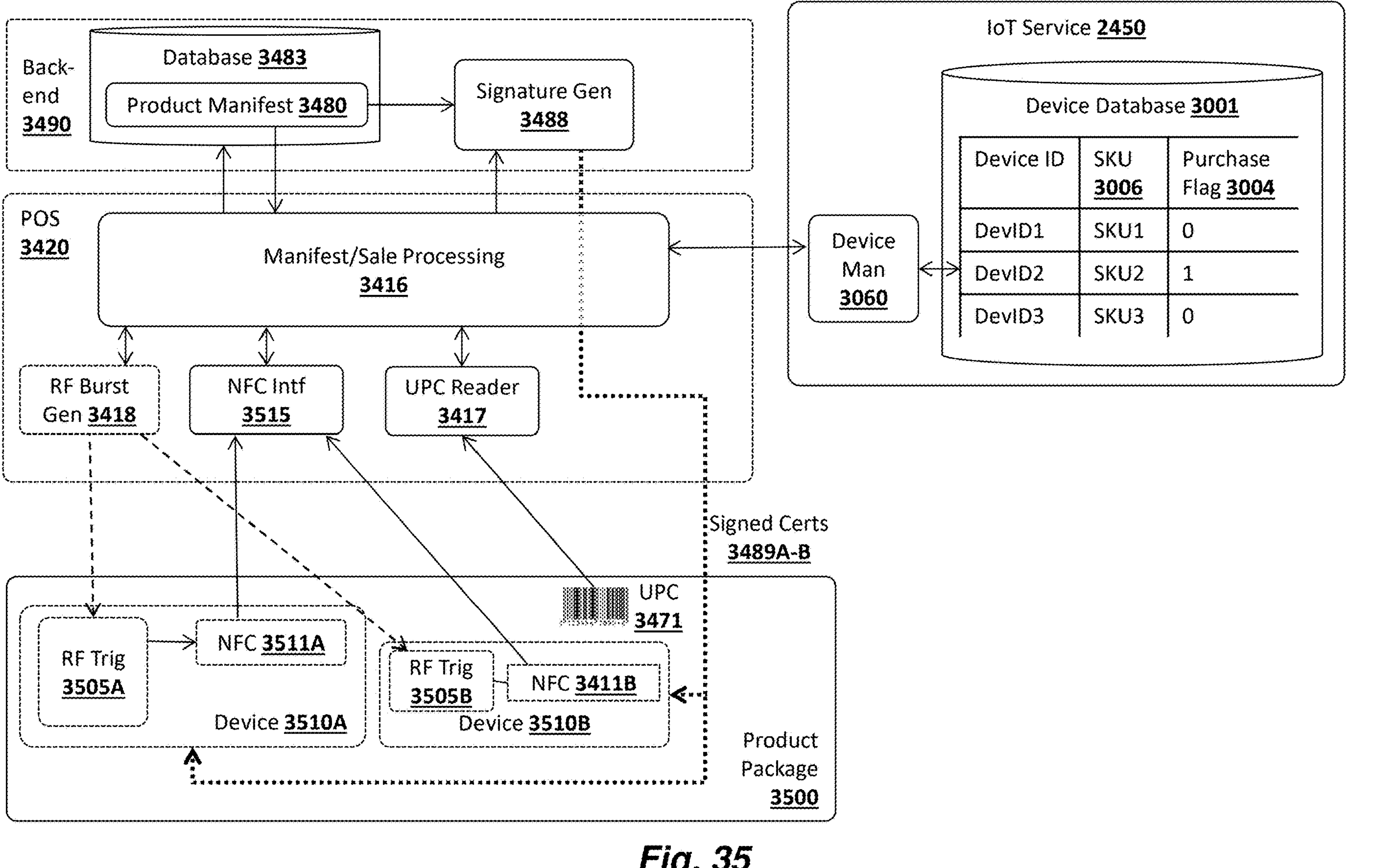
FIG. 35 illustrates one embodiment which uses NFC and/or RFID communication.

FIG. 35 illustrates a NFC/RFID implementation in accordance with some embodiments of the invention. These embodiments operate in a similar manner as the Bluetooth embodiments in FIG. 34, with one exception being that communication is provided using NFC or other RFID standard. While the discussion below sometimes refers only to NFC, the underlying principles of the invention may be implemented using any RFID protocol or standard.

As mentioned, the product UPC code 3471 of the product package 3500 is scanned with a UPC reader 3417 on the POS system 3420 as previously described. RF trigger modules 3505A-B awaken one or more devices (e.g., devices 3510A-B in the illustrated example) in the packaging in response to an RF burst at the POS area. In some embodiments, an RF burst generator 3418 is configured to generate the RF burst when the UPC code 3471 is scanned. Alternatively, the RF burst generator 3418 may periodically generate RF bursts (e.g., every few seconds).

Once activated, each device's NFC module 3511A-B is configured to transmit one or more packets with the data that would have been in the data matrix on the package. An NFC/RFID interface 3515 with an NFC/RFID reader and transmitter at the POS system 3420 uses one or more device deconflicting techniques to discover the transmission from the NFC modules 3511A-B of each individual device 3510A-B. As mentioned, the data transmitted can include, but is not limited to, the UUID of the device 3510A-B, the device type, a manufacturing date, or any other relevant information which can be used to uniquely identify each device 3510A-B.

The manifest/sale processing logic 3416 uses the UPC data 3471 to generate a query for the UPC device manifest to the store's back-end system 3490. The UPC device manifest indicates the set of devices which are expected to be included in the product packaging 3400. The back-end system 3490 retrieves the UPC device manifest 3480 from a database 3483 based on the UPC data provided and transmits it to the manifest/sale processing logic 3416.

In one embodiment, the manifest/sale processing logic 3416 uses the UPC device manifest to identify any sub-units in the product packaging 3400 (e.g., such as a tool bundle kit which includes both tools and batteries). The manifest/sale processing logic 3416 may then search in the detected NFC transmissions for the devices 3510A-B that are expected to be in the product package 3500. If it is able to match the detected devices 3510A-B with the corresponding UPC device manifest, the manifest/sale processing logic 3416 allows the sale to proceed.

In one embodiment, when the sale is completed (i.e., after receiving payment from the user) the manifest/sale processing logic 3416 transmits a request to the store back-end 3490 to sign each of the device certificates listed in the manifests 3480. Signature generation logic 3488 generates the signatures and transmits the signed certificates 3489A-B, which the manifest/sale processing logic 3416 may then transmit to each device 3510A-B in the manifest. Although illustrated over a separate communication path for clarity, the signed certificates 3489A-B may be transmitted to the devices 3510A-B via the NFC interface 3515.

The signed certificates may be stored on the devices 3510A-B in a non-volatile storage and/or used to unlock the devices 3510A-B, using any of the techniques described above (e.g., via a lock/unlock module 3201 and switch 3250). In addition, the device database 3001 on the IoT service 2450 may be updated as previously described (e.g., setting a purchase flag 3004 in the device database 3001 for the corresponding devices).

Figure 36:
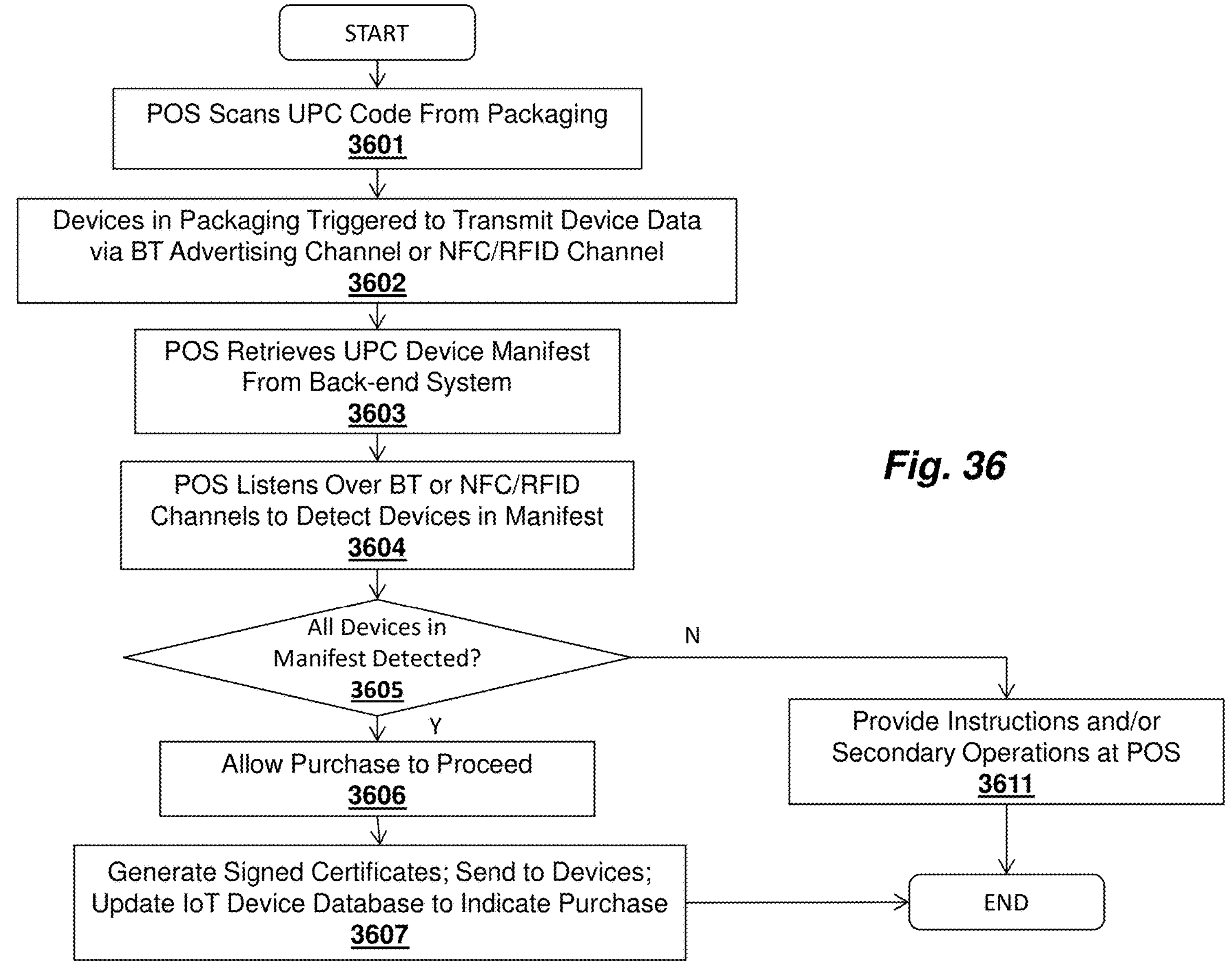
FIG. 36 illustrates a method in accordance with embodiments of the invention.

FIG. 36 illustrates a method in accordance with embodiments of the invention. The method may be implemented within the context of the various architectures described herein, but is not limited to any particular architecture or any particular set of communication channels.

At 3601, the UPC code of the product package is scanned with a UPC reader on the POS system. At 3602, the devices in the product package are awakened (e.g., via RF trigger modules) and begin wirelessly transmitting device data. In a BT implementation, BT extended advertising packets may be used while in an NFC/RFID implementation, corresponding NFC/RFID channels are used.

At 3603, the POS system retrieves the UPC device manifest from the back-end of the POS system (e.g., from a local or remote server). At 3604, the POS system listens over BT or NFC/RFID channels (or both) to detect transmissions from the devices or device types listed in the manifest. If all devices in the manifest are detected at 3605, then the purchase is permitted to proceed at 3606. At 3607, signed certificates are generated (e.g., by the back-end system) and send to the respective devices. The IoT database may also be updated as previously described to indicate that the devices have been purchased.

If all devices in the manifest are not detected, then additional instructions may be provided to the user at the POS in an attempt to acquire the information. For example, the instructions may explain how to position the product package with respect to the POS system. Alternatively, or additionally, secondary operations may be performed, such as generating commands to increase the transmission power of the POS interfaces and/or device interfaces. If the devices cannot be detected, the POS operator may be instructed to open the product package, confirm its contents, and manually enter the device information into the POS system.

Using these embodiments, there is no need to bind specific tools/batteries at the time of manufacture, thereby reducing the burden on manufacturers when they offer special one-time-buys for a kit configuration to manage excess inventory.

These techniques may also be used for inventory in the store or warehouse. Directional antennas can be used to remotely trigger any devices and then listen for their response signals with their device types. This allows big-box stores and warehouses to locate missing high-value stock.

Apparatus and Method for Verifying a Transaction Related to a Device with an on-Device Rewriteable Memory In some embodiments, a rewritable tag is integrated in each device to store a certificate generated by the manufacturer. The certificate may include a public key (e.g., associated with a generated public/private key pair), metadata, and a digital signature generated over the public key and metadata (e.g., generated with the corresponding private key). The metadata may include any information related to the respective device including, but not limited to, the date and location of manufacture, the type of device (e.g., a particular model/version number), and any other information associated with the device. In some implementations, a different public/private key pair is generated by the manufacturer for each device model and the private key is used to generate the signature over the public key and metadata. The rewriteable tag in each device is electrically coupled to the various interfaces described herein (e.g., Bluetooth, RFID/NFC, etc) so that it can be accessed at a POS terminal and used to verify the authenticity of the device and that the device was rightfully purchased, as described further below.

Embodiments of the invention protect against individuals who steal devices from a retail location and attempt to return them for cash. Using the technique described herein, a device can only be returned for cash if a valid signature is detected in the device's rewritable tag (or, potentially, if the user produces a valid receipt, which would not be the case for a stolen device).

Figure 37:
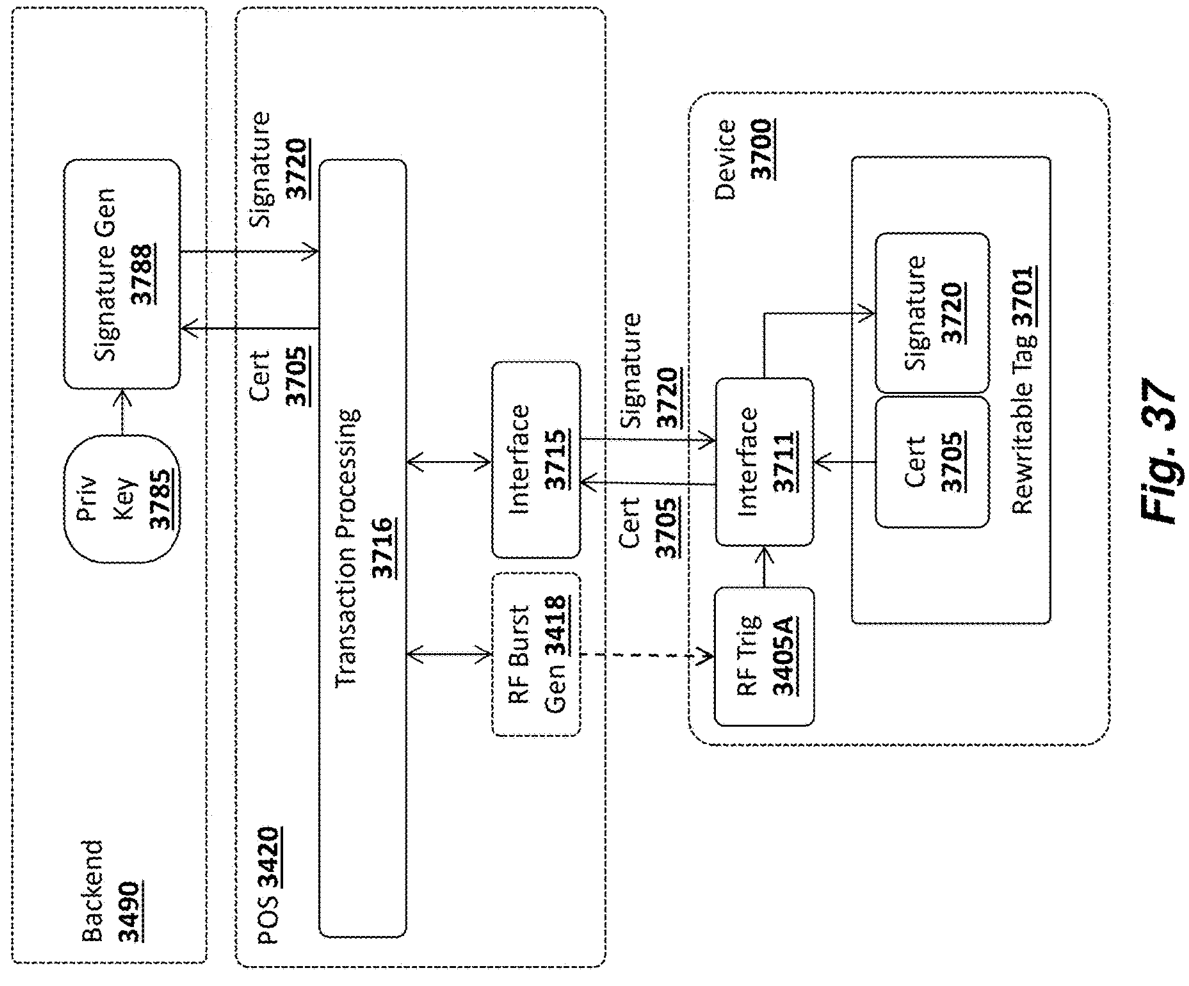
FIG. 37 illustrates one implementation in which a signature over a certificate is generated during a purchase transaction.

FIG. 37 illustrates an example device 3700 with a rewritable tag 3701 containing the certificate 3705 generated by the manufacturer and stored during manufacture and/or packaging of the device. As in prior embodiments, when a user purchases the device 3700 and approaches the POS 3420, an RF trigger circuit 3405A may wake the device interface 3711 in response to an RF burst 3418 generated from the POS system 3420. As mentioned, the interface 3711 may be an RFID/NFC interface, a Bluetooth interface or any other interface type for interacting with the POS system 3420.

The certificate 3705 is read from the rewritable tag 3701 and transmitted from the device interface 3711 to the POS interface 3715. Transaction processing logic 3716 performs the operations associated with purchasing the device 3700. At any stage during the purchase process, the transaction processing logic 3716 may request the generation of a signature over the certificate 3705 by the backend system 3490 (previously described with respect to other embodiments). The backend system 3490 includes signature generation logic 3788 to generate the signature 3720 using a private key 3785 of a private/public key pair generated by the backend system 3490. Because the signature is generated with the private key 3785, it can be verified with the public key in subsequent operations (as described further below). In some embodiments, additional metadata is added and stored in the rewriteable tag 3701 such as the location, date, and time of the transaction. This additional metadata may be combined with the certificate and the signature 3720 may be generated over the combination. These operations may be also performed at various stages in the supply chain prior to the sale at the POS 3490. For example, a separate signature may be generated at manufacturing, pallet packaging, loading onto a container, breaking of a pallet and repacking at a distribution center, and arrival at a retail store. The signatures and corresponding metadata may subsequently be used to track the product through the supply chain up to the POS 3420.

The manifest techniques described above may also be used for these embodiments. For example, the manifest may be retrieved from the backend system 3490 to identify any sub-units included in the product packaging. The sub-components of value in the same product packaging may have their own rewriteable tag 3701 on which a signature is generated to ensure that high-value components included in the product packaging are not swapped at the store or during the return process.

The signature 3720 is provided to the transaction processing logic 3716 in a response message from the backend 3490 and the transaction processing logic 3716 transmits it via interface 3715 to the device interface 3711, which causes it to be stored in the rewritable tag 3701 along with the existing certificate 3705. A separate microcontroller or other circuitry integral to or coupled to the rewriteable tag 3701 may perform the read/write operations from/to the non-volatile memory of the rewriteable tag 3701, which may comprise any type of non-volatile memory/storage device.

In some implementations, only the last certificate or the last number (N) of certificates are stored in the rewritable tag 3701, depending on the storage space available. In these implementations, the oldest certificates may be offloaded to a different non-volatile memory of the device 3700 or may be uploaded to a cloud service from where it can later be retrieved if necessary. The chain of certificates can also be comprised of the new information and a hash of the previous contents and/or the public key of the previous signer to assist in back-tracing the providence of the product if steps were missed or if data is missing.

Figure 38:
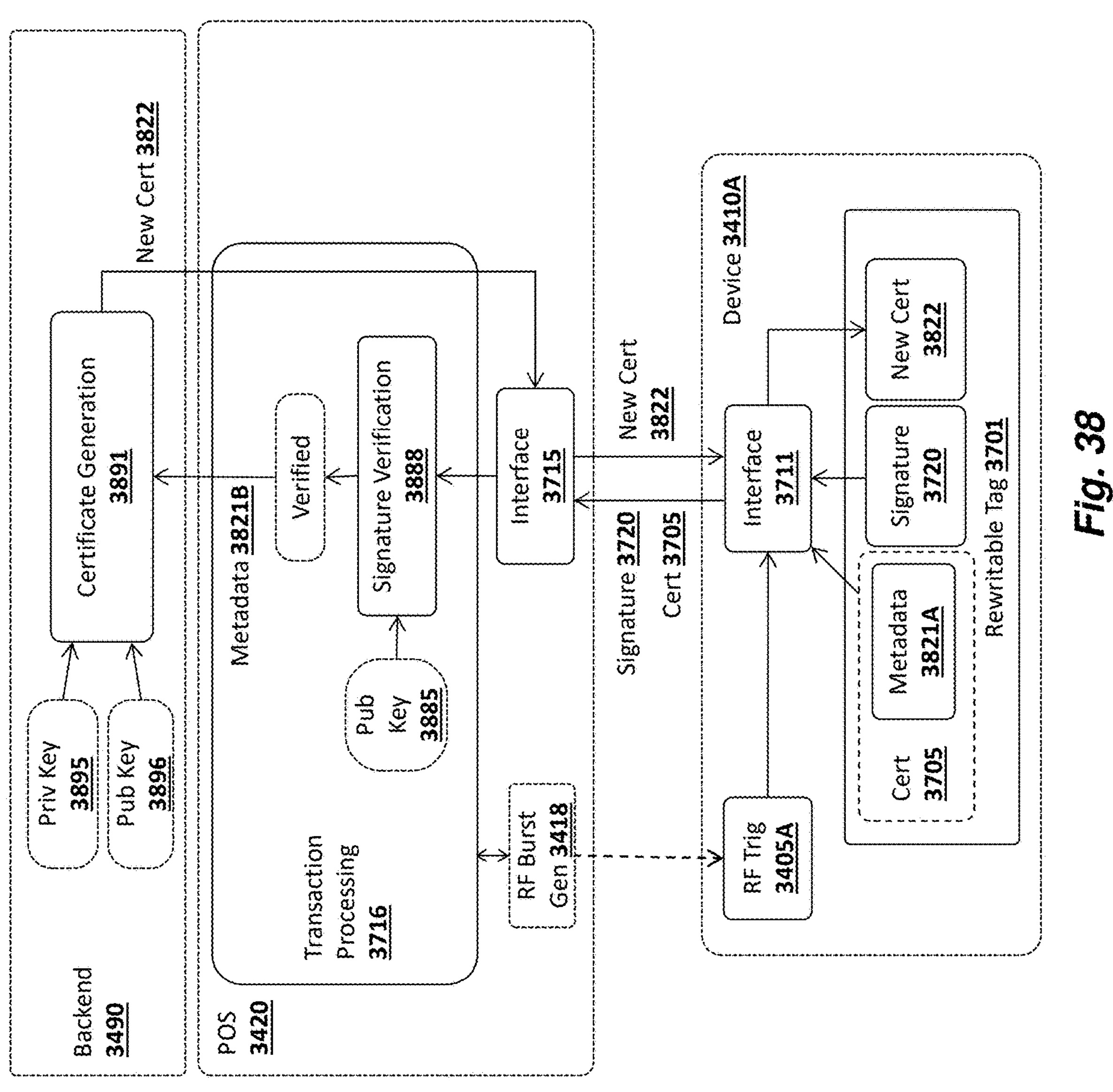
FIG. 38 illustrates an implementation in which a device is involved in a post-purchase transaction.

Once stored in the rewriteable tag 3701, the signature 3720 can be used as proof of the purchase through verification by the POS system 3420. Referring to FIG. 38, when a user needs to provide proof of the purchase such as during a device return or for an under-warranty repair, the RF trigger 3405A wakes the interface 3711 as previously described, and the cert 3705 and signature 3720 are transmitted to the interface 3715 of the transaction processing logic 3716. Signature verification logic 3888 uses the public key 3885 corresponding to the private key 3785 used to generate the signature by the backend 3490 to verify the signature (e.g., by re-generating the signature over the cert 3705 and comparing it to the original signature 3720). A verification of the signature verifies the purchase and the transaction processing logic 3716 proceeds accordingly.

For example, if the user is returning the device 3410A, then the transaction processing logic 3420 authorizes the return. In some embodiments, the transaction processing logic 3420 sends a request to the backend 3490 containing relevant metadata 3821B which can include any portion of the metadata 3821A in the original cert 3705 as well as additional metadata (e.g., such as the date of the return, the manner in which the user was refunded, and any other data related to the transaction). Certificate generation logic 3891 in the backend 3490 generates a new public key 3896 and private key 3895 pair to generate a new certificate 3822. For example, the certificate generation logic 3891 may generate the signature 3822 over the new public key and the metadata 3821B. Regardless of how it is generated, the signature is communicated back through the transaction processing logic 3716, the POS interface 3715, the device interface 3711 and is stored in the rewriteable tag 371 to be used as proof of the transaction.

If the device 3410A is purchased by a new user, the new certificate 3822 may be processed in the same manner as the original certificate 3705, as described with respect to FIG. 37. For example, at the time of purchase, a new signature may be generated over the new certificate by the signature generation logic 3788 of the backend 3490 and stored in the rewriteable tag, and may be used to verify the purchase.

Embodiments of the invention protect against individuals who steal devices from a retail location and attempt to return them for cash. Using the technique described herein, a device can only be returned for cash if a valid signature 3720 is detected in the device's rewritable tag 3701 (or, potentially, if the user produces a valid receipt, which would not be the case for a stolen device).

Figure 39:
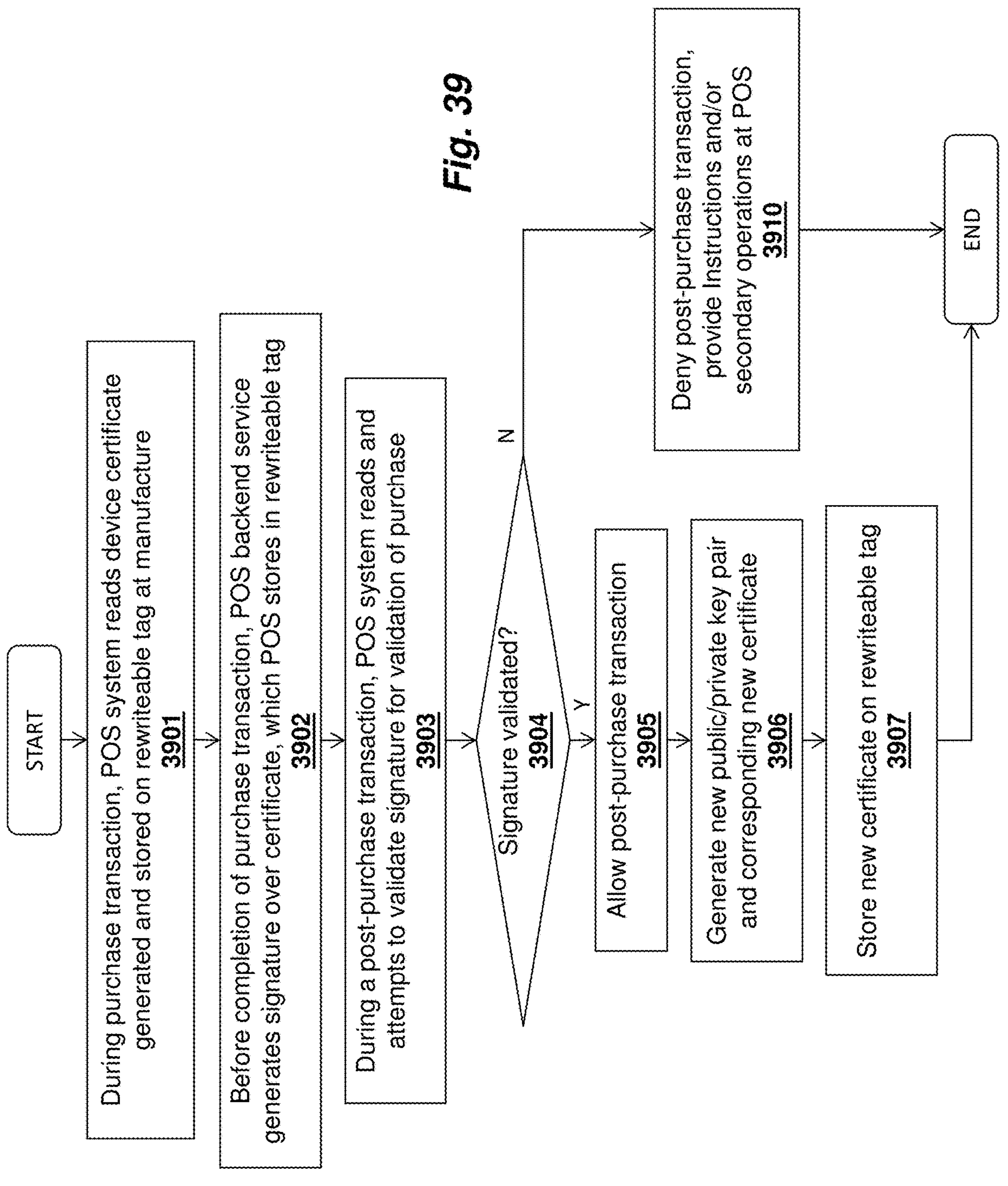
FIG. 39 illustrates a method in accordance with embodiments of the invention.

FIG. 39 illustrates a method in accordance with one embodiment of the invention. The method may be implemented on the various architectures described herein, but is not limited to any particular device architecture or system architecture.

At 3901, during a purchase transaction for purchasing a device, the POS system reads the device certificate generated and stored at manufacture on a rewriteable tag of the device. At 3902, before completion of the purchase transaction, the POS backend service generates a signature over the certificate, which the POS stores in the rewriteable tag. If the purchase fails, then the signature is not stored in the rewriteable tag.

At 3903, during a post-purchase transaction, such as a device return for a refund, the POS system reads and attempts to validate the signature to validate the purchase. As mentioned, this includes reading the certificate and signature from the device and using the public key corresponding to the private key which generated the signature to validate the signature. While some embodiments perform the validation at the POS system, in other embodiments, the user's mobile device can read the signature and certificate from the device (e.g., using RFID/NFC or Bluetooth) and either validate the signature locally using the corresponding public key or sending the certificate and signature to a POS system backend in the Cloud, which performs the validation.

If the signature cannot be validated, determined at 3904, then at 3910, the post-purchase transaction is denied. At this stage, instructions can be provided and/or secondary operations performed at the POS to attempt to resolve the issue. For example, the user may be told at this stage that a valid certificate is required to validate the purchase.

If the signature is validated at 3904, then at 3905, the post-purchase transaction is allowed and, at 3906, a new public/private key pair and corresponding new certificate are generated. At 3907, the new certificate is stored on the rewriteable tag, either in place of the original certificate or along with the original certificate. The new certificate may subsequently be used as previously described during a new purchase transaction (e.g., when a new user purchases the device).

The electronic devices described herein may include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Additionally, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

The invention claimed is:

1. A machine-implemented method comprising:

during a purchase transaction to purchase a device at a point of sale (POS) system, a wireless communication interface including circuitry to read a certificate stored on a rewriteable tag integral to the device;

generating, by transaction processing circuitry coupled to the wireless communication interface, a signature over the certificate, the signature to be used as an authenticated proof of purchase of the device, wherein, if the purchase transaction results in a successful purchase of the device, storing the signature in the rewriteable tag, the signature to be communicated via the wireless communication interface;

during a post-purchase transaction, accessing the rewritable tag via the wireless communication interface or a different wireless communication interface including different circuitry to read the signature from the rewriteable tag and validate the signature to authenticate the proof of purchase of the device;

denying the post-purchase transaction if the signature cannot be read from the rewriteable tag or is read from the rewriteable tag but cannot be not validated;

if the signature can be read and validated, then:

permitting the post-process transaction;

generating, by the transaction processing circuitry, a new public/private key pair and corresponding new certificate to be transmitted to the rewriteable tag via the wireless communication interface; and storing the new certificate on the rewriteable tag.

2. The machine-implemented method of claim 1, further comprising:

during a subsequent purchase transaction to purchase the device at the POS system, reading the new certificate from the rewriteable tag via the wireless communication interface;

generating, by the transaction processing circuitry, a new signature over the new certificate and, if the purchase transaction results in a successful purchase of the device, storing the new signature in the rewriteable tag, the new signature to be communicated via the wireless communication interface.

3. The machine-implemented method of claim 1, wherein the post-process transaction comprises a return of the device for a refund.

4. The machine-implemented method of claim 1, wherein reading the certificate comprises establishing, by the wireless communication interface, a radio frequency ID (RFID) channel, a near field communication (NFC) channel, or a Bluetooth channel with the device and reading the certificate from the rewriteable tag over a corresponding RFID, NFC, or Bluetooth interface.

5. The machine-implemented method of claim 4, further comprising:

generating a radio-frequency (RF) burst by circuitry of the wireless communication interface to activate the corresponding RFID, NFC, or Bluetooth interface.

6. The machine-implemented method of claim 1, wherein the rewriteable tag comprises a non-volatile memory and circuitry for reading from the non-volatile memory and writing to the non-volatile memory.

7. The machine-implemented method of claim 1, wherein the certificate is generated by a manufacturer of the device by generating an original public/private key pair, generating first metadata associated with the device, and generating an original signature over the public key and first metadata using the private key, the certificate comprising the public key, first metadata, and original signature.

8. The machine-implemented method of claim 7, wherein the first metadata comprises at least one of: device information and a date of manufacture.

9. The machine-implemented method of claim 7, wherein generating the new certificate comprises generating, by the transaction processing circuitry, second metadata associated with the device, and generating, by the transaction processing circuitry, a new signature over the new public key and second metadata using the new private key, the new certificate comprising the new public key, second metadata, and new signature.

10. A system, comprising:

a wireless interface including circuitry to establish a communication channel with a device during a purchase transaction to purchase the device, and read a certificate stored on a rewriteable tag integral to the device;

transaction processing circuitry coupled to the wireless interface, the transaction processing circuitry to cause a signature to be generated over the certificate, the signature to be used as an authenticated proof of purchase of the device, wherein, if the purchase transaction results in a successful purchase of the device, cause the signature to be stored in the rewriteable tag of the device, the signature to be communicated via the wireless interface;

the wireless interface or a different wireless interface to access the rewritable tag to read the signature from the rewriteable tag and validate the signature during a post-purchase transaction to authenticate the proof of purchase of the device;

wherein if the signature cannot be read from the rewriteable tag or is read from the rewritable tag but cannot be validated, then the post-process transaction is denied, wherein if the signature is validated, then the post-process transaction is permitted and a new public/private key pair and corresponding new certificate are generated and transmitted to the rewriteable tag via the wireless interface or the different wireless interface, the new certificate to be stored on the rewriteable tag.

11. The system of claim 10, wherein during a subsequent purchase transaction to purchase the device at the POS system, the new certificate is read from the rewriteable tag; and a new signature generated over the new certificate and, if the purchase transaction results in a successful purchase of the device, the new signature is stored in the rewriteable tag.

12. The system of claim 11, wherein the post-process transaction comprises a return of the device for a refund.

13. The system of claim 12, wherein reading the certificate comprises establishing a radio frequency ID (RFID) channel, a near field communication (NFC) channel, or a Bluetooth channel with the device and reading the certificate from the rewriteable tag over a corresponding RFID, NFC, or Bluetooth interface.

14. The system of claim 13, further comprising:

a radio-frequency (RF) generator to generate an RF burst to activate the corresponding RFID, NFC, or Bluetooth interface.

15. The system of claim 12, wherein the rewriteable tag comprises a non-volatile memory and circuitry for reading from the non-volatile memory and writing to the non-volatile memory.

16. The system of claim 12, wherein the certificate is generated by a manufacturer of the device by generating an original public/private key pair, generating first metadata associated with the device, and generating an original signature over the public key and first metadata using the private key, the certificate comprising the public key, first metadata, and original signature.

17. The system of claim 16, wherein the first metadata comprises at least one of: device information and a date of manufacture.

18. The system of claim 17, wherein generating the new certificate comprises generating second metadata associated with the device, and generating a new signature over the new public key and second metadata using the new private key, the new certificate comprising the new public key, second metadata, and new signature.

19. A machine-readable medium having program code stored thereon which, when executed by a machine, causes the machine to perform operations, comprising:

during a purchase transaction to purchase a device at a point of sale (POS) system, a wireless communication interface including circuitry to read a certificate stored on a rewriteable tag integral to the device;

generating, by transaction processing circuitry coupled to the wireless communication interface, a signature over the certificate, the signature to be used as an authenticated proof of purchase of the device, wherein, if the purchase transaction results in a successful purchase of the device, storing the signature in the rewriteable tag, the signature to be communicated via the wireless communication interface;

during a post-purchase transaction, accessing the rewritable tag to read the signature from the rewriteable tag and validate the signature to authenticate the proof of purchase of the device;

denying the post-purchase transaction if the signature cannot be read from the rewriteable tag or is read from the rewriteable tag but cannot be not validated;

if the signature can be read and validated, then:

permitting the post-process transaction;

generating, by the transaction processing circuitry, a new public/private key pair and corresponding new certificate to be transmitted to the rewriteable tag via the wireless communication interface; and storing the new certificate on the rewriteable tag.

20. The machine-readable medium of claim 19, further comprising program code to cause the machine to perform the operations of:

during a subsequent purchase transaction to purchase the device at the POS system, reading the new certificate from the rewriteable tag via the wireless communication interface;

generating, by the transaction processing circuitry, a new signature over the new certificate and, if the purchase transaction results in a successful purchase of the device, storing the new signature in the rewriteable tag, the new signature to be communicated via the wireless communication interface.

21. The machine-readable medium of claim 19, wherein the post-process transaction comprises a return of the device for a refund.

22. The machine-readable medium of claim 19, wherein reading the certificate comprises establishing, by the wireless communication interface, a radio frequency ID (RFID) channel, a near field communication (NFC) channel, or a Bluetooth channel with the device and reading the certificate from the rewriteable tag over a corresponding RFID, NFC, or Bluetooth interface.

23. The machine-readable medium of claim 22, further comprising program code to cause the machine to perform the operations of:

generating a radio-frequency (RF) burst by circuitry of the wireless communication interface to activate the corresponding RFID, NFC, or Bluetooth interface.

24. The machine-readable medium of claim 19, wherein the rewriteable tag comprises a non-volatile memory and circuitry for reading from the non-volatile memory and writing to the non-volatile memory.

25. The machine-readable medium of claim 19, wherein the certificate is generated by a manufacturer of the device by generating an original public/private key pair, generating first metadata associated with the device, and generating an original signature over the public key and first metadata using the private key, the certificate comprising the public key, first metadata, and original signature.

26. The machine-readable medium of claim 25, wherein the first metadata comprises at least one of: device information and a date of manufacture.

27. The machine-readable medium of claim 25, wherein generating the new certificate comprises generating, by the transaction processing circuitry, second metadata associated with the device, and generating, by the transaction processing circuitry, a new signature over the new public key and second metadata using the new private key, the new certificate comprising the new public key, second metadata, and new signature.

* * * * *